(12) United States Patent
Salib et al.

(10) Patent No.: US 7,096,103 B2
(45) Date of Patent: Aug. 22, 2006

(54) SYSTEM AND METHOD FOR OPERATING A ROLLOVER CONTROL SYSTEM DURING AN ELEVATED CONDITION

(75) Inventors: Albert Chenouda Salib, Ypsilanti, MI (US); Hani Abdul Ghani, Dearborn Hts., MI (US); Mathijs Willem Geurink, Olofstorp (SE); Todd Allen Brown, Dearborn, MI (US)

(73) Assignee: Ford Motor Company, Dearborn, MI (US)

( * ) Notice: Subject to any disclaimer, the term of this patent is extended or adjusted under 35 U.S.C. 154(b) by 32 days.

(21) Appl. No.: 11/120,016

(22) Filed: May 2, 2005

(65) Prior Publication Data

US 2005/0256628 A1    Nov. 17, 2005

Related U.S. Application Data

(62) Division of application No. 10/628,484, filed on Jul. 28, 2003, now abandoned.

(60) Provisional application No. 60/401,416, filed on Aug. 5, 2002, provisional application No. 60/401,464, filed on Aug. 5, 2002.

(51) Int. Cl.
  *B61F 1/00*    (2006.01)
(52) U.S. Cl. ............................................ 701/38
(58) Field of Classification Search .................. 701/38, 701/45, 36, 37, 70; 280/5.506, 5.507; 340/440
See application file for complete search history.

(56) References Cited

U.S. PATENT DOCUMENTS

| | | | |
|---|---|---|---|
| 2,917,126 A | 12/1959 | Phillips | |
| 3,604,273 A | 9/1971 | Kwok et al. | |
| 3,608,925 A | 9/1971 | Murphy | |
| 3,797,893 A | 3/1974 | Burckhardt | |
| 3,899,028 A | 8/1975 | Morris et al. | |
| 3,948,567 A | 4/1976 | Kasselmann et al. | |
| 3,972,543 A | 8/1976 | Presley et al. | |
| 4,023,864 A | 5/1977 | Lang et al. | |
| RE30,550 E | 3/1981 | Reise | |
| 4,294,113 A | 10/1981 | Sprott et al. | |
| 4,480,714 A | 11/1984 | Yabuta et al. | |
| 4,548,079 A | 10/1985 | Klatt | |
| 4,592,565 A | 6/1986 | Eagle | |
| 4,597,462 A | 7/1986 | Sano et al. | |
| 4,624,476 A | 11/1986 | Tanaka et al. | |
| 4,650,212 A | 3/1987 | Yoshimura | |

(Continued)

FOREIGN PATENT DOCUMENTS

DE    10065010    12/2000

(Continued)

OTHER PUBLICATIONS

A method for reducing on-road rollovers—anti-rollover braking, Thomas J. Wielenga, Dynamotive, LLC, International Congress and Exposition, Detroit, Michigan, Mar. 1-4, 1999.

(Continued)

*Primary Examiner*—Michael J. Zanelli
(74) *Attorney, Agent, or Firm*—Raymond L. Coppiellie; Artz & Artz, P.C.

(57) ABSTRACT

A method of controlling a safety system 38 of a vehicle 10 include determining a roll rate, determining a first control pressure in response to roll rate, determining a roll angle, and determining a second control pressure in response to the roll angle. The method further includes determining a final control pressure in response to the first control pressure and the second control pressure and controlling the safety system in response to the final control pressure.

23 Claims, 9 Drawing Sheets

U.S. PATENT DOCUMENTS

| | | |
|---|---|---|
| 4,679,808 A | 7/1987 | Ito et al. |
| 4,690,553 A | 9/1987 | Fukamizu et al. |
| 4,705,130 A | 11/1987 | Fukunaga et al. |
| 4,761,022 A | 8/1988 | Ohashi |
| 4,765,649 A | 8/1988 | Ikemoto et al. |
| 4,767,588 A | 8/1988 | Ito |
| 4,788,773 A | 12/1988 | Sukegawa |
| 4,809,183 A | 2/1989 | Eckert |
| 4,827,416 A | 5/1989 | Kawagoe et al. |
| 4,846,496 A | 7/1989 | Tanaka et al. |
| 4,872,116 A | 10/1989 | Ito et al. |
| 4,888,696 A | 12/1989 | Akatsu et al. |
| 4,898,431 A | 2/1990 | Karnopp et al. |
| 4,930,082 A | 5/1990 | Harara et al. |
| 4,951,198 A | 8/1990 | Watanabe et al. |
| 4,960,292 A | 10/1990 | Sadler |
| 4,964,679 A | 10/1990 | Rath |
| 4,967,865 A | 11/1990 | Schindler |
| 4,976,330 A | 12/1990 | Matsumoto |
| 4,998,593 A | 3/1991 | Karnopp et al. |
| 5,002,142 A | 3/1991 | Klosterhaus |
| 5,033,770 A | 7/1991 | Kamimura et al. |
| 5,058,017 A | 10/1991 | Adachi et al. |
| 5,066,041 A | 11/1991 | Kindermann et al. |
| 5,088,040 A | 2/1992 | Matsuda et al. |
| 5,089,967 A | 2/1992 | Haseda et al. |
| 5,097,917 A | 3/1992 | Serizawa et al. |
| 5,159,553 A | 10/1992 | Karnopp et al. |
| 5,163,319 A | 11/1992 | Spies et al. |
| 5,189,920 A | 3/1993 | Martinez |
| 5,200,896 A | 4/1993 | Sato et al. |
| 5,208,749 A | 5/1993 | Adachi et al. |
| 5,224,765 A | 7/1993 | Matsuda |
| 5,228,757 A | 7/1993 | Ito et al. |
| 5,230,396 A | 7/1993 | Yasui |
| 5,239,868 A | 8/1993 | Takenaka et al. |
| 5,247,466 A | 9/1993 | Shimada et al. |
| 5,261,503 A | 11/1993 | Yasui |
| 5,265,020 A | 11/1993 | Nakayama |
| 5,274,576 A | 12/1993 | Williams |
| 5,278,761 A | 1/1994 | Ander et al. |
| 5,282,134 A | 1/1994 | Gioutsos et al. |
| 5,297,646 A | 3/1994 | Yamamura et al. |
| 5,307,274 A | 4/1994 | Takata et al. |
| 5,311,431 A | 5/1994 | Cao et al. |
| 5,311,956 A | 5/1994 | Sugiyama |
| 5,324,102 A | 6/1994 | Roll et al. |
| 5,335,176 A | 8/1994 | Nakamura |
| 5,365,439 A | 11/1994 | Momose et al. |
| 5,370,199 A | 12/1994 | Akuta et al. |
| 5,408,411 A | 4/1995 | Nakamura et al. |
| 5,438,515 A | 8/1995 | Miichi et al. |
| 5,446,658 A | 8/1995 | Pastor et al. |
| 5,455,770 A | 10/1995 | Hadeler et al. |
| 5,490,063 A | 2/1996 | Genise |
| 5,510,989 A | 4/1996 | Zabler et al. |
| 5,515,277 A | 5/1996 | Mine |
| 5,548,536 A | 8/1996 | Ammon |
| 5,549,328 A | 8/1996 | Cubalchini |
| 5,560,688 A | 10/1996 | Schappler et al. |
| 5,576,957 A | 11/1996 | Asanuma et al. |
| 5,579,245 A | 11/1996 | Kato |
| 5,598,335 A | 1/1997 | You |
| 5,602,734 A | 2/1997 | Kithil |
| 5,610,575 A | 3/1997 | Gioutsos |
| 5,627,756 A | 5/1997 | Fukada et al. |
| 5,634,698 A | 6/1997 | Cao et al. |
| 5,640,324 A | 6/1997 | Inagaki |
| 5,648,903 A | 7/1997 | Liubakka |
| 5,671,982 A | 9/1997 | Wanke |
| 5,676,433 A | 10/1997 | Inagaki et al. |
| 5,684,702 A | 11/1997 | Phillips et al. |
| 5,694,319 A | 12/1997 | Suissa et al. |
| 5,703,776 A | 12/1997 | Soung |
| 5,707,117 A | 1/1998 | Hu et al. |
| 5,707,120 A | 1/1998 | Monzaki et al. |
| 5,719,790 A | 2/1998 | Lohrenz et al. |
| 5,720,533 A | 2/1998 | Pastor et al. |
| 5,723,782 A | 3/1998 | Bolles, Jr. |
| 5,732,377 A | 3/1998 | Eckert |
| 5,732,378 A | 3/1998 | Eckert et al. |
| 5,732,379 A | 3/1998 | Eckert et al. |
| 5,736,939 A | 4/1998 | Corcoran |
| 5,737,224 A | 4/1998 | Jeenicke et al. |
| 5,740,041 A | 4/1998 | Iyoda |
| 5,740,877 A | 4/1998 | Sasaki |
| 5,742,918 A | 4/1998 | Ashrafi et al. |
| 5,742,919 A | 4/1998 | Ashrafi et al. |
| 5,762,406 A | 6/1998 | Yasui et al. |
| 5,774,819 A | 6/1998 | Yamamoto |
| 5,782,543 A | 7/1998 | Monzaki et al. |
| 5,787,375 A | 7/1998 | Madau et al. |
| 5,801,647 A | 9/1998 | Survo et al. |
| 5,809,434 A | 9/1998 | Ashrafi et al. |
| 5,816,670 A | 10/1998 | Yamada et al. |
| 5,825,284 A | 10/1998 | Dunwoody et al. |
| 5,842,143 A | 11/1998 | Lohrenz et al. |
| 5,857,160 A | 1/1999 | Dickinson et al. |
| 5,857,535 A | 1/1999 | Brooks |
| 5,869,943 A | 2/1999 | Nakashima et al. |
| 5,878,357 A | 3/1999 | Sivashankar et al. |
| 5,890,084 A | 3/1999 | Halasz et al. |
| 5,893,896 A | 4/1999 | Imamura et al. |
| 5,925,083 A | 7/1999 | Ackermann |
| 5,926,087 A | 7/1999 | Busch |
| 5,931,546 A | 8/1999 | Nakashima et al. |
| 5,941,920 A | 8/1999 | Schubert |
| 5,944,137 A | 8/1999 | Moser et al. |
| 5,944,392 A | 8/1999 | Tachihata et al. |
| 5,946,644 A | 8/1999 | Cowan et al. |
| 5,964,819 A | 10/1999 | Naito |
| 5,965,808 A | 10/1999 | Normann |
| 5,971,503 A | 10/1999 | Joyce et al. |
| 6,002,974 A | 12/1999 | Schiffmann |
| 6,002,975 A | 12/1999 | Schiffmann et al. |
| 6,026,926 A | 2/2000 | Noro et al. |
| 6,038,495 A | 3/2000 | Schiffman |
| 6,040,916 A | 3/2000 | Griesinger |
| 6,050,360 A | 4/2000 | Pattok et al. |
| 6,055,472 A | 4/2000 | Breunig et al. |
| 6,062,336 A | 5/2000 | Amberkar et al. |
| 6,065,558 A | 5/2000 | Wielenga |
| 6,073,065 A | 6/2000 | Brown et al. |
| 6,079,513 A | 6/2000 | Nishizaki et al. |
| 6,081,761 A | 6/2000 | Harada et al. |
| 6,085,133 A | 7/2000 | Keuper et al. |
| 6,085,860 A | 7/2000 | Hackl et al. |
| 6,086,168 A | 7/2000 | Rump |
| 6,089,344 A | 7/2000 | Baughn et al. |
| 6,104,284 A | 8/2000 | Otsuka |
| 6,121,873 A | 9/2000 | Yamada et al. |
| 6,122,568 A | 9/2000 | Madau et al. |
| 6,122,584 A | 9/2000 | Lin et al. |
| 6,129,172 A | 10/2000 | Yoshida |
| 6,141,604 A | 10/2000 | Mattes et al. |
| 6,141,605 A | 10/2000 | Joyce |
| 6,144,904 A | 11/2000 | Tseng |
| 6,149,251 A | 11/2000 | Wuerth et al. |
| 6,161,905 A | 12/2000 | Hac et al. |
| 6,167,357 A | 12/2000 | Zhu |
| 6,169,939 B1 | 1/2001 | Raad et al. |
| 6,169,946 B1 | 1/2001 | Griessbach |
| 6,170,594 B1 | 1/2001 | Gilbert |
| 6,176,555 B1 | 1/2001 | Semsey |

| | | |
|---|---|---|
| 6,178,365 B1 | 1/2001 | Kawagoe et al. |
| 6,178,375 B1 | 1/2001 | Breunig |
| 6,179,310 B1 | 1/2001 | Clare et al. |
| 6,179,394 B1 | 1/2001 | Browalski et al. |
| 6,184,637 B1 | 2/2001 | Yamawaki et al. |
| 6,185,485 B1 | 2/2001 | Ashrafti et al. |
| 6,185,497 B1 | 2/2001 | Taniguchi et al. |
| 6,186,267 B1 | 2/2001 | Hackl et al. |
| 6,192,305 B1 | 2/2001 | Schiffmann |
| 6,195,606 B1 | 2/2001 | Barta et al. |
| 6,198,988 B1 | 3/2001 | Tseng |
| 6,202,009 B1 | 3/2001 | Tseng |
| 6,202,020 B1 | 3/2001 | Kyrtsos |
| 6,206,383 B1 | 3/2001 | Burdock |
| 6,219,604 B1 | 4/2001 | Dilger et al. |
| 6,223,114 B1 | 4/2001 | Boros et al. |
| 6,226,579 B1 | 5/2001 | Hackl et al. |
| 6,227,482 B1 | 5/2001 | Yamamoto |
| 6,232,875 B1 | 5/2001 | DeZorzi |
| 6,233,510 B1 | 5/2001 | Platner et al. |
| 6,236,916 B1 | 5/2001 | Staub et al. |
| 6,263,261 B1 | 7/2001 | Brown et al. |
| 6,266,596 B1 | 7/2001 | Hartman et al. |
| 6,272,420 B1 | 8/2001 | Schramm et al. |
| 6,278,930 B1 | 8/2001 | Yamada et al. |
| 6,282,471 B1 | 8/2001 | Burdock et al. |
| 6,282,472 B1 | 8/2001 | Jones et al. |
| 6,282,474 B1 | 8/2001 | Chou et al. |
| 6,290,019 B1 | 9/2001 | Kolassa et al. |
| 6,292,734 B1 | 9/2001 | Murakami et al. |
| 6,292,759 B1 | 9/2001 | Schiffmann |
| 6,311,111 B1 | 10/2001 | Leimbach et al. |
| 6,314,329 B1 | 11/2001 | Madau et al. |
| 6,315,373 B1 | 11/2001 | Yamada et al. |
| 6,321,141 B1 | 11/2001 | Leimbach |
| 6,324,445 B1 | 11/2001 | Tozu et al. |
| 6,324,446 B1 | 11/2001 | Brown et al. |
| 6,324,458 B1 | 11/2001 | Takagi et al. |
| 6,330,522 B1 | 12/2001 | Takeuchi |
| 6,332,104 B1 | 12/2001 | Brown et al. |
| 6,338,012 B1 | 1/2002 | Brown et al. |
| 6,349,247 B1 | 2/2002 | Schramm et al. |
| 6,351,694 B1 | 2/2002 | Tseng et al. |
| 6,352,318 B1 | 3/2002 | Hosomi et al. |
| 6,356,188 B1 | 3/2002 | Meyers et al. |
| 6,360,147 B1 | 3/2002 | Lee |
| 6,363,309 B1 | 3/2002 | Irie et al. |
| 6,366,844 B1 | 4/2002 | Woywod et al. |
| 6,370,938 B1 | 4/2002 | Leimbach et al. |
| 6,394,240 B1 | 5/2002 | Barwick |
| 6,397,127 B1 | 5/2002 | Meyers et al. |
| 6,419,240 B1 | 7/2002 | Burdock et al. |
| 6,424,897 B1 | 7/2002 | Mattes et al. |
| 6,427,102 B1 | 7/2002 | Ding |
| 6,428,118 B1 | 8/2002 | Blosch |
| 6,433,681 B1 | 8/2002 | Foo et al. |
| 6,438,463 B1 | 8/2002 | Tobaru et al. |
| 6,438,464 B1 | 8/2002 | Woywod et al. |
| 6,454,365 B1 * | 9/2002 | Arwine et al. ............... 303/155 |
| 6,456,194 B1 | 9/2002 | Carlson et al. |
| 6,459,990 B1 | 10/2002 | McCall et al. |
| 6,471,218 B1 | 10/2002 | Burdock et al. |
| 6,477,480 B1 | 11/2002 | Tseng et al. |
| 6,496,758 B1 | 12/2002 | Rhode et al. |
| 6,496,763 B1 | 12/2002 | Griessbach |
| 6,498,976 B1 | 12/2002 | Ehlbeck et al. |
| 6,502,023 B1 | 12/2002 | Fukada |
| 6,523,637 B1 | 2/2003 | Nakano et al. |
| 6,526,342 B1 | 2/2003 | Burdock et al. |
| 6,529,803 B1 | 3/2003 | Meyers et al. |
| 6,542,073 B1 | 4/2003 | Yeh et al. |
| 6,542,792 B1 | 4/2003 | Schubert et al. |
| 6,547,022 B1 | 4/2003 | Hosomi et al. |
| 6,553,284 B1 | 4/2003 | Holst et al. |
| 6,554,293 B1 | 4/2003 | Fennel et al. |
| 6,556,908 B1 | 4/2003 | Lu et al. |
| 6,559,634 B1 | 5/2003 | Yamada |
| 6,593,849 B1 | 7/2003 | Chubb |
| 6,598,946 B1 | 7/2003 | Nagae |
| 6,600,414 B1 | 7/2003 | Foo et al. |
| 6,600,985 B1 | 7/2003 | Weaver |
| 6,618,656 B1 | 9/2003 | Kueblbeck et al. |
| 6,631,317 B1 | 10/2003 | Lu |
| 6,637,543 B1 | 10/2003 | Card |
| 6,644,454 B1 | 11/2003 | Yamada et al. |
| 6,650,971 B1 | 11/2003 | Haas |
| 6,654,674 B1 | 11/2003 | Lu et al. |
| 6,657,539 B1 | 12/2003 | Yamamoto et al. |
| 6,678,631 B1 | 1/2004 | Schiffmann |
| 6,681,196 B1 | 1/2004 | Glaser et al. |
| 6,681,881 B1 | 1/2004 | Andonian et al. |
| 6,698,542 B1 | 3/2004 | Nishizaki et al. |
| 6,704,631 B1 | 3/2004 | Winner et al. |
| 6,718,248 B1 | 4/2004 | Lu |
| 6,719,087 B1 | 4/2004 | Demerly |
| 6,745,624 B1 | 6/2004 | Porter |
| 6,747,553 B1 | 6/2004 | Yamada et al. |
| 6,756,890 B1 | 6/2004 | Schramm et al. |
| 6,784,794 B1 | 8/2004 | McQuade |
| 6,799,092 B1 | 9/2004 | Lu |
| 6,816,764 B1 | 11/2004 | Coelingh et al. |
| 6,834,218 B1 | 12/2004 | Meyers et al. |
| 2002/0109310 A1 | 8/2002 | Lim |
| 2003/0055549 A1 | 3/2003 | Barta et al. |
| 2003/0109939 A1 | 6/2003 | Burgdorf et al. |
| 2003/0171865 A1 | 9/2003 | Moser |
| 2003/0182025 A1 | 9/2003 | Tseng et al. |
| 2004/0019418 A1 | 1/2004 | Lu |
| 2004/0026158 A1 | 2/2004 | Rieth et al. |
| 2004/0078131 A1 | 4/2004 | Faye |
| 2004/0119335 A1 | 6/2004 | Szabo et al. |
| 2004/0158368 A1 | 8/2004 | Haas |

FOREIGN PATENT DOCUMENTS

| | | |
|---|---|---|
| EP | 0 662 601 | 7/1995 |
| EP | 1 046 571 | 4/2000 |
| EP | 1 197 409 | 9/2001 |
| GB | 2257403 | 1/1993 |
| GB | 2 342 078 | 4/2000 |
| JP | 11321603 | 11/1999 |
| SU | 816849 | 3/1981 |
| WO | WO 02/20318 | 3/2002 |

OTHER PUBLICATIONS

Eger, R., Majjad, R., Naser, N., "Rollover simulation based on a nonlinear model", SAE 98020.

Nalecz, A.G., Bindernann, A.C., Brewer H.K., "Dynamic analysis of vehicle rollover", 12th International Conference on Experimental Safety Vehicles, Goteborg, Sweden, May 29-Jun. 1, 1989.

Niii, N., Nishijima, Y., Nakagaw, K., "rollover analysis method of a large-size bus", JSAE 9540020, 1995.

Eger, R., Kiencke, U., "Modeling of rollover sequences", Control Engineering Practice 11 (2003) 209-216.

Chen, Bo-Chiuan, Peng, Huei; "A Real-time Rollover Threat Index for Sports Utility Vehicles", Proceedings of the American Control Conference, San Diego, CA, Jun. 1999.

* cited by examiner

```
                                                              ┌─ PID_ACTIVE [FL] (boolean)
                                                              ├─ PID_ACTIVE [FR] (boolean)
                                                              ├─ PID_STABLZ_PRESSURE [FL] (bar)
                                                              ├─ PID_STABLZ_PRESSURE [FR] (bar)
                                                              ├─ RECENT_AYC_CNTRL_EVENT (boolean)
                                                              ├─ RECENT_PID_CNTRL_EVENT (boolean)
                                                              ├─ INCREASE_REQUESTED_PRESSURE [FL] (boolean) OUTPUT
                                                              └─ INCREASE_REQUESTED_PRESSURE [FR] (boolean) OUTPUT
```

Inputs to PID Controller (78):

- 300 — CG_FLT_LAT_ACC (m/s/s)
- 302 — FLT_ROLL_RATE (deg/s)
- 304 — ROLL_ACCELERATION (deg/s/s)
- 306 — ROLL_ANGLE_TOTAL (deg/s/s)
- 308 — REFERENCE_BANK_ANGLE (deg)
- 312 — BRAKE_PRESSR_ESTMT [FL] (bar)
- 314 — BRAKE_PRESSR_ESTMT [FR] (bar)
- 316 — DRIVER_REQ_PRESSURE (bar)
- 318 — RSC_REFERENCE_VELOCITY (m/s)
- 320 — SLIP_RATIO [FL] (%)
- 322 — SLIP_RATIO [FR] (%)
- 324 — RIGHT_TO_LEFT_TRANSITION (boolean)
- 326 — LEFT_TO_RIGHT_TRANSITION (boolean)
- 328 — DRIVER_BRAKING_FLAG (boolean)
- 330 — RSC_DISABLED (boolean)
- 332 — REVERSE_MOVEMENT (bolean)
- 334 — STATUS_FIRST_RUN (boolean)
- 336 — RSC_IN_CYCL (boolean)
- 338 — AYC_IN_CYCLE (boolean)
- ROLL Signal for Control Outputs:
- 350 — PID_ACTIVE [FL] (boolean)
- 352 — PID_ACTIVE [FR] (boolean)
- 354 — PID_STABLZ_PRESSURE [FL] (bar)
- 356 — PID_STABLZ_PRESSURE [FR] (bar)
- 358 — RECENT_AYC_CNTRL_EVENT (boolean)
- 360 — RECENT_PID_CNTRL_EVENT (boolean)
- 362 — INCREASE_REQUESTED_PRESSURE [FL] (boolean) OUTPUT
- 364 — INCREASE_REQUESTED_PRESSURE [FR] (boolean) OUTPUT

FIG.8

SYSTEM AND METHOD FOR OPERATING A ROLLOVER CONTROL SYSTEM DURING AN ELEVATED CONDITION

RELATED APPLICATIONS

The present application is a Divisional of U.S. patent application Ser. No. 10/628,484 filed Jul. 28, 2003, now abandoned, and claims priority to U.S. provisional applications 60/401,416 and 60/401,464 both filed Aug. 5, 2002, and is related to U.S. patent application Ser. Nos. 10/628,685 and 10/628,632 both filed Jul. 28, 2003, the disclosures of which are incorporated by reference herein.

TECHNICAL FIELD

The present invention relates generally to a control apparatus for controlling a system of an automotive vehicle in response to sensed dynamic behavior, and more specifically, to a method and apparatus for adjusting the activation based on heightened vehicle operating conditions.

BACKGROUND

Dynamic control systems for automotive vehicles have recently begun to be offered on various products. Dynamic control systems typically control the yaw of the vehicle by controlling the braking effort at the various wheels of the vehicle. Yaw control systems typically compare the desired direction of the vehicle based upon the steering wheel angle and the direction of travel. By regulating the amount of braking at each corner of the vehicle, the desired direction of travel may be maintained. Typically, the dynamic control systems do not address rollover (wheels lifting) of the vehicle. For high profile vehicles in particular, it would be desirable to control the rollover characteristic of the vehicle to maintain the vehicle position with respect to the road. That is, it is desirable to maintain contact of each of the four tires of the vehicle on the road.

In vehicle rollover control, it is desired to alter the vehicle attitude such that its motion along the roll direction is prevented from achieving a predetermined limit (rollover limit) with the aid of the actuation from the available active systems such as controllable brake system, steering system and suspension system. Although the vehicle attitude is well defined, direct measurement is usually impossible.

During a potential vehicular rollover event, wheels on one side of the vehicle start lifting, and the roll center of the vehicle shifts to the contact patch of the remaining tires. This shifted roll center increases the roll moment of inertia of the vehicle, and hence reduces the roll acceleration of the vehicle. However, the roll attitude could still increase rapidly. The corresponding roll motion when the vehicle starts side lifting deviates from the roll motion during normal driving conditions.

When the wheels start to lift from the pavement, it is desirable to confirm this condition. This allows the system to make an accurate determination as to the appropriate correction. If wheels are on the ground, or recontact the ground after a lift condition, this also assists with accurate control.

Some systems use position sensors to measure the relative distance between the vehicle body and the vehicle suspension. One drawback to such systems is that the distance from the body to the road must be inferred. This also increases the number of sensors on the vehicle. Other techniques use sensor signals to indirectly detect wheel lifting qualitatively.

One example of a wheel lifting determination can be found in Ford patent U.S. Pat. No. 6,356,188 and U.S. patent application Ser. No. 10/608,909, the disclosures of which are incorporated by reference herein. The system applies a change in torque to the wheels to determine wheel lift. The output from such a wheel lifting determination unit can be used qualitatively. This method is an active determination since the basis of the system relies on changing the torque of the wheels by the application of brakes or the like. In some situations it may be desirable to determine wheel lift without changing the torque of a wheel.

Due to the inevitable dead spots due to the vehicle configuration, wheel lift detection methods may be not able to identify all the conditions where four wheels are absolutely grounded in a timely and accurate fashion. For example, if the torques applied to the wheels have errors, if the vehicle reference computation has errors or there is not enough excitation in the torque provided, the wheel lift detection may provide erroneous information or no information about the roll trending of the vehicle. Wheel lift information may also be safe-guarded by information regarding the vehicle roll angle information from the various sensors.

In certain driving conditions where the vehicle is moving with all four wheels contacting ground and the wheel lift detection does not detect the grounding condition, the roll information derived from the various sensors may be the sole information for identify vehicle roll trending. If in such driving cases, the vehicle experiences very large lateral acceleration and large roll rate, the grounded conditions might be replaced by erroneous lifting conditions. That is, those signals may predict that the vehicle is in a divergent roll event but the actual vehicle is not in a rolling event at all. Such cases include when the vehicle is driven on a mountain road, off-road or banked road, tire compression or an impact may cause a large normal load. The increased normal load causes a force component to be added to the lateral acceleration sensor output. Hence, a larger than 1 g lateral acceleration is obtained but the actual lateral acceleration of the vehicle projected along the road surface might be in 0.6 g range. An off-road driving condition may also be an off-camber driving condition. When a low speed vehicle is driven on an off-camber road with some hard tire compression or impact, the control system may be fooled to activate un-necessarily.

In order to reduce false activations, it would therefore be desirable to provide a rollover detection system that sensitizes and desensitizes the roll control determination.

SUMMARY

The present invention improves the operation of a rollover stability control system (RSC) by controlling the safety device to provide improved performance. One way in which the improvement may be implemented is by controlling or improving the brake pressure prediction to improve the feel and performance time of the system.

In one embodiment, a method of controlling a safety system of a vehicle include determining a roll rate, determining a first control pressure in response to roll rate, determining a roll angle, and determining a second control pressure in response to the roll angle. The method further includes determining a final control pressure in response to the first control pressure and the second control pressure and controlling the safety system in response to the final control pressure.

One advantage of the invention is that some or all of the ways in which to improve the system set forth herein may be used alone or simultaneously to improve the rollover control system.

Other advantages and features of the present invention will become apparent when viewed in light of the detailed description of the preferred embodiment when taken in conjunction with the attached drawings and appended claims.

BRIEF DESCRIPTION OF THE DRAWINGS

FIG. 8 is a detailed block diagram of a PID controller of the present embodiment.

DETAILED DESCRIPTION

Figure 1:
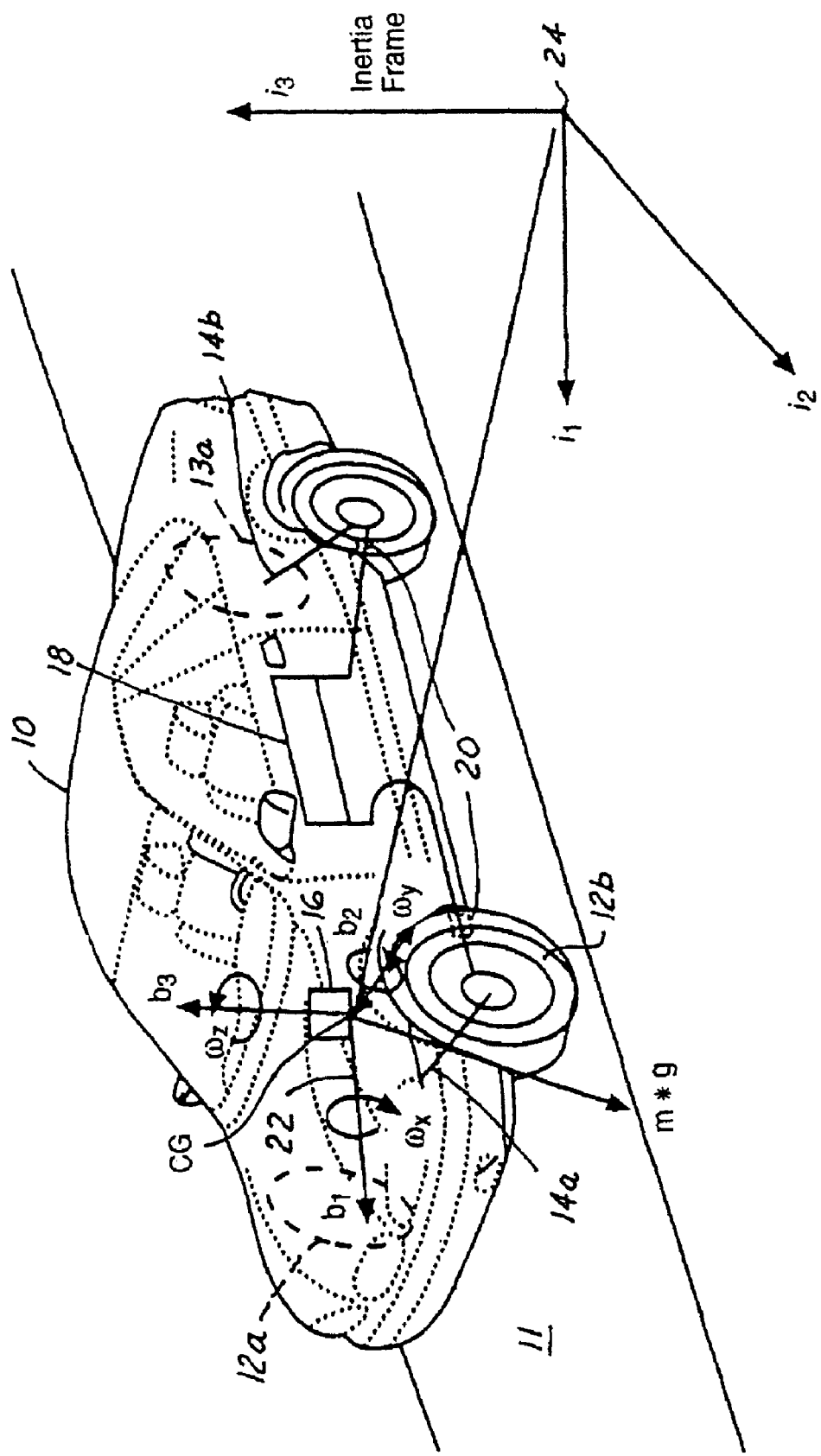
FIG. 1 is a diagrammatic view of a vehicle with variable vectors and coordinator frames.

In the following figures the same reference numerals will be used to identify the same components. The present teachings may be used in conjunction with a yaw control system or a rollover control system for an automotive vehicle. However, the present teachings may also be used with a deployment device such as airbag or roll bar.

Referring to FIG. 1, an automotive vehicle 10 on a road surface 11 with a safety system is illustrated with the various forces and moments thereon. Vehicle 10 has front right and front left tires 12a and 12b and rear right tires and rear left tires 13a and 13b, respectively. The vehicle 10 may also have a number of different types of front steering systems 14a and rear steering systems 14b including having each of the front and rear wheels configured with a respective controllable actuator, the front and rear wheels having a conventional type system in which both of the front wheels are controlled together and both of the rear wheels are controlled together, a system having conventional front steering and independently controllable rear steering for each of the wheels, or vice versa. Generally, the vehicle has a weight represented as Mg at the center of gravity of the vehicle, where g=9.8 m/s$^2$ and M is the total mass of the vehicle.

As mentioned above, the system may also be used with active/semi-active suspension systems, anti-roll bar or other safety devices deployed or activated upon sensing predetermined dynamic conditions of the vehicle.

The sensing system 16 is part of a control system 18. The sensing system 16 may use a standard yaw stability control sensor set (including lateral acceleration sensor, yaw rate sensor, steering angle sensor and wheel speed sensor) together with a roll rate sensor and a longitudinal acceleration sensor. The various sensors will be further described below. The wheel speed sensors 20 are mounted at each corner of the vehicle, and the rest of the sensors of sensing system 16 may be mounted directly on the center of gravity of the vehicle body, along the directions x,y and z shown in FIG. 1. As those skilled in the art will recognize, the frame from $b_1$, $b_2$ and $b_3$ is called a body frame 22, whose origin is located at the center of gravity of the car body, with the $b_1$ corresponding to the x axis pointing forward, $b_2$ corresponding to the y axis pointing off the driving side (to the left), and the $b_3$ corresponding to the z axis pointing upward. The angular rates of the car body are denoted about their respective axes as $\omega_x$ for the roll rate, $\omega_y$ for the pitch rate and $\omega_z$ for the yaw rate. The calculations set forth herein may take place in an inertial frame 24 that may be derived from the body frame 22 as described below.

The angular rate sensors and the acceleration sensors are mounted on the vehicle car body along the body frame directions $b_1$, $b_2$ and $b_3$, which are the x-y-z axes of the vehicle's sprung mass.

The longitudinal acceleration sensor 36 is mounted on the car body located at the center of gravity, with its sensing direction along $b_1$-axis, whose output is denoted as $a_x$. The lateral acceleration sensor 32 is mounted on the car body located at the center of gravity, with its sensing direction along $b_2$-axis, whose output is denoted as $a_y$.

The other frame used in the following discussion includes the road frame, as depicted in FIG. 1. The road frame system $r_1 r_2 r_3$ is fixed on the driven road surface, where the $r_3$ axis is along the average road normal direction computed from the normal directions of the four-tire/road contact patches.

In the following discussion, the Euler angles of the body frame $b_1 b_2 b_3$ with respect to the road frame $r_1 r_2 r_3$ are denoted as $\theta_{xr}, \theta_{yr}$ and $\theta_{zr}$, which are also called the relative Euler angles.

Figure 2:
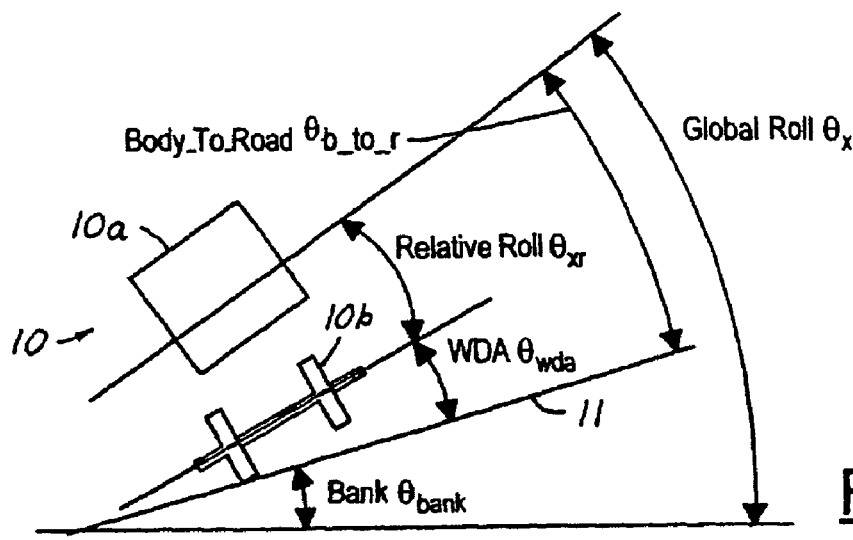
FIG. 2 is an end view of an automotive vehicle on a bank with definitions of various angles including global roll angle, relative roll angle, wheel departure angle (WDA), road bank angle and body-to-road angle.

Referring now to FIG. 2, the relationship of the various angles of the vehicle 10 relative to the road surface 11 is illustrated. One angle is a wheel departure angle $\theta_{wda}$, which is the angle from the axle or the wheel axis to the road surface 11. Also shown is a reference road bank angle $\theta_{bank}$, which is shown relative to the vehicle 10 on a road surface. The vehicle 10 has a vehicle body 10a and vehicle suspension 10b. The relative roll angle $\theta_{xr}$ is the angle between the wheel axle and the body 10a. The global roll angle $\theta_x$ is the angle between the horizontal plane (e.g., at sea level) and the vehicle body 10a.

Figure 3A:
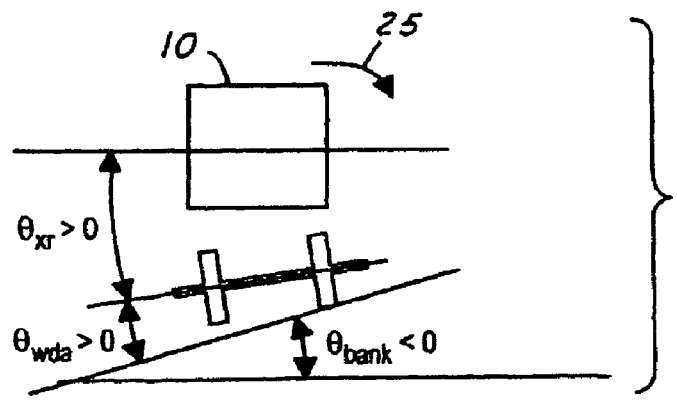
FIG. 3A is an end view of an on-camber divergent vehicle tendency.

Referring now to FIG. 3A, vehicle 10 is illustrated in an on-camber divergent state. The on-camber divergent state refers to the vehicle having a greater than zero wheel departure angle, a greater than zero relative roll angle, and a moment represented by arrow 25 tending to increase the relative roll angle and the wheel departure angle. In this example, the bank angle is less than zero.

Figure 3B:
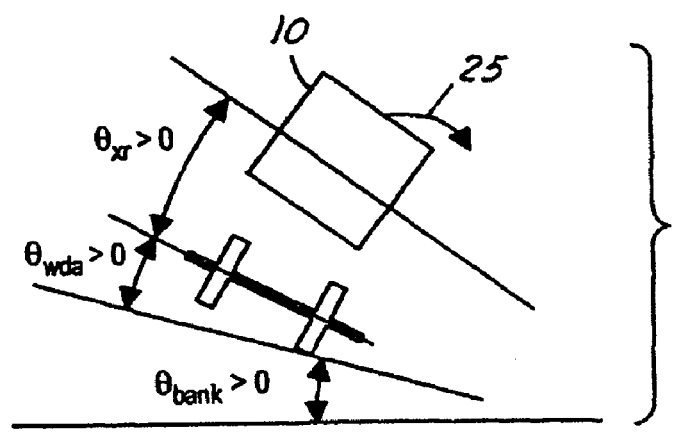
FIG. 3B is an end view of an automotive vehicle in an off-camber divergent condition.

In FIG. 3B, when the bank angle is greater than zero, the wheel departure angle is greater than zero, the relative roll angle is greater than zero and the moment is also to the right or increasing the relative roll angle and the wheel departure angle, the vehicle is in an off-camber divergent state.

Figure 3C:
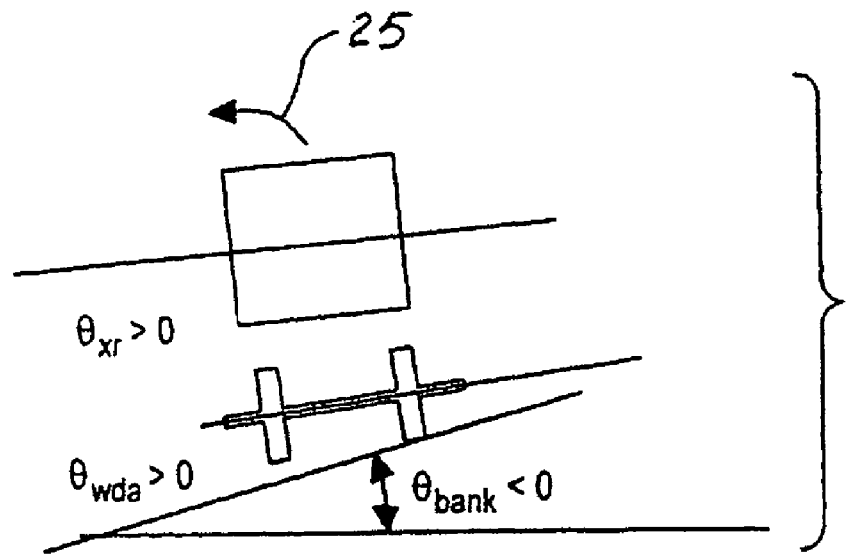
FIG. 3C is an end view of a vehicle in an on-camber convergent condition.

Referring now to FIG. 3C, a bank angle of less than zero, a wheel departure angle greater than zero, and a relative roll angle greater than zero is shown with a roll moment 25 acting to the left. Thus, the vehicle is in an on-camber convergent state. That is, the convergent state refers to the vehicle tending towards not overturning.

Figure 3D:
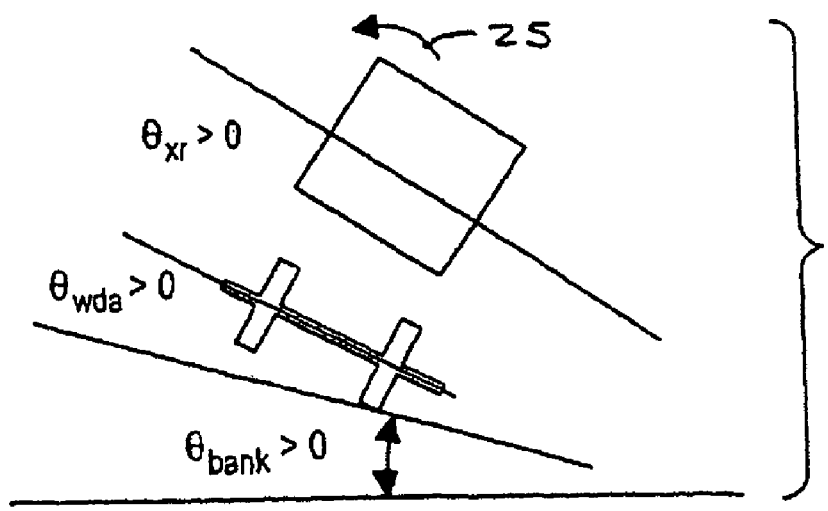
FIG. 3D is an end view of a vehicle in an off-camber convergent condition.

Referring now to FIG. 3D, when the bank angle is greater than 0, the wheel departure angle is greater than zero, and the relative roll angle is greater than zero and the roll moment is tending to the left, the vehicle is in an off-camber convergent state. That is, the vehicle is tending toward not rolling over.

Figure 4A:
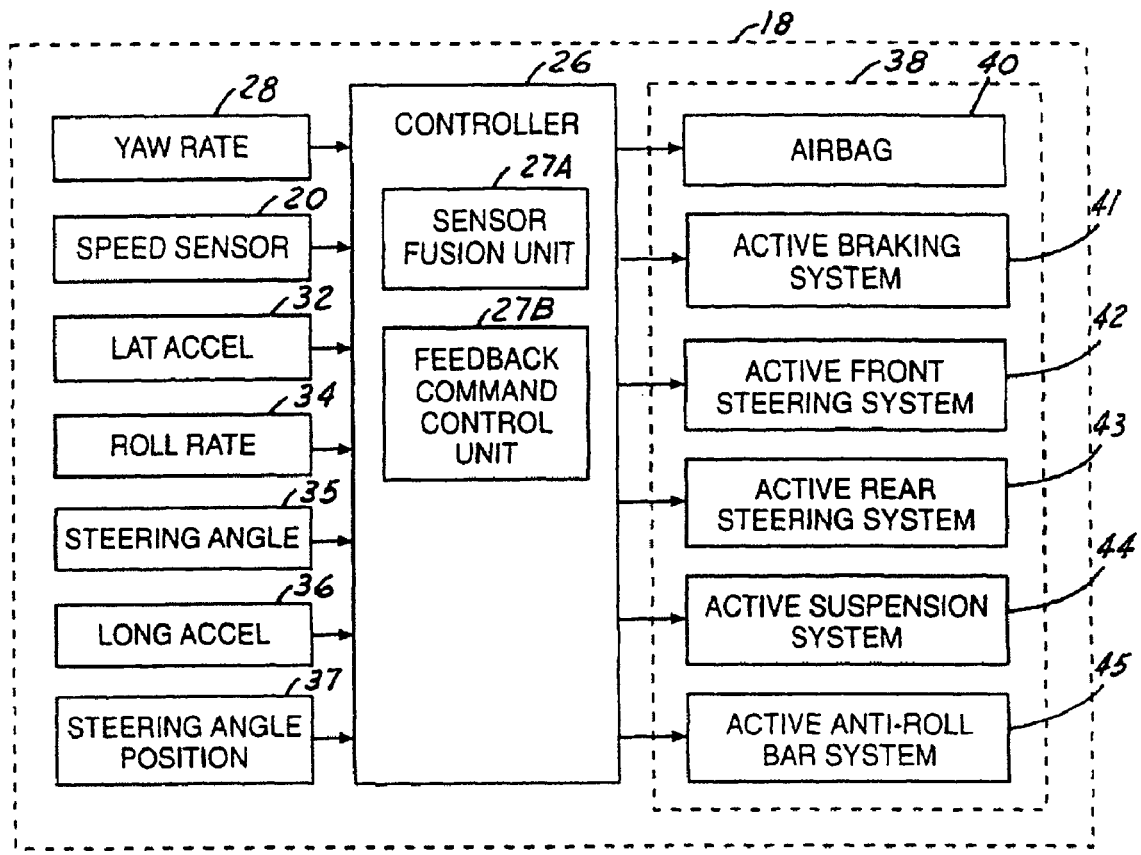
FIG. 4A is a block diagram of a stability control system.

Referring now to FIG. 4A, one embodiment of a roll stability control system 18 is illustrated in further detail having a controller 26 used for receiving information from a number of sensors which may include a yaw rate sensor 28, a speed sensor 20, a lateral acceleration sensor 32, a roll rate sensor 34, a steering angle sensor (hand wheel position) 35, a longitudinal acceleration sensor 36, and steering angle position sensor 37.

In one embodiment, the sensors are located at the center of gravity of the vehicle. Those skilled in the art will recognize that the sensors may also be located off the center of gravity and translated equivalently thereto.

Lateral acceleration, roll orientation and speed may be obtained using a global positioning system (GPS). Based upon inputs from the sensors, controller 26 may control a safety device 38. Depending on the desired sensitivity of the system and various other factors, not all the sensors 20, 28, 32, 34, 35, 36, and 37, or various combinations of the sensors, may be used in a commercial embodiment. Safety device 38 may control an airbag 40, an active braking system 41, an active front steering system 42, an active rear steering system 43, an active suspension system 44, and an active anti-roll bar system 45, or combinations thereof. Each of the systems 40–45 may have their own controllers for activating each one. As mentioned above, the safety system 38 may be at least the active braking system 41.

Roll rate sensor 34 may sense the roll condition of the vehicle based on sensing the height of one or more points on the vehicle relative to the road surface. Sensors that may be used to achieve this include a radar-based proximity sensor, a laser-based proximity sensor and a sonar-based proximity sensor.

Roll rate sensor 34 may also sense the roll condition based on sensing the linear or rotational relative displacement or displacement velocity of one or more of the suspension chassis components which may include a linear height or travel sensor, a rotary height or travel sensor, a wheel speed sensor used to look for a change in velocity, a steering wheel position sensor, a steering wheel velocity sensor and a driver heading command input from an electronic component that may include steer by wire using a hand wheel or joy stick.

The roll condition may also be sensed by sensing the force or torque associated with the loading condition of one or more suspension or chassis components including a pressure transducer in active air suspension, a shock absorber sensor such as a load cell, a strain gauge, the steering system absolute or relative motor load, the steering system pressure of the hydraulic lines, a tire lateral force sensor or sensors, a longitudinal tire force sensor, a vertical tire force sensor or a tire sidewall torsion sensor.

The roll condition of the vehicle may also be established by one or more of the following translational or rotational positions, velocities or accelerations of the vehicle including a roll gyro, the roll rate sensor 34, the yaw rate sensor 28, the lateral acceleration sensor 32, a vertical acceleration sensor, a vehicle longitudinal acceleration sensor, lateral or vertical speed sensor including a wheel-based speed sensor, a radar-based speed sensor, a sonar-based speed sensor, a laser-based speed sensor or an optical-based speed sensor.

Based on the inputs from sensors 20, 28, 32, 34, 35, 36, 37, controller 26 determines a roll condition and controls any one or more of the safety devices 40–45.

Speed sensor 20 may be one of a variety of speed sensors known to those skilled in the art. For example, a suitable speed sensor 20 may include a sensor at every wheel that is averaged by controller 26. The controller 26 translates the wheel speeds into the speed of the vehicle. Yaw rate, steering angle, wheel speed and possibly a slip angle estimate at each wheel may be translated back to the speed of the vehicle at the center of gravity. Various other algorithms are known to those skilled in the art. For example, if speed is determined while speeding up or braking around a corner, the lowest or highest wheel speed may not be used because of its error. Also, a transmission sensor may be used to determine vehicle speed.

Figure 4B:
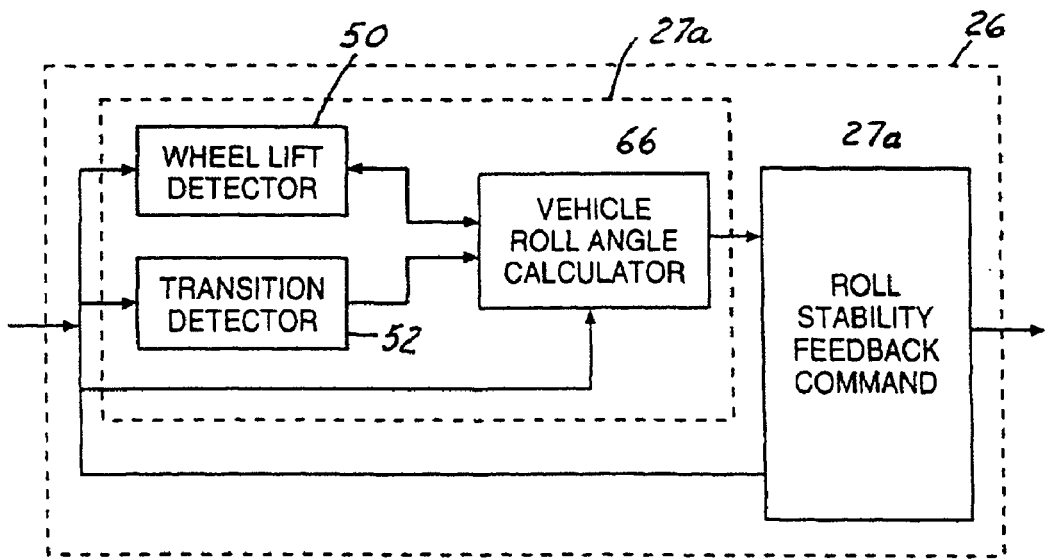
FIG. 4B is a block diagram of the controller 26 used in the stability control system depicted in FIG. 4A.

Referring now to FIGS. 4A and 4B, controller 26 is illustrated in further detail. There are two major functions in controller 26: the rollover trend determination, which is called a sensor fusion unit 27A, and the feedback control command unit 27B. The sensor fusion unit 27A can be further decomposed as a wheel lift detector 50, a transition detector 52 and a vehicle roll angle calculator 66.

Figure 5:
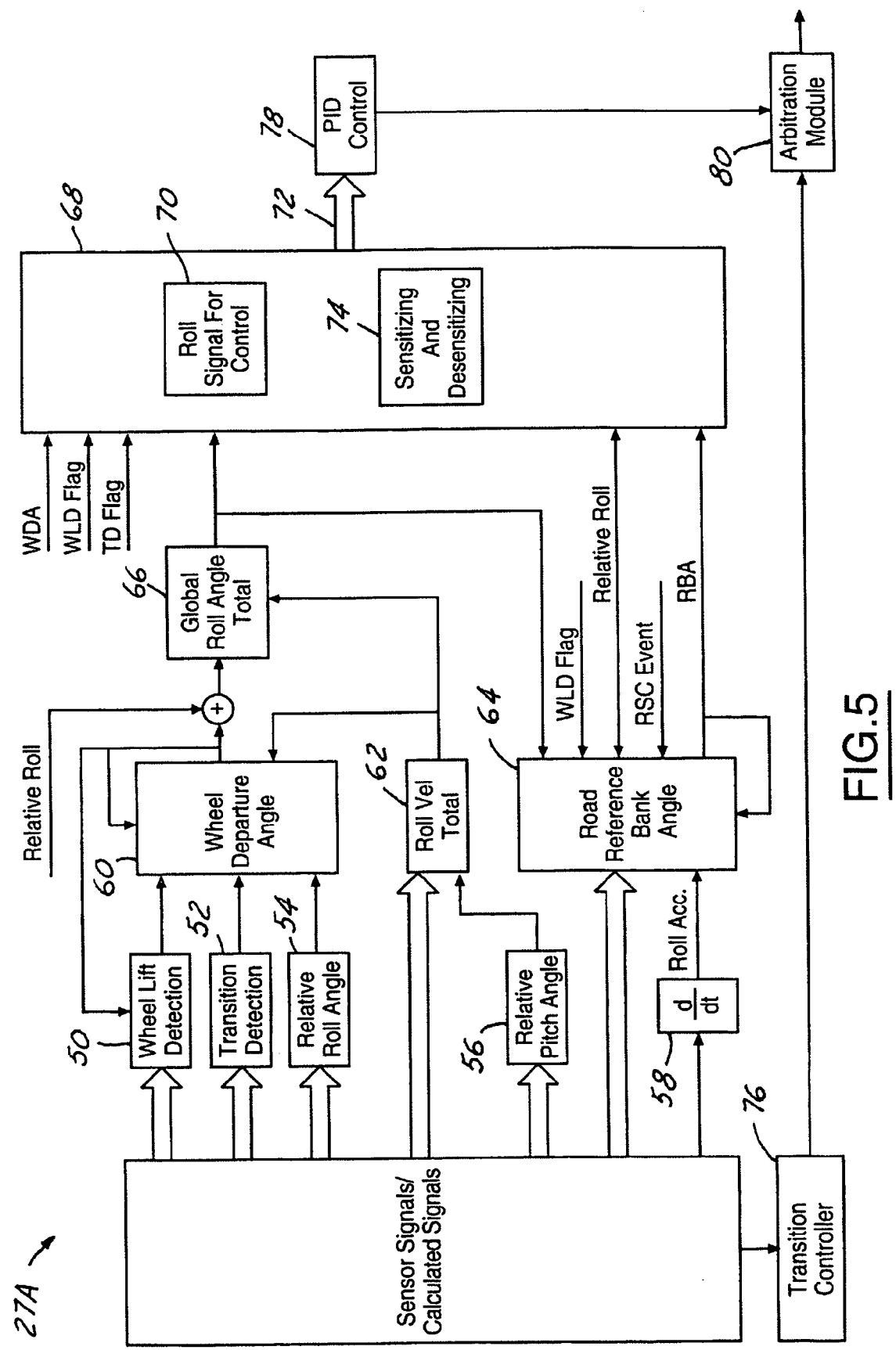
FIG. 5 is a block diagrammatic view of the unit 27 depicted in FIG. 4B, which is used for quantitatively and qualitatively determining rollover trend of a vehicle.

Referring now to FIG. 5, the sensor fusion unit 27A is illustrated in further detail. The sensor fusion unit 27A receives the various sensor signals, 20, 28, 32, 34, 35, 36, 37 and integrates all the sensor signals with the calculated signals to generate signals suitable for roll stability control algorithms. From the various sensor signals wheel lift detection may be determined by the wheel lift detector 50. Wheel lift detector 50 includes both active wheel lift detection and active wheel lift detection, and wheel grounding condition detection. Wheel lift detector is described in co-pending U.S. provisional application Ser. No. 60/400,375 filed Aug. 1, 2002, and U.S. patent application Ser. No. 10/608,909 which are incorporated by reference herein. The modules described below may be implemented in hardware or software in a general purpose computer (microprocessor). From the wheel lift detection module 50, a determination of whether each wheel is absolutely grounded, possibly grounded, possibly lifted, or absolutely lifted may be determined. Transition detection module 52 is used to detect whether the vehicle is experiencing aggressive maneuver due to sudden steering wheel inputs from the driver. The sensors may also be used to determine a relative roll angle in relative roll angle module 54. Relative roll angle may be determined in many ways. One way is to use the roll acceleration module 58 in conjunction with the lateral acceleration sensor. As described above, the ralative roll angle may be determined from the roll conditions described above.

The various sensor signals may also be used to determine a relative pitch angle in relative pitch angle module 56 and a roll acceleration in roll acceleration module 58. The outputs of the wheel lift detection module 50, the transition detection module 52, and the relative roll angle module 54 are used to determine a wheel departure angle in wheel departure angle module 60. Various sensor signals and the relative pitch angle in relative pitch angle module 56 are used to determine a relative velocity total in module 62. The road reference bank angle block 64 determines the bank angle. The relative pitch angle, the roll acceleration, and various other sensor signals as described below are used to determine the road reference bank angle. Other inputs may include a roll stability control event (RSC) and/or the presence of a recent yaw stability control event, and the wheel lifting and/or grounding flags.

The global roll angle of the vehicle is determined in global roll angle module 66. The relative roll angle, the wheel departure angle, and the roll velocity total blocks are all inputs to the global roll angle total module 66. The global roll angle total block determines the global roll angle $\theta_x$. An output module 68 receives the global roll angle total module 66 and the road reference bank angle from the road reference bank angle module 64. A roll signal for control is developed in roll signal module 70. The roll signal for control is illustrated as arrow 72. A sensitizing and desensitizing module 74 may also be included in the output module 68 to adjust the roll signal for control.

In the reference road bank angle module 64, the reference bank angle estimate is calculated. The objective of the reference bank estimate is to track a robust but rough indication of the road bank angle experienced during driving in both stable and highly dynamic situations, and which is in favor for roll stability control. That is, this reference bank angle is adjusted based on the vehicle driving condition and the vehicle roll condition. Most importantly, when compared to the global roll estimate, it is intended to capture the occurrence and physical magnitude of a divergent roll condition (two wheel lift) should it occur. This signal is intended to be used as a comparator against the global roll estimate for calculating the error signal which is fed back to roll stability controller 26.

In parallel with the above a transition controller 76 may implemented as will be further described below. The roll signal for control 72 may be used as an input to a proportional-integral-derivative controller 78. The terminology for the PID controller 78 refers to its functions. However, the function of double derivative may be added and a function such as integral may be used. For clarity the PID controller will be used for the controller even if all of the function proportional, integral or derivative functions are not used or if the double derivative is used. In parallel to the process above, a transitional controller may also be used. The transitional controller 76. One embodiment for example includes just the proportional and derivative functions.

The outputs of controller 76 and the controller 78 are provided to an arbitration module 80, which ultimately controls the safety system. In the present example, the safety system is a hydraulic safety system such as a rollover control system using brakes. The arbitration module 80 may, for example, simply choose the highest brake pressure requested from the transition controller and the PID controller. Of course, a weighting may also be performed.

Figure 6:
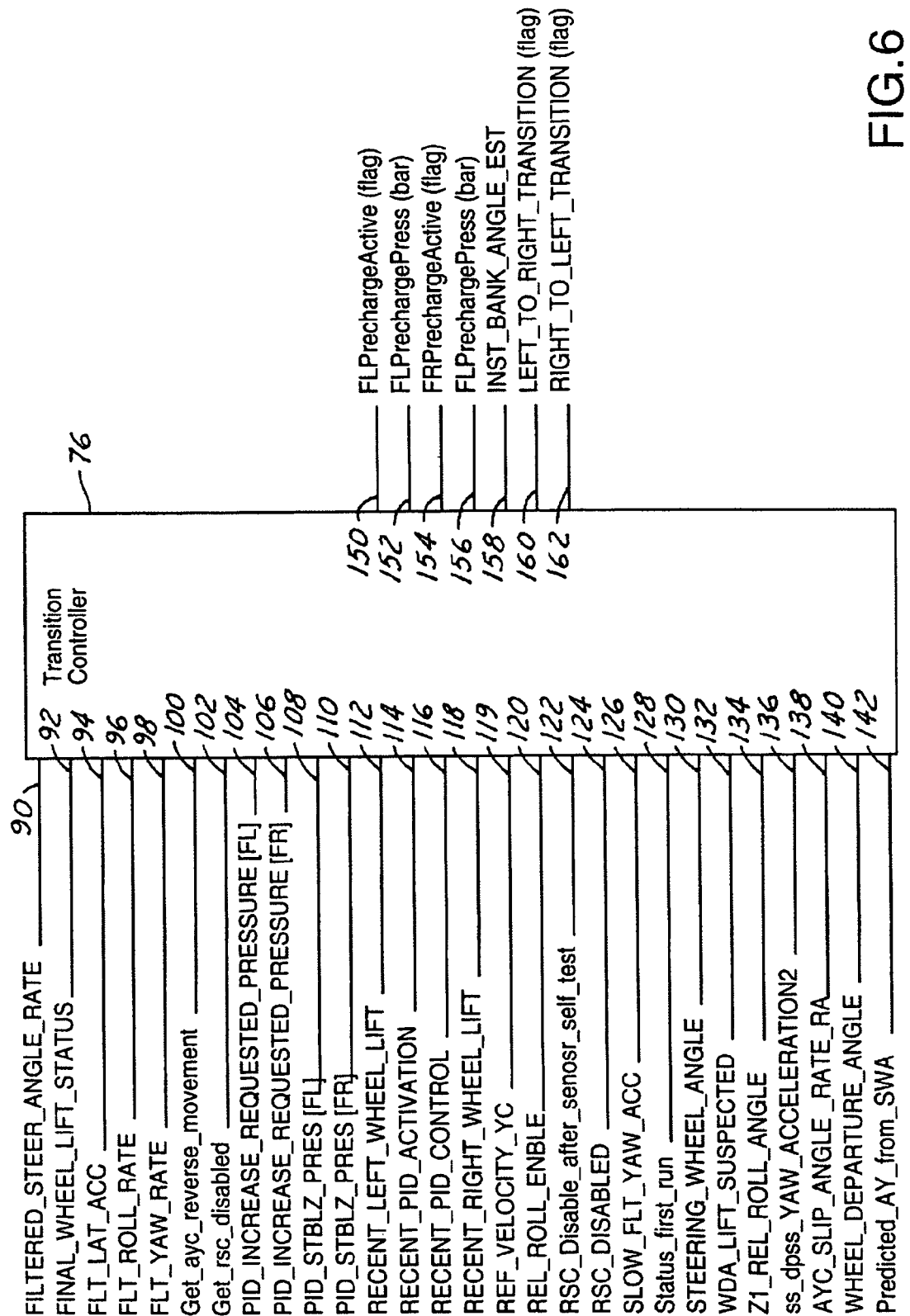
FIG. 6 is a detailed block diagram of a transition controller of the present embodiment.

Referring now to FIG. 6, the operation of the transition controller 76 is described in further detail. In this module, RSC control for the transitional portion of a dynamic maneuver is performed. The transitional portion is the region in which the outputs of the sensors are sill linear. That is, none are saturated. As briefly described below, the transition controller may perform all or some of the following.

Caliper pre-charge functionality. During control interventions requiring maximum pressure build rates, significant delays in pressure builds occur due to the relatively large volume of fluid required to establish caliper pressure in the lower pressure range. The higher volume consumption is due to the air gap between the rotor and linings, as well as the high effective compliance of the brake system at low pressures. The transition controller 76 includes pre-charging functionality to mitigate initial delays in establishing caliper pressure by applying low levels of pressure when steering activity suggests an RSC event is eminent.

Yaw Damping. The under-damped nature of the yaw dynamics of the vehicle can result in yaw rate overshoot in transitional maneuvers. Excessive yaw rate overshoot in limit maneuvers results in excessive side slip angles which can result in lateral forces that significantly exceed the steady state cornering capacity of the vehicle and can significantly reduce the roll stability margin of the vehicle. As a preventative measure, yaw damping may be provided to minimize the occurrence of excessive lateral forces and vehicle side slip angles that might expose the vehicle to excessive lateral forces and tripping mechanisms. The phase of the brake interventions resulting from this module introduces significant yaw damping during aggressive maneuvers. A goal is to provide as much yaw damping as possible without inhibiting the responsiveness of the vehicle or becoming intrusive.

Roll Damping. For sufficiently aggressive transitional maneuvers, the roll momentum can result in a lifting of the center of gravity of the vehicle at the end of the transition and may result in excessive wheel lift. It is an objective of this module to introduce effective roll damping before the occurrence of wheel lift by rounding off the build up lateral force when needed as they approach their peak levels in the final phase of the transition.

Pressure Build Prediction. In addition to the caliper pre-charge functionality, pressure build prediction and actuator delay compensation have been introduced in this module. Limitations in pressure build rates are compensated for by projecting forward when a pre-determined pressure level is likely to be requested, based on the relative roll angle, roll rate, roll acceleration, and estimated caliper pressure. Pressure is built during the transition so that the desired peak pressure can be achieved when it is needed to reduce the effects of limited pressure build rates.

Feed forward control. In this module, steering information, front side slip angle information and relative roll information is used to achieve a feed forward component of control from the point of view of the PID controller 78. Feed forward information is used to build significant pressure where needed to reduce the demands on the PID controller 78 for a given RSC event and to extend the functional envelop of the RSC system. For mild and moderate events, stability performance is achieved with lower levels of PID intervention. In conjunction with feed-forward control, PID control is able to handle more extreme maneuvers than would be possible without feed-forward control for two primary reasons. First, by the time the PID controller 78 has requested intervention, the vehicle will be in a more stable condition due to the feed forward control. Second, when the PID controller 78 does request pressure, significant pressure will already exist in the caliper, allowing the PID controller to achieve the required pressure much more quickly.

Gradient Control. Proportional plus Derivative control is implemented for roll angle and front linear side slip angle in the PID controller 78. For the PID controller 78, relative roll is used for the proportional term, and roll velocity is used for the derivative term. Because relative roll is used, this controller is robust to integration errors that might occur in the total roll estimate. As a result, it is possible to make the transition controller 76 more sensitive than the PID controller without the adverse consequences of integrator drift in the state estimates.

Establish initial conditions for PID controller 78. Because this module is designed to lead the PID control intervention in a given maneuver, PID control can be initiated at significantly higher pressure, requiring less error to achieve the critical pressure required to stabilize the vehicle.

Progressive Pressure Build. The transition controller 76 builds and decreases pressure with a minimum amount of jerk. This supports smooth transparent interventions and reduces the potential for exciting pitch dynamics in the vehicle.

Transparency. The transition controller 76 may also builds pressure in parallel with the transition in lateral acceleration. Because the longitudinal acceleration is building at the same time as the reversal in lateral acceleration, the pitch motion is more in phase with the roll motion, resulting in a coherent body motion. Additionally, because the build up of longitudinal acceleration is much smaller than the change in lateral acceleration, the brake intervention becomes overshadowed by the lateral jerk.

Referring now to FIG. 6, the transition controller 76 includes the following inputs: a filtered steering angle rate (FILTERED_STEER_ANGLE_RATE) input 90, a final wheel lift status (FINAL_WHEEL_LIFT_STATUS) 92, a filtered lateral acceleration (FLT_LAT_ACC) input 94, a filtered roll rate (FLT_ROLL_RATE) input 96, a filtered yaw rate (FLT_YAW_RATE) signal 98, a Get_ayc_reverse_movement input 100, a Get_rsc_disabled input 102, a PID_INCREASE_REQUESTED_PRESSURE[FL] input 104, a PID_INCREASE_REQUESTED_PRESSURE[FR] input 106, a PID_STBLZ_PRES[FL] input 108, a PID_STBLZ_PRES[FR] input 110, a RECENT_LEFT_WHEEL_LIFT input 112, a RECENT_PID_ACTIVATION input 114, a RECENT_PID_CONTROL input 116, a RECENT_RIGHT_WHEEL_LIFT input 118, a REF_VELOCITY_YC input 119, a REL_ROLL_ANGLE input 120, a RSC_Disable_after_sensor_self test input 122, an RSC_DISABLED input 124, a SLOW_FLT_YAW_ACC input 126, a Status_first_run input 128, a STEERING_WHEEL_ANGLE input 130, a WDA_LIFT_SUSPECTED input 132, Z1_REL_ROLL_ANGLE input 134, a ss_dpss_YAW_ACCELERATION2 input 136, a AYC_SLIP_ANGLE_RATE_RA input 138, a WHEEL_DEPARTURE_ANGLE input 140, and a Predicted_AY_from_SWA input 144.

The transition controller 76 has the following outputs FLPrechargeActive (flag) output 150, a FLPrechargePress (bar) output 152, a FRPrechargeActive (flag) output 154, a FRPrechargePress (bar) output 156, an INST_BANK_ANGLE_EST output 158, a LEFT_TO_RIGHT_TRANSITION (flag) output 160, and a RIGHT_TO_LEFT_TRANSITION (flag) output 162.

The transition controller 76 also has predefined calibratable parameters that have the following definitions:

--- scale_LNR_REAR_LATA_FILTER: In the present example a value of 1024.0 unitless was used.
value_LNR_REAR_LATA_LOW_PASS_FILTER_FREQ: In the present example a value of 10.0 Hz was used.
p_ALPHA_LNR_REAR_LATA_FILTER_COEFF: (LOOP_TIME*
   value_LNR_REAR_LATA_LOW_PASS_FILTER_FREQ*
   scale_LNR_REAR_LATA_FILTER )
p_BETA_LNR_REAR_LATA_FILTER_COEFF:
((1.0−(LOOP_TIME*
   value_LNR_REAR_LATA_LOW_PASS_FILTER_FREQ))*
   scale_LNR_REAR_LATA_FILTER )

---

BASE_MATCHING_PRESSURE: In the present example a value of −177.0 bar was used. The matching pressure for the precharge prediction at a mu level of zero.

MATCHING_PRESSURE_MU_GAIN: In the present example a value of 3000 bar/g was used. The gain with which the matching pressure is increased as mu is increased.

EXPECTED_SWA_LEAD_TIME_MU_GAIN: The gain for determining how far in advance the predicted steering wheel angle sign crossing will cause a positive or negative SWA expected flag. In the following example, values 0.4–0.5 sec/g were used.

SpeedDpndntAyChng (linear interpolation function of vehicle speed): The speed dependent threshold for determining if the driver is requesting a rapid change in lateral acceleration. The following table illustrates the numbers used in the present example.

| V(mps) | SpeedDpndntAyChng (mps2/sec) |
|---|---|
| 0 | 33 |
| 17.9 | 33 |
| 22.4 | 30 |
| 26.79 | 25 |
| 31.3 | 16 |
| 83 | 11 |

RECENT_RAPID_AY_TIME: In the present example a value of 150 loops was used. The time in loops for which the recent rapid ay flag is held high after the rate of change of the lateral acceleration requested by the driver exceeds the threshold.

LARGE_ROUGH_MU: In the present example a value of 0.7 g's was used. Large rough mu threshold for determining significant dynamics.

RECENT_LARGE_ROUGH_MU_TIME: In the present example a value of 150 loops was used. The time in loops for which the recent large rough mu flag is held high after the rough mu estimate exceeds a predetermined threshold.

KP_REL_ROLL: In the present example a value of 8.0 bar/deg was used. Proportional pressure gain for relative roll feedback.

KD_REL_ROLL: In the present example a value of 2.0 bar/deg/s was used. Derivative pressure gain for relative roll feedback.

REL_ROLL_DB: In the present example a value of 5.4 deg was used. Deadband for proportional feedback on relative roll.

REL_ROLL_PD_PRESS_FILT: In the present example a value of 1.0/5.0 unitless was used. Filter coefficient used in filtering the relative roll Proportional plus derivative feedback requested pressure.

KP_SS_LIN_FRONT: In the present example a value of 10.0 bar/deg was used. Proportional pressure gain for front linear side slip angle feedback.

KD_SS_LIN_FRONT: In the present example a value of 2.5 bar/deg/s was used. Derivative pressure gain for front linear side slip angle feedback.

FT_CRNRG_CMPLNCE Front cornering compliance: In the present example, values between 6 and 8.18 deg/g were used.

RR_CRNRG_CMPLNCE Rear cornering compliance: In the present example, values between 3 and 5 deg/g were used.

SS_LIN_FRONT_DB: In the present example a value of 8.2 deg/g was used. Deadband for proportional feedback on front linear side slip angle feedback.

SS_LIN_PD_PRESS_FILT: In the present example a value of 1.0/16.0 unitless was used. Filter coefficient used in filtering the front linear side slip angle proportional plus derivative feedback requested pressure.

MAX_PRECHARGE_TIME: In the present example a value of 70 loops was used. Time in loops after which under certain conditions, the precharge pressure is forced down at the maximum rate.

PRECHARGE_BUILD_TIME: In the present example a value of 20 loops was used. Time in loops before which under certain conditions, the precharge pressure is ramped down at the target build rate.

TARGET_BUILD_RATE: In the present example a value of 100.0 bar/sec was used. The target build rate for the precharge strategy while in prediction mode.

LARGE_DYNAMICS_BUILD_RATE: In the present example a value of 250.0 bar/sec was used. The pressure build rate for the precharge strategy when either the relative roll or front linear side slip angle PD pressures exceed the current precharge pressure on a given corner of the vehicle.

VELOCITY_MIN_10: In the present example a value of 10.0 mps was used. Minimum velocity below which the precharge strategy will not be enabled.

ROUGH_MU_HOLD_TIME: In the present example a value of 150 counts was used. The time in loops for which the rough mu estimate will be held high after an increase in value.

ROUGH_MU_RAMP_DOWN_RATE: In the present example a value of 0.2 g's/sec was used. The rate at which the rough mu estimate will be ramped down after the rough mu hold time is exceeded.

BASE_PRESSURE_MU GAIN: In the present example a value of 15.0 bar/g was used. The gain for determining the precharge pressure from rough mu, due to rapid steering input.

RATE_LIMIT_dAY_FROM_SWA: In the present example, values between 70 mps2/s/s; and 140 mps2/s/s were used. The rate limit for the decrease in value of the rate limited signal representing the rate of change of lateral acceleration being requested by the driver.

MIN_FL_REL_ROLL_PD_PRESS: In the present example a value of −320 bar was used. Lower bound for relative roll proportional/derivative pressure.

MAX_FL_REL_ROLL_PD_PRESS: In the present example a value of −320 bar was used. Upper bound for relative roll proportional/derivative pressure.

FAST_PRESS_REDUCTION_RATE: In the present example a value of 200 bar/s was used. The fast pressure reduction rate for the precharge strategy while in prediction mode.

AVG_Steering_Ratio: In the present example a value of 16 deg/deg was used. The ratio of steering to wheel.

Rel_Roll_Vel_FLT_Coeff: In the present example a value of (16) $1/16^{th}$ filter coefficient was used in filtering relative roll velocity.

MIN_REF_VELOCITY_YC: In the present example a value of 0.01 kph was used to prevent divide by 0 when the reference velocity is too small.

lin_frnt_vel_filter_coeff: In the present example a value of (16.0) $1/16^{th}$ filter coefficient was used in filtering linear front velocity.

max_RoughMU: In the present example a value of 1.0 was used. Upper bound for Rough MU upper and lower min_RoughMU: In the present example a value of 0.1 was used. Lower bound for Rough MU upper and lower MAX_THRESHOLD_FOR_PREDICTED_POS_SWA: In the present example a value of −90 degrees was used. SWA threshold for predicting crossover to the left.

MIN_THRESHOLD_FOR_PREDICTED_POS_SWA: In the present example a value of 90 degrees was used. SWA threshold for predicting crossover to the right.

MIN_POS_SWA_THRESHOLD: In the present example a value of 0.1 degree was used. The SWA threshold for predicting crossover to the left.

MAX_POS_SWA_THRESHOLD: In the present example a value of −0.1 degree was used. The SWA threshold for predicting crossover to the right.

FRNT_SLIP_ANGLE_THRESHOLD_POS_SIG_DYN: In the present example a value of 0.4 Force threshold was used in setting Significant_Dynamics flag.

VELOCITY_MIN_TO_EXIT_7: In the present example a value of 7.0 m/s was used. Lower bound on longitudinal velocity for setting ENABLE_RSC_PRECHARGE flag.

MIN_SLIP_ANGLE_FOR_PRCHG_ACT: In the present example a value of 0.1 degrees was used. Minimum slip angle for precharge_active flags.

TRANSITION_AY_THRESHOLD: In the present example a value of 0.5 G's was used. Lateral acceleration threshold to initiate moderate ay counters.

TRANSITION_HOLD_TIME: In the present example a value of 100 loops was used. Initial value for moderate ay counters.

VHCL_MASS: In the present example a value of 3033.0 kg was used. Vehicle mass.

CG_TO_RR_AXLE: In the present example a value of 1.471 m was used. Distance from vehicle center of gravity to rear axle.

CG_TO_FRT_AXLE: In the present example a value of 1.546 m was used. Distance from vehicle center of gravity to front axle.

AY_SNSR_TO_RR_AXLE: In the present example a value of −1.791 m was used. Distance from ay sensor to rear axle.

WHEEL_BASE (CG_TO_FRT_AXLE +CG_TO_RR_AXLE)

AY_TO_CG (CG_TO_RR_AXLE +AY_SNSR_TO_RR_AXLE)

YAW_MMT_INERTIA: In the present example a value of 6303.5 kg-m/s^2 was used. Moment of inertia about the Z axis.

G_TO_MPS2: In the present example a value of 9.81 m/s^2/G was used. Convert from G's to m/s^2.

value_MAX_ANGLE (45.0 degrees): Upper limit for the estimate of the instantaneous bank angle MAX_ANGLE (value_MAX_ANGLE/deg RES_ROLL_ANGLE)

ss_RES_dAYFromSWA: In the present example a value of 0.004375 was used. Scaling for dAYFromSWA.

MIN_dAY_FROM_SWA: In the present example a value of −100.00/ss_RES_dAYFromSWA was used. Lower limit for dAYFromSWA.

MAX_dAY_FROM_SWA: In the present example a value of 100.00/ss_RES_dAYFromSWA was used. Upper limit for dAYFromSWA.

LARGE_SWA_RATE_THRESH: In the present example a value of 700 deg/s was used. Threshold to reset recent large swa rate timers.

RECENT_WHEEL_LIFT_TIME: In the present example a value of 1/looptime was used. Initial value for recent wheel lift timers.

rpss_RES_YAW_ACC (dpss_RES_YAW_ACC*pc_DEG_TO_RAD): Scaling for yaw acceleration in radians.

MIN_dAY_FROM_YAW_ACC: In the present example a value of −100.0/ss_RES_dAYFromSWA was used. Lower limit for ssDAyFromYawAcc.

MAX_dAY_FROM_YAW_ACC: In the present example a value of 100.00/ss_RES_dAYFromSWA was used. Upper limit for ssDAyFromYawAcc.

p_dpg_RR_CRNRG_CMPLNCE: In the present example a value of 4.68 deg/g U228 was used. Rear cornering compliance.

dps_RES_BETA_PRIME (rps_RES_YAW_RATE*pc_RAD_TO_DEG): Scaling for ssDAyFromBetaPRA.

MIN_dAY_FROM_BETAPRA: In the present example a value of −140.0/ss_RES_dAYFromSWA was used. Lower limit for ssDAyFromBetaPRA.

MAX_dAY_FROM_BETAPRA: In the present example a value of 140.0/ss_RES_dAYFromSWA was used. Upper limit for ssDAyFromBetaPRA.

YawAcc2SWARate_x_tab: In the present example a value of {0, 30, 50, 70, 203} MPH was used. X interpolation table for ssYawAcc2SWARateFraction.

YawAcc2SWARate_y_tab: In the present example a value of {0.66, 0.66, 0.60, 0.50, 0.50} fraction was used. Y interpolation table for ssYawAcc2SWARateFraction.

YawAcc2SWARate_len: In the present example a value of 5 unitless was used. The number of entries in the interpolation tables for ssYawAcc2SWARateFraction.

BetaDotRA2SWARate_x_tab: In the present example a value of {0, 30, 50, 203} MPH was used. X interpolation table for ssBetaDotRA2SWARateFraction.

BetaDotRA2SWARate_y_tab: In the present example a value of {0.35, 0.35, 0.50, 0.50} fraction was used. Y interpolation table for ssBetaDotRA2SWARateFraction.

BetaDotRA2SWARate_len: In the present example a value of 4 unitless was used. The number of entries in the interpolation tables for ssBetaDotRA2SWARateFraction.

Build_rate_x_tab: In the present example a value of {0, 30, 50, max} mps2/sec was used. X lookup table for build rate.

Build_rate_y_tab: In the present example a value of {100, 100, 250, 250} bar/sec was used. Y lookup table for build rate.

Build_rate_tab_len: In the present example a value of 4 unitless was used. Length of build rate lookup tables for interpolation.

FRNT_SLIP_ANGLE_THRESHOLD_POS_SIG_DYN: In the present example a value of 0.4 G was used. Threshold for Front linear slip angle.

MIN_MATCH_PRESS_2_PD_PRESS_DELTA: In the present example a value of 1.0 bar was used. Lower limit on PDRelRollMatchPressDelta.

MIN_INST_BUILD_RATE: In the present example a value of 100.0 bar was used. Minimum for InstRelRoll-BuildRate.

MAX_INST_BUILD_RATE: In the present example a value of 300.0 bar was used. Maximum for InstRelRoll-BuildRate.

TARGET_DUMP_RATE: In the present example a value of 150 bar/s was used. Rate for reducing pressure.

UPPER_BOUND_ON_TIME_FOR_DETECTION: In the present example a value of 0.400 was used. Upper bound in time for increasing swa detection.

YAW_RATE_PD_PRESS_FILT: In the present example a value of 1.0/16.0 was used. Corresponds to roughly 2 Hz cutoff.

AY_FROM_SWA_THRESH_FOR_DIRECTION_CHANGE: In the present example a value of 0.5 g was used. Sign dependent threshold used in the first set of conditions that must exist to disable the yaw rate PD controller from increasing final requested pressure—when the magnitude of predicted lateral acceleration from steering wheel angle drops below this threshold.

TIME_FOR_DETECTING_SWA_DIRECTION_CHANGE: In the present example a value of 0.020 sec was used. Minimum contiguous time used to indicate a steering wheel direction change—used as the second set of conditions to disable the yaw rate PD controller from increasing final requested pressure.

SWA_VEL_FOR_DETECTING_SWA_DIRECTION_CHANGE: In the present example a value of 400 deg/s was used. Sign dependent steering velocity threshold which is multiplied by parameter TIME_FOR_DETECTING_SWA_DIRECTION_CHANGE to define the minimum change required in steering wheel angle magnitude, defining the third condition that must be met before disabling the yaw rate PD controller.

Rsc_kp_yaw_rate Yaw Rate Controller Kp

Rsc_kd_yaw_rate Yaw Rate Controller Kd

Figure 7:
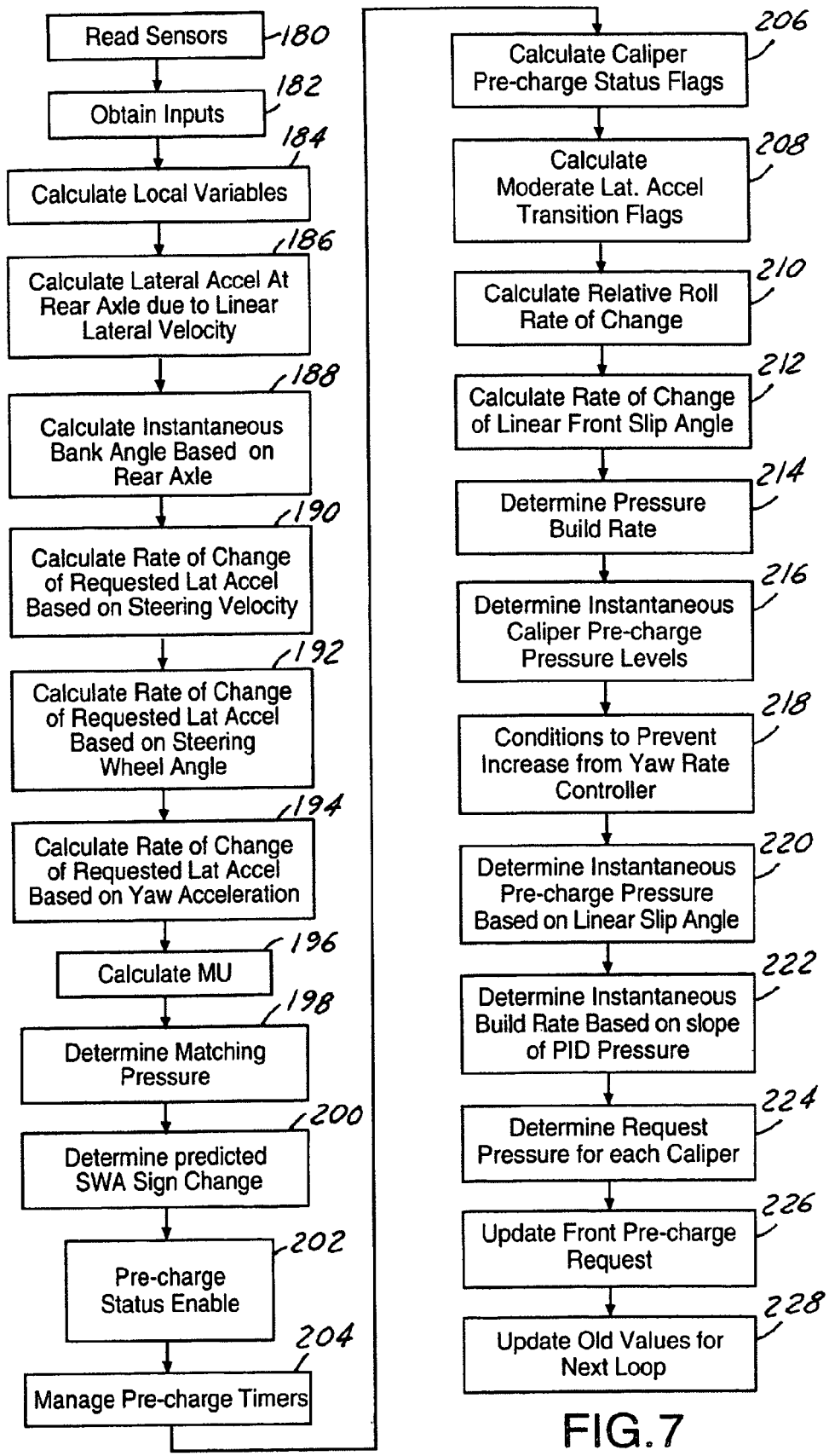
FIG. 7 is flow chart of the operation of one embodiment of the transition controller.

Referring now to FIG. 7, a flowchart of one embodiment of the operation of the transition controller 76 is illustrated. It should be noted that not all steps may be included in an actual embodiment. Further, the parameters and constants are set forth by way of example and are not meant to be limiting. In step 180, the various sensors described above are read. In step 182 various inputs from other sensors are obtained. These inputs correspond to inputs 90–142 of FIG. 6. In step 184 the local variables described above are obtained. These local variables include the lateral force, slip angle and lateral velocity at the front axle. These are determined as follows:

```
FrontLatForce=((VHCL_MASS*CG_TO_RR_AXLE/WHEEL_BASE)
  *FLT_LAT_ACC)
    +(SLOW_FLT_YAW_ACC*((VHCL_MASS*CG_TO_RR_AXLE
      *AY_TO_CG)
    +YAW_MMT_INERTIA)/(WHEEL_BASE);
FrontLnrSlipAngle=-FrontLatForce*(FT_CRNRG_CMPLNCE
  *WHEEL_BASE)/(VHCL_MASS*CG_TO_RR_AXLE*G_TO_
  MPS2);
CurrentFrontLnrLatVel=FrontLnrSlipAngle*REF_
  VELOCITY_YC;
```

Also the lateral force, slip angle and lateral velocity at the rear axle are determined as follows:

```
RearLatAcc=FLT_LAT_ACC+(SLOW_FLT_YAW_ACC*
  AY_SNSR_TO_RR_AXLE);
RearLatForce=(VHCL_MASS*(CG_TO_FRT_AXLE/
  WHEEL_BASE)
    *FLT_LAT_ACC)+(SLOW_FLT_YAW_ACC*((VHCL_MASS*
    CG_TO_FRT_AXLE*AY_TO_CG)-YAW_MMT_INERTIA)
    /WHEEL_BASE;
RearLnrSlipAngle=(-1)*RearLatForce*(RR_CRNRG_
  CMPLNCE*WHEEL_BASE)/(VHCL_MASS*
  CG_TO_FRT_AXLE
  *G_TO_MPS2);
CurrentRearLnrLatVel=RearLnrSlipAngle*REF_VELOCITY_
  YC;
```

In step 186 the component of the lateral acceleration at the rear axle due to the change in linear lateral velocity at the rear axle is calculated as follows:

```
RearLnrLatAcc=(CurrentRearLnrLatVel-REAR_LNR_
    LAT_VEL)/LOOP_TIME;
FltRearLnrLatA=ALPHA_LNR_REAR_LATA_FILTER_COEFF*
    RearLnrLatAcc+BETA_LNR_REAR_LATA_FILTER_
    COEFF*REAR_LNR_LAT_ACC;
```

In step 188 the instantaneous bank angle based on rear axle information is determined as follows:

```
SineOfInstBnkAngle=((RearLatAcc-FltRearLnrLatA)
    -(FLT_YAW_RATE*REF_VELOCITY_YC))*MPS2_TO_G;
//Limit magnitude of Bank.Angle to 45 degrees if
    (SineOfInstBnkAngle<=-SCALED_ASIN_INPUT_LIMIT)
    INST_BANK_ANGLE_EST = -1.0 * MAX_ANGLE;
else if (SineOfInstBnkAngle>=SCALED_ASIN_INPUT_
    LIMIT)INST_BANK_ANGLE_EST= MAX_ANGLE;
else INST_BANK_ANGLE_EST=
COMPUTE_ARC_SINE_OF_INPUT
(SineOfInstBnkAngle);
```

In step 190 the rate of change of requested lateral acceleration based on steering velocity is determined. A product of the steering velocity multiplied by the steering gain of the vehicle is obtained, where the steering gain is defined as the ratio of the lateral acceleration to steering wheel angle in a steady state turn. This gain is expressed as a function of speed. The product is passed through a low pass filter to achieve the resultant rate of change of lateral acceleration being requested by the driver. This signal is used to help define the strength of the transition being requested by the driver. This determined in the flowing:

```
temp_For_SWA=REF_VELOCITY_YC*REF_VELOCITY_YC/
    (RAD_TO_DEG*WHEEL_BASE*G_TO_MPS2);
K_SWA_TO_AY=temp_For_SWA*G_TO_MPS2/
(1+temp_For_SWA
    *(FT_CRNRG_CMPLNCE-RR_CRNRG_CMPLNCE));
dAYFromSWA=LIMIT(FILTERED_STEER_ANGLE_RATE*K_S
    WA_TO_AY/AVG_Steering_Ratio, min_dAY_from_SWA,
    max_dAY_from_SWA);
```

In step 192 a rate limited lateral acceleration from steering wheel angle dAYfromSWA is determined. The delay factor in the response of the power steering system may cause the system to have to catch-up to the pressure desired by the vehicle operator. For very aggressive steering inputs, power steering catch-up can cause a significant reduction in steering velocity for up to 200 ms. This can cause an interruption in pressure build when it is needed most. To prevent this, rate limited versions of dAYfromSWA are implemented for both the positive and negative directions. Each signal is allowed to increase in value as rapidly as the input signal. However, the decrease in value is rate limited by RATE_LIMIT_dAY_FROM_SWA. Both signals are limited to positive values and represent the magnitude of the rate of change in the positive and negative direction respectively. This is determined as follows:

```
if(dAYFromSWA>POSRateLimiteddAYFromSWA)POSRate
    LimiteddAYFromSWA=dAYFromSWA;
else
    {
    POSRateLimiteddAYFromSWA-=RATE_LIMIT_dAY_
        FROM_SWA*LOOPTIME;
    if(POSRateLimiteddAYFromSWA<dAYFromSWA)POSRate
        LimiteddAYFromSWA=dAYFromSWA;
    }
POSRateLimiteddAYFromSWA=MAX(0,POSRateLimited
    dAYFromSWA);
if(-
dAYFromSWA>NEGRateLimiteddAYFromSWA)NEGRateLimited
    dAYFromSWA=-dAYFromSWA;
else
    {
    NEGRateLimiteddAYFromSWA-=RATE_LIMIT_dAY_
        FROM_SWA*LOOPTIME;
    if(NEGRateLimiteddAYFrornSWA<(-1*dAYFromSWA))
        NEGRateLimiteddAYFromSWA=-1*dAYFromSWA;
    }
NEGRateLimiteddAYFromSWA=MAX(0,NEGRateLimiteddAY
    FromSWA);
```

In step 194 a change in lateral acceleration from yaw acceleration dAYfromYawAcc and a change in lateral acceleration from the rate of change of the side slip at the rear axle in dayFromBetaPRA is determined. Each signal is allowed to increase in value as rapidly as the input signal. These signals are scaled to provide a similar profile to DAyFromSWA. Final max and min DAyDt's are calculated by comparing dAYfromYawAccScldToSWA, dAyFromBetaPRAScldToSWA, and dAYFromSWA. These DayDt's can be positive or negative. Max and min rate limited DayDt's are calculated by comparing dAYfromYawAccScldToSWA, dAyFromBetaPRAScldToSWA, and rate limited DAyFromSWA's. These rate limited DayDt's are always positive. They are calculated as follows:

```
ssDAyFromYawAcc=LIMIT((ss_dpss_YAW_ACCELERATION2
    *ss_mps_REF_VELOCITY_YC/(ss_RES_dAYFromSWA/
    (rpss_RES_YAW_ACC*mps_RES_REF_VELOCITY_YC))),
    MIN_dAY_FROM_YAW_ACC,
    MAX_dAY_FROM_YAW_ACC);
ssDAyFromBetaPRA =LIMIT((AYC_SLIP_ANGLE_RATE_RA
    *(1024.0)/ ((ss_RES_DayFromSWA*p_dpg_RR_
    CRNRG_CMPLNCE*1024.0)/(dps_RES_BETA_PRIME
    *PC_G_TO_MPS2))), MIN_dAY_FROM_BETAPRA,
    MAX_dAY_FROM_BETAPRA);
ssYawAcc2SWARateFraction=AYC_INTPOL2(ss_mps_REF_
    VELOCITY_YC, YawAcc2SWARate_x_tab,YawAcc2SWA
    Rate_y_tab, YawAcc2SWARate_len);
ssBetaDotRA2SWARateFraction=AYC_INTPOL2(ss_mps_REF_
    VELOCITY_YC, BetaDotRA2SWARate_x_tab,
    BetaDotRA2SWARate_Y_tab, BetaDotRA2SWARate
    len);
ssDAyFrmYwAccScldToSWA=ssDAyFromYawAcc*ssYawAcc2
    SWARateFraction/(1024.0);
ssDAyFrmBetaPScldToSWA=ssDAyFromBetaPRA*ssBetaDot
    RA2SWARateFraction/(1024.0);
ssFinalMaxDAyDt=max(dAYFromSWA, ssDAyFrmYwAccScld
    ToSWA);
ssFinalMaxDAyDt=max(ssFinalMaxDAyDt, ssDAyFrmBeta
    PScldTOSWA);
ssFinalMaxRtLmtdDAyDt=max(POSRateLimiteddAYFromSWA,
    ssDAyFrmYwAccScldToSWA); ssFinalMaxRtLmtdDAy
    Dt=max(ssFinalMaxRtLmtdDAyDt,ssDAyFrmBetaPScld
    ToSWA);
ssFinalMinDAyDt=min(dAYFromSWA, ssDAyFrmYwAccScld
```

```
    ToSWA);
ssFinalMinDAyDt=min(ssFinalMinDAyDt, ssDAyFrmBeta
    PScldToSWA);
/*Since NEGRateLimiteddAYFromSWA is limited to
positive values, use MAX of negated DAy's derived
from YawAcc and BetaP*/
ssFinalMinRtLmtdDAyDt=max(NEGRateLimiteddAYFromSWA,
    ((-1)*ssDAyFrmYwAccScldToSWA));
ssFinalMinRtLmtdDAyDt=max(ssFinalMinRtLmtdDAyDt,
    ((-1)*ssDAyFrmBetaPScldToSWA));
```

In step 196 a rough estimate of the mu level of the road surface is determined. The primary objective is not precise estimation of the mu level (although one could be used), but an indication of the lateral forces expected to be experienced after the transition. The Rough MU estimate is allowed to increase with the magnitude of the lateral acceleration. The value is held high for the period ROUGH_MU_HOLD_TIME following any loop in which the Rough MU estimate is increased by the lateral acceleration. Then it is allowed to ramp down at a predefined ramp rate. The important property for this calculation is that it preserves for the duration of the event, the lateral forces experienced immediately before the transition. This information is then used as a predictor of what the forces are likely to be seen after the transition. This is in turn used to determine the pressure build profile during the transition. The Rough MU signals are bounded between 1.0 and 0.1.

A Rough MU Upper is determined by:

```
if(FLT_LAT_ACC> RoughMUUpper*G_TO_MPS2)
    {
    ROUGH_MU_UPPER_TIMER=0;
    RoughMUUpper=FLT_LAT_ACC/G_TO_MPS2;
    }
else
    {
    if(ROUGH_MU_UPPER_TIMER<ROUGH_MU_HOLD_TIME)
        ROUGH_MU_UPPER_TIMER++;
    else ss_RoughMUUpper-=ROUGH_MU_RAMP_DOWN_
        RATE*LOOP_TIME);
    }
if (RoughMUUpper>max_RoughMU)RoughMUUpper=max_
    RoughMU;
if (RoughMUUpper<min_RoughMU)RoughMUUpper
    =min_RoughMU;
```

A Rough MU Lower is determined by:

```
if(-FLT_LAT_ACC>RoughMULower*G_TO_MPS2)
    {
    ROUGH_MU_LOWER=0;
    RoughMULower=-FLT_LAT_ACC/G_TO_MPS2;
    }
else
    {
    if(ROUGH_MU_LOWER_TIMER<ROUGH_MU_HOLD_TIME)
        ROUGH_MU_LOWER_TIMER++;
    else ss_RoughMULower-=(ROUGH_MU_RAMP_DOWN_
        RATE*LOOP_TIME);
    }
if(RoughMULower>max_RoughMu)RoughMULower=max_Rough
    MU;
if(ss_RoughMULower<min_RoughMU)RoughMuLower=min_
    RoughMU;
```

A Final Rough MU is determined by:
RoughMU=max(RoughMUUpper,RoughMULower);

In step 198 a Matching Pressure is determined. The matching pressure is calculated based on the Rough MU level. Higher mu levels result in higher matching pressure. The matching pressure is used in the prediction strategy to compensate for the finite build rate available from the hydraulic system. The matching pressure is determined in the following:

```
MatchingPressure=BASE_MATCHING_PRESSURE+RoughMU*
    MATCHING_PRESSURE_MU_GAIN;
if (MatchingPressure<0.0)MatchingPressure=0.0;
```

In step 200 a predicted SWA sign change is determined. In this section two flags are calculated POS_SWA_EXPECTED and NEG_SWA_ESPECTED. POS_SWA_EXPECTED is set to true if the steering wheel angle is positive in the current loop or expected to be positive within a certain period of time. This period of time or signal lead is mu dependent and is intended to allow more lead in building the caliper precharge pressure for higher mu estimates. It has been experimentally determined that has indicated that on high mu and for large steering rates, initiating the pressure build after the sign crossing of the steering wheel angle may hot allow adequate pressure to be built during the transition to cancel the resulting dynamic oversteer. A similar calculation is performed for the negative direction. The prediction of sign change of SWA is determined by:

```
POS_SWA_EXPECTED=(RoughMU*FILTERED_STEER_ANGLE_RATE
    *EXPECTED_SWA_LEAD_TIME_MU_GAIN+min(STEERING_
    WHEEL_ANGLE, MAX_THRESHOLD_FOR_PREDICTED_POS_
    SWA)>MIN_POS_SWA_THRESHOLD)||(STEERING_WHEEL_
    ANGLE>MIN_POS_SWA_THRESHOLD);
NEG_SWA_EXPECTED=(RoughMU*FILTERED_STEER_ANGLE_RATE
    *EXPECTED_SWA_LEAD_TIME_MU_GAIN+max(STEERING_
    WHEEL_ANGLE, MIN_THRESHOLD_FOR_PREDICTED_POS_
    SWA)<MAX_POS_SWA_THRESHOLD)||(STEERING_WHEEL_
    ANGLE<MAX_POS_SWA_THRESHOLD);
```

In step 202 the RSC Precharge Status flags are enabled. The enable flag is true in any loop for which the precharge pressure can be implemented. In the present example the vehicle should be above a minimum speed and the rollover stability control (RSC) system must not be disabled for the flag to be true, otherwise it will be forced to a false state. A recent PID event or a combination of sufficiently high steering 100 velocities and recent large lateral acceleration may also be required for the flag to be set true.

Several steps are used in setting the flags. First, it is determined whether a rapid change in lateral acceleration has recently occurred. This is used as an indicator that a transitional maneuver is occurring. The code for such is:

```
if(max(FinalMaxDAyDt,-FinalMinDAyDt)>SpeedDpndntAy
    Chng)Recent_Rapid_AY_Counter=RECENT_RAPID_AY_
    TIME;
else if (Recent_Rapid_AY_Counter>0)Recent_Rapid_AY_
    Counter--;
RECENT_RAPID_AY=Recent_Rapid_AY_Counter > 0;
```

Next it is determined whether a large rough mu has recently been experienced. This flag is used to indicate that a near limit condition is or has recently occurred.

RECENT_LARGE_ROUGH_MU=RoughMU>LARGE_ROUGH_MU;

Then it is determined whether a moderate linear slip is or has recently occurred at the front axle as in:

```
if (ABS(FrontLnrSlipAngle)>((FRNT_SLIP_ANGLE_
    THRESHOLD_POS_SIG_DYN*FT_CRNRG_CMPLNCE)))
    RECENT_MODERATE_FRONT_AXLE_LNR_SLIP_COUNTER=
    (RECENT_MODERATE_FRONT_LINEAR_SLIP/LOOP_TIME);
else      if      (
RECENT_MODERATE_FRONT_AXLE_LNR_SLIP_COUNTER>0)
    RECENT_MODERATE_FRONT_AXLE_LNR_
    SLIP_COUNTER--;
```

Then, it is, determined whether a recent absolutely lifted has been determined for a wheel OR whether a recent pre lift has been sensed. This is set forth in code by:

```
if (((FINAL_WHEEL_LIFT_STATUS[FL]==ABSOLUTELY_
    LIFTED)&&(FLT_LAT_ACC>S16_RND(0.85/g_RES_LAT_
    ACC)))||WDA_LIFT_SUSPECTED[FL])
{
    RECENT_LEFT_WHEEL_LIFT_TIMER=RECENT_
        WHEEL_LIFT_TIME;
}
else if (RECENT_LEFT_WHEEL_LIFT_TIMER)RECENT_LEFT_
    WHEEL_LIFT_TIMER--;
if (RECENT_LEFT_WHEEL_LIFT_TIMER)RECENT_
    LEFT_WHEEL_LIFT=TRUE;
else
    RECENT_LEFT_WHEEL_LIFT=FALSE;
if
(((FINAL_WHEEL_LIFT_STATUS[FR]==ABSOLUTELY_LIFTED)
    &&(FLT_LAT_ACC<S16_RND((-0.85)/g_RES_LAT_
    ACC)))||WDA_LIFT_SUSPECTED[FR])
{
    RIGHT_WHEEL_LIFT_TIMER=RECENT_WHEEL_LIFT_
        TIME;
}
else                                         if
(RECENT_RIGHT_WHEEL_LIFT_TIMER)RECENT_RIGHT_
    WHEEL_LIFT_TIMER--;
```

```
if (RECENT_RIGHT_WHEEL_LIFT_TIMER)RECENT_RIGHT_
    WHEEL_LIFT=TRUE;
else
    RECENT_RIGHT_WHEEL_LIFT=FALSE;
```

Another factor is if significant dynamics are present which might warrant a precharge intervention. The significant dynamics variable is an intermediate variable taking into consideration the above recent rapid lateral acceleration, large rough mu, linear slip, lift status, and prelift sensing. The code is implemented as:

```
SIGNIFICANT_DYNAMICS=
    (RECENT_PID_CTRL
    ||(RECENT_RAPID_AY&&RECENT_LARGE_ROUGH_MU)
    ||((max(FinalMaxDAyDt,-FinalMinDAyDt)>Speed
        DpndntAyChng)&&(RECENT_MODERATE_FRONT_
        AXLE_LNR_SLIP_COUNTER>0))
    ||(FL_Precharge_Press)
    ||(FR_Precharge_Press)
    ||RECENT_LEFT_WHEEL_LIFT
    ||RECENT_RIGHT_WHEEL_LIFT
    ||Predicted_AY_from_SWA>=1.4*g&&FrontLnrSlip
        Angle<=-0.85*FT_CRNRG_CMPLNCE&&WHEEL_
        DEPARTURE_ANGLE>=0.1
    ||Predicted_AY_from_SWA<=-1.4*g&&FrontLnrSlip
        Angle>=0.85*FT_CRNRG_CMPLNCE&&WHEEL_
        DEPARTURE_ANGLE<=-0.1
)
```

Then based on the significant dynamics variable, the precharge pressures and other variables by the following:

```
if (SIGNIFICANT_DYNAMICS
        &&(REF_VELOCITY_YC>VELOCITY_MIN_10
        ||((FL_Precharge_Press>0||FR_Precharge_
            Press>0)
        &&(REF_VELOCITY_YC>VELOCITY_MIN_TO_EXIT_
            7)))
    && !Get_rsc_disabled
    && !Get_ayc_reverse_movement
    && !Status_first_run
    && !RSC_Disable_after_sensor_self_test
    )
        ENABLE_RSC_PRECHARGE=TRUE;
    else    ENABLE_RSC_PRECHARGE=FALSE;
```

In step 204 Precharge Timers are managed. Precharge timers are used to allow the precharge strategy to occur during or immediately after the transitional portion of an event. This serves as additional screening criteria to prevent unnecessary precharge interventions.

If the rear linear slip angle is consistent with a left hand turn or the significant dynamics flag indicates there is no significant dynamic activity, the left timer is zeroed out. Otherwise it is incremented to the maximum precharge time. If the rear linear slip angle is consistent with a right hand turn or the significant dynamics flag indicates there is no significant dynamic activity, the right timer is zeroed out. Otherwise it is incremented to the maximum precharge time. This ensures that within a defined period of time, after a dynamic event, a precharge event will not be initiated, reducing the possibility of unnecessary intervention. This is set forth as:

```
If (RearLnrSlipAngle<=0
   ||!SIGNIFICANT_DYNAMICS
   ||RECENT_PID_ACTIVATION
   ||RECENT_RIGHT_WHEEL_LIFT)
      FL_Precharge_Timer=0;
else if(FL_Precharge_Timer<MAX_PRECHARGE_TIME)
   FL_Precharge_Timer++;
if(RearLnrSlipAngle>=0
   ||!SIGNIFICANT_DYNAMICS
   ||RECENT_PID_ACTIVATION
   ||RECENT_LEFT_WHEEL_LIFT)
      FR_Precharge_Timer=0;
else if(FR_Precharge_Timer<MAX_PRECHARGE_TIME)
   FR_Precharge_Timer++;
```

In step 206 individual caliper pre-charge status flags are determined. The status flags indicate whether the pre-charge function is active on a given wheel in a given loop. Precharge must be enabled in any loop for which the pre-charge strategy is active. If the precharge timer on a given wheel is below the maximum precharge time, the function can become activated on that wheel based on steering information or side slip angle information. Additionally, the precharge function will remain active on a specific wheel as long as there is a non-zero pressure being requested on that wheel.

The continuous time of consistent sign for SSLIN Front or Rear is monitored.

```
if (FrontLnrSlipAngle>MIN_SLIP_ANGLE_FOR_PRCHG_ACT
      || RearLnrSlipAngle>MIN_SLIP_ANGLE_FOR_
            PRCHG_ACT)
{
if (PSTV_SS_LIN<MIN_CONT_TIME_WITH_CONSISTENT_
SIGN)
      PSTV_SS_LIN++;
}
else if (PSTV_SS_LIN>0)PSTV_SS_LIN--;
if (FrontLnrSlipAngle<MIN_SLIP_ANGLE_FOR_PRCHG_
      ACT
      ||RearLnrSlipAngle<MIN_SLIP_ANGLE_
            FOR_PRCHG_ACT)
{
if (NGTV_SS_LIN<MIN_CONT_TIME_WITH_CONSISTENT_
SIGN)
      NGTV_SS_LIN++;
}
else if (NGTV_SS_LIN>0) NGTV_SS_LIN--;
```

Then the front left precharge active status flags are determined.

```
FL_PRECHARGE_ACTIVE=ENABLE_RSC_PRECHARGE&&
   ((((NEG_SWA_EXPECTED
   /*Allow FL transition control to activate if
   FR has transition pressure and SWA direction
   is heading towards the right (heading towards
   a negative value)*/
      &&((FinalMinDAyDt<(-SpeedDpndntAyChng))
      ||(FR_Precharge_Press>(0.0) )))
         ||(RearLnrSlipAngle>MIN_SLIP_ANGLE_
            FOR_PRCHG_ACT)
         ||(FrontLnrSlipAngle>MIN_SLIP_ANGLE_FOR_
            PRCHG_ACT))
         &&FL_Precharge_Timer<MAX_PRECHARGE_
            TIME)
```

-continued

```
   ||FL_Precharge_Press>0.0)
   ||PSTV_SS_LIN>=MIN_CONT_TIME_
      WITH_CONSISTENT_SIGN
```

When the front right precharge active status flags are determined:

```
FR_PRECHARGE_ACTIVE=ENABLE_RSC_PRECHARGE&&
   (((POS_SWA_EXPECTED
   /*Allow FR transition control to activate if FL has
   transition pressure and SWA direction is heading
   towards the left (heading towards a positive
   value)*/
      &&((FinalMaxDAyDt>SpeedDpndntAyChng)||(FL_P
         recharge_Press>(0.0)))
      ||(RearLnrSlipAngle<MIN_SLIP_ANGLE_FOR_PRCHG_
         ACT)
      ||(FrontLnrSlipAngle<MIN_SLIP_ANGLE_FOR_PRCHG_
         ACT))&&FR_Precharge_Timer<MAX_PRECHARGE_
         TIME)
   ||FR_Precharge_Press>0.0);
   ||PSTV_SS_LIN>=MIN_CONT_TIME_WITH_
      CONSISTENT_SIGN
```

In step 208 calculate moderate lateral acceleration transition flags. If a lateral acceleration of a defined magnitude precedes a transition controller event associated with the opposite direction of turning within a predefined period of time, then a moderate transition flag is set for that direction until the transition controller event has been exited. These flags are used in the wheel departure angle calculation to bias any changes in total roll angle and reference bank angle towards an increasing roll signal for control.

First a counter (moderate-positive-AY-counter) is implemented which is set to a transition hold time any time the filtered lateral acceleration exceeds the transition threshold, and is decremented to zero by one count per if the lateral acceleration is not exceeding the transition lateral acceleration threshold.

```
if(FLT_LAT_ACC>TRANSITION_AY_
   THRESHOLD)MODERATE_POSITIVE_AY_COUNTER=
   TRANSITION_HOLD_TIME;
else if(MODERATE_POSITIVE_AY_COUNTER>0)MODERATE_
   POSITIVE_AY_COUNTER--;
```

Next, the recent positive lateral acceleration flag is calculated. This flag is set to true if the counter is greater than zero, otherwise it is set to false for a zero value of the counter.

```
if(MODERATE_POSITIVE_AY_COUNTER>0)RECENT_
   POSITIVE_AY=TRUE;
else RECENT_POSITIVE_AY=FALSE;
```

The counter is now implemented for moderate negative lateral acceleration values. The negative counter is set to a transition hold time any time the filtered lateral acceleration falls below the negative of the transition threshold, and is decremented to zero by one count per if the lateral acceleration is not below the negative of the transition threshold.

```
if(FLT_LAT_ACC<-TRANSITION_AY_THRESHOLD)
    MODERATE_NEGATIVE_AY_COUNTER=TRANSITION_
    HOLD_TIME;
else if(MODERATE_NEGATIVE_AY_COUNTER>0)MODERATE_
NEGATIVE_AY_COUNTER--;
```

Similar to above, the recent negative lateral acceleration flag is calculated. This flag is set to true if the counter is greater than zero, otherwise it is set to false for a zero value of the counter.

```
if(MODERATE_NEGATIVE_AY_COUNTER>0)
    RECENT_POSITIVE_AY=TRUE;
else RECENT POSITIVE_AY=FALSE;
```

Next, the right to left transition flag is determined based on the recent negative lateral acceleration flag and the front right transition controller active flag. If both flags are set to true, then the right to left transition flag is set to true. If the front right transition controller active flag is false, the right to left transition controller flag is set to false. Otherwise, the value is held from the previous loop. This results in a flag that remains true until the front right transition controller event is exited.

```
if(RECENT_NEGATIVE_AY&&FR_Precharge_Press)RIGHT_
    TO_LEFT_TRANSITION=TRUE;
else
if(!FR_Precharge_Press)RIGHT_TO_LEFT_
    TRANSITION=FALSE;
else
RIGHT_TO_LEFT_TRANSITION=RIGHT_TO_LEFT_
TRANSITION;
```

Now the same calculation is performed for a left to right transition flag. If the recent negative lateral acceleration flag is true and the front left transition controller active flag if true, then the left to right transition flag is set to true. If the front left transition controller active flag is false, the left to right transition controller flag is set to false. Otherwise, the value is held from the previous loop. This results in a flag that remains true until the front left transition controller event is exited.

```
if(RECENT_POSITIVE_AY&&FL_Precharge_Press) LEFT_TO_
    RIGHT_TRANSITION=TRUE;
else if(!FL_Precharge_Press) LEFT_TO_RIGHT_
    TRANSITION=FALSE;
else LEFT_TO_RIGHT_TRANSITION=LEFT_TO_RIGHT_
TRANSITION;
```

Then a timer is created to limit duration of high target slip request in the following:

```
if
(union_PRECHARGE_FLAGS.st_PRECHARGE.bf_bool_RIGHT_
    TO_LEFT_TRANSITION==TRUE)
{
if (R2L_TRANSITION_COUNTER<TIME_LIMIT_TO_REQ_
    EXCSV_SLIP_AFTER_TRANSITION)R2L_
    TRANSITION_COUNTER
    ++;
}
else
{   R2L_TRANSITION_COUNTER=0;
}
if
(union_PRECHARGE_FLAGS.st_PRECHARGE.bf_bool_LEFT_
    TO_RIGHT_TRANSITION==TRUE)
{
    if (L2R_TRANSITION_COUNTER<TIME_LIMIT_TO_REQ_
        EXCSV_SLIP_AFTER_TRANSITION)L2R_
        TRANSITION_COUNTER++;
}
else
{   L2R_TRANSITION_COUNTER=0;
}
```

In step 210 the rate of change of relative roll angle is determined. The relative roll velocity is calculated by simple differentiation of the relative roll angle placed in series with a first order low pass filter as in:

```
REL_ROLL_VELOCITY+=((REL_ROLL_ANGLE-Z1_REL_
    ROLL_ANGLE)/LOOP_TIME)-REL_ROLL_VELOCITY)/Rel_
    Roll_Vel_FLT_Coeff;
```

In step 212, the rate of change of linear front slip angle is determined. Similarly, the linear front tire side slip angle velocity is calculated by simple differentiation of the linear front side slip angle placed in series with a first order low pass filter.

```
Temp=MAX(min_Ref_Velocity_YC,Ref_Velocity_YC);
Lin_Front_Vel+=((CurrentFrontLnrLatVel-FRONT_LNR_
    LAT_VEL)*(rad_to_deg/LOOP_TIME)/Temp
    -Lin_Front_Vel)/lin_frnt_vel_filter_
    coeff;
```

In step 214 a lower target build rate is used, yielding larger prediction pressures when steady state limit driving is detected. This is set forth in:

```
if
((Predicted_AY_from_SWA>=1.4*g&&(FrontLnrSlipAngle
    <=-0.85*FT_CRNRG_CMPLNCE))
    &&(WHEEL_DEPARTURE_ANGLE>=(0.1/deg_RES_ROLL_
    ANGLE)))||(Predicted_AY_from_SWA<=-.4*g
    &&(FrontLnrSlipAngle>=(0.85*FT_CRNRG_
    CMPLNCE)
        &&(WHEEL_DEPARTURE_ANGLE<=(-0.1/deg_
        RES_ROLL_ANGLE)))
)
{
    RECENT_STEADY_STATE_CORNERING_TIMER
        =RECENT_STDY_STATE_TURN_NEAR_LIMIT;
}
else
{
if (RECENT_STEADY_STATE_CORNERING_TIMER>0)RECENT_
    STEADY_STATE_CORNERING_TIMER-
}
if (RECENT_STEADY_STATE_CORNERING_TIMER>0)
```

-continued

```
{
    TrgtBldRateStdyState=TARGET_BUILD_RATE;
} else
{
    TrgtBldRateStdyState=Rsc_target_build_
        rate;
}
```

In step 216 an instantaneous caliper pre-charge requested pressure levels based on relative roll information is determined. First, a pressure is calculated based on proportional plus derivative control on roll information. Relative roll angle is used for the proportional term, roll velocity is used for the derivative term. The relative roll angle is used because it provides the required level of accuracy during the critical portion of the transition, during the zero crossing, and because it is not influenced by banks and is not influenced by integrator error or errors in reference road bank. This accuracy allows tighter thresholds than would be allowable for the PID controller. Additionally, this signal offers a high level of consistency and repeatability in the timing of the pressure build that is a critical property for the initial portion of the control intervention. The PD pressure is filtered as required to achieve an adequately smooth signal.

Next the derivative of the PID pressure is calculated for determining the instantaneous relative roll pressure. The instantaneous pressure provides a predictive functionality for the PD controller. It is intended to provide a mechanism to compensate for the finite rate at which pressure can be built. Additionally, it can provide a significant smoothing effect on the leading edge of the pressure trace without delaying the pressure build. This is helpful in building the required level of pressure while minimizing the excitation of the pitching mode of the vehicle. The instantaneous pressure is that pressure which would need to be in the caliper in the current loop such that if the pressure is increased at the target build rate, the matching pressure would be achieved at the same time the PID controller is expected to request the matching pressure. The point in time for which the PID controller is expected to request the matching pressure is obtained by taking the derivative of the PID pressure and projecting forward to the point in time when the intersects the matching pressure.

Front left relative roll instantaneous pressure is determined by:

```
FLRelRollPDPress+=(KP_REL_ROLL*(-REL_ROLL_ANGLE-
    REL_ROLL_DB)-KD_REL_ROLL*FLT_
    ROLL_RATE
    FLRelRollPDPressZ1)*REL_ROLL_
    PD_PRESS_FILT
FLRelRollPDPress=min(FLRelRollPDPress, MAX_FL_REL_
    ROLL_PD_PRESS);
FLRelRollPDPress=max(FLRelRollPDPress, MIN_FL_REL_
    ROLL_PD_PRESS);
dFLRelRollPDPress=FLRelRollPDPress-FLRelRollPD
    PressZ1;
FLRelRollPDPressZ1=FLRelRollPDPress;
FLRelRollInstPress=MatchingPressure-(Matching
    Pressure-FLRelRollPDPress)*TARGET_BUILD_
    RATE /max(TARGET_BUILD_RATE, dFLRelRoll
    PDPress /LOOP_TIME);
```

Then the Front Right relative roll instantaneous pressure is determined by:

```
FRRelRollPDPress+=(KP_REL_ROLL*(REL_ROLL_ANGLE-REL_
    ROLL_DB)+KD_REL_ROLL*FLT_ROLL_RATE-FRRelRoll
    PDPressZ1)*REL_ROLL_PD_PRESS_FILT)
FRRelRollPDPress=min(FRRelRollPDPress, MAX_FL_REL_
    ROLL_PD_PRESS);
FRRelRollPDPress=max(FRRelRollPDPress, MIN_FL_REL_
    ROLL_PD_PRESS);
dFRRelRollPDPress=FRRelRollPDPress-FRRelRollPD
    PressZ1;
FRRelRollPDPressZ1=FRRelRollPDPress;
FRRelRollInstPress=MatchingPressure-(Matching
    Pressure-FRRelRollPDPress)*TARGET_BUILD_RATE
    /max(TARGET_BUILD_RATE, dFRRelRollPDPress
    /LOOP_TIME);
```

In step 218 the conditions for applying the Yaw Rate PID controller to prevent a pressure increase from the yaw rate controller when driver is steering out of a turn are determined.

When transitioning from a right to a left turn, determine when change in SWA direction to the left has been well established; use as a condition for blocking the YAW RATE PD controller from further increasing transition pressure on FL wheel

```
if ((STEERING_WHEEL_ANGLE-Z1_STEERING_WHEEL_
    ANGLE) >=0)
{
    if (INCREASING_SWA_COUNTER<(UPPER_BOUND_ON_
    TIME_FOR_DETECTION/LOOP_TIME_SEC))
    { INCREASING_SWA_COUNTER++;
    }
    if (POSITIVE_DELTA_SWA_INT<UPPER_BOUND_ON_
    DELTA_SWA_INT)
    { //Accumulate positive delta SWA POSITIVE_
        DELTA_SWA_INT+=(STEERING_WHEEL_ANGLE-Z1_
        STEERING_WHEEL_ANGLE);
    }
}
else // SWA is heading to the right
{
    INCREASING_SWA_COUNTER=0; // Reset increasing
    SWA counter POSITIVE_DELTA_SWA_INT=0; // Reset
delta SWA integration
}
if
(LARGE_LAT_ACC_COUNTER==0||(Predicted_AY_from_SWA>-
    AY_FROM_SWA_THRESH_FOR_DIRECTION_CHANGE
    &&INCREASING_SWA_COUNTER>=TIME_FOR_
    DETECTING_SWA_DIRECTION_CHANGE&&POSITIVE_
    DELTA_SWA_INT >=(SWA_VEL_FOR_DETECTING_
    SWA_DIRECTION_CHANGE*TIME_FOR_
    DETECTING_SWA_DIRECTION_CHANGE))
)
// Disable YawRate PD controller on FL from
increasing transition pressure if LatAcc at CG
magnitude did not exceed lateral accel threshold
(tunable parameter set to 0.5 g's) within the past
3 seconds or anytime the predicted Ay from SWA is
greater than (−0.5 g) and SWA and SWA_VEL indicate
a consistent positive sign trend
ROLL_FLAG.bf_bool_FL_DISABLE_YR_PD_PR_INC=TRUE;
}
else
{
ROLL_FLAG.bf_bool_FL_DISABLE_YR_PD_PR_INC=FALSE;
}
```

In the case when transitioning from a left to a right turn, it is determined when a change in SWA direction to the right has been well established; to use as a condition for blocking the YAW RATE PD controller from further increasing this transition pressure on FR wheel, the following is used:

```
if (STEERING_WHEEL_ANGLE-Z1_STEERING_WHEEL_ANGLE
    <=0)
{
    if
(DECREASING_SWA_COUNTER<UPPER_BOUND_ON_TIME_
    FOR_DETECTION/LOOP_TIME_SEC)
    { // Increase counter each loop delta
        SWA is not negative DECREASING_SWA_
        COUNTER ++;
    }
    if (NEGATIVE_DELTA_SWA_INT>-UPPER_BOUND_ON_
        DELTA_SWA_INT)
    { // Accumulate positive delta SWANEGATIVE_
        DELTA_SWA_INT+=STEERING_WHEEL_ANGLE-Z1_
        STEERING_WHEEL_ANGLE;
    }
}
else // SWA is heading to the left
DECREASING_SWA_COUNTER=0; // Reset decreasing
    SWA counter
    NEGATIVE_DELTA_SWA_INT=0; // Reset delta SWA
    integration
}
if
(LARGE_LAT_ACC_COUNTER==0||(Predicted_AY_from_SWA
    <AY_FROM_SWA_THRESH_FOR_DIRECTION_CHANGE&&
    DECREASING_SWA_COUNTER>=TIME_FOR_DETECTING_
    SWA_DIRECTION_CHANGE&&NEGATIVE_DELTA_SWA_
    INT<=(SWA_VEL_FOR_DETECTING_SWA_DIRECTION_
    CHANGE*TIME_FOR_DETECTING_SWA_
    DIRECTION_CHANGE))
)
//Disable YawRate PID controller on FR from
increasing transition pressure if LatAcc at CG
magnitude did not exceed lateral accel threshold
(tunable parameter set to 0.5 g's) within the past
3 seconds or anytime the predicted Ay from SWA is
less than +0.5 g and SWA and SWA_VEL indicate a
consistent negative sign trend
{
    ROLL_FLAG.bf_bool_FR_DISABLE_YR_PD_PR_INC
        =TRUE;
}
else
{
    ROLL_FLAG.bf_bool_FR_DISABLE_YR_PD_PR_INC
        =FALSE;
}
```

Then the instantaneous caliper precharge requested pressure levels based on yaw rate are determined.

```
FLYawRatePDPress=LIMIT((FL_YAW_RATE_PD_PRESS_Z1+
    (Rsc_kp_yaw_rate*(-FLT_YAW_RATE-SpeedDpndnt
    YRDB))-Rsc_kd_yaw_rate*SLOW_FLT_YAW_ACC-FL_
    YAW_RATE_PD_PRESS_Z1)/(1.0/YAW_RATE_PD_PRESS_
    FILT)), MIN_PD_PRESS, MAX_PD_PRESS);
dFLYawRatePDPress=FLYawRatePDPress-FL_YAW_RATE_PD_
    PRESS_Z1;
FL_YAW_RATE_PD_PRESS_Z1=FLYawRatePDPress;
#if (USE_LOWER_TARGET_BUILD_RATE_FOR_STEADY_
    STATE_TURNS) FLYawRateInstPress=MatchingPressure
    - (MatchingPressure-FLYawRatePDPress)*TrgtBld
    RateStdyState/max(TrgtBldRateStdyState, dFLYaw
    RatePDPress/LOOP_TIME_SEC));
#else
FLYawRateInstPress=MatchingPressure-(Matching
    Pressure-FLYawRatePDPress)*Rsc_target_
    build_rate/max(Rsc_target_build_rate,
    dFLYawRatePDPress/LOOP_TIME_SEC));
#endif
```

```
FRYawRatePDPress=LIMIT((FR_YAW_RATE_PD_PRESS_
    Z1+(Rsc_kp_yaw_rate*(FLT_YAW_RATE-
    SpeedDpndntYRDB)+Rsc_kd_yaw_rate*SLOW_
    FLT_YAW_ACC)-FR_YAW_RATE_PD_PRESS_Z1)/
    (1.0/YAW_RATE_PD_PRESS_FILT)), MIN_PD_
    PRESS, MAX_PD_PRESS);
dFRYawRatePDPress=FRYawRatePDPress-FR_YAW_RATE_
    PD_PRESS_Z1;
FR_YAW_RATE_PD_PRESS_Z1=FRYawRatePDPress;
#if (USE_LOWER_TARGET_BUILD_RATE_FOR_STEADY_
    STATE_TURNS) FRYawRateInstPress=Matching
    Pressure-(MatchingPressure-FRYawRatePD
    Press)*ss_bps_TrgtBldRateStdyState/max
    (TrgtBldRateStdyState, dFRYawRatePDpress*
    (1.0/LOOP_TIME_SEC)));
#else
    FRYawRateInstPress=MatchingPressure-(Matching
    Pressure-FRYawRatePDPress)*Rsc_target_
    build_rate/max(Rsc_target_build_rate,
    dFRYawRatePDPress*(1.0/LOOP_TIME_SEC)));
#endif
```

In step 220 the instantaneous caliper precharge pressures based on front linear slip angle are determined. In this section, calculations are performed which are similar to those used for the Relative Roll PD pressure. Instead of Relative Roll angle for the proportional term, the linear side slip angle of the front axle is used. Instead of roll velocity, the rate of change of the front linear slip angle is used for the derivative term.

First, the Front Left front "front linear slip angle" instantaneous pressure is determined by:

```
FLSSLinFrontPDPress+=(KP_SS_LIN_FRONT*(FrontLnrSlip
    Angle-
    SS_LIN_FRONT_DB)+KD_SS_LIN_FRONT*Lin_Front_Vel-FLSS
    LinFrontPDPressZ1)*SS_LIN_PD_PRESS_FILT;
dFLSSLinFrontPDPress=FLSSLinFrontPDPress-FLSS
    LinFrontPDPressZ1;
FLSSLinFrontPDPressZ1=FLSSLinFrontPDPress;
FLSSLinFrontInstPress=MatchingPressure-(Matching
    Pressure-FLSSLinFrontPDPress)*TARGET_BUILD_
    RATE/max(TARGET_BUILD_RATE, dFLSSLinFront
    PDPress /LOOP_TIME);
```

Then Front Right front "front linear slip angle" instantaneous pressure is determined by:

```
FRSSLinFrontPDPress+=(KP_SS_LIN_FRONT*(-Front
    LnrSlipAngle-SS_LIN_FRONT_DB)-KD_SS_LIN_FRONT*
    Lin_Front_Vel-FRSSLinFrontPDPressZ1)*SS_LIN_
    PD_PRESS_FILT;
dFRSSLinFrontPDPress=FRSSLinFrontPDPress-FRSSLin
    FrontPDPressZ1;
FRSSLinFrontPDPressZ1=FRSSLinFrontPDPress;
FRSSLinFrontInstPress=MatchingPressure-(Matching
    Pressure-FRSSLinFrontPDPress)*TARGET_BUILD_
    RATE/max(TARGET_BUILD_RATE, dFRSSLinFront
    PDPress/LOOP_TIME);
```

In step 222 the instantaneous build rate based on the slope of instantaneous PID pressure in relation to the matching pressure and the length of time it would take for the prior value of precharge pressure to reach the matching pressure level is determined.

First the front left FL instantaneous build rate based on RelRoll PD information is determined.

```
    PDRelRollMatchPressDelta[FL]=MatchingPressure-
        FLRelRollPDPress;
    if (PDRelRollMatchpressDelta[FL]<=0)
    {
    InstRelRollBuildRate[FL]=(MIN_INST_BUILD_RATE);
    }
    else
    {
        //Put lower limit on denominator to avoid
        divide by zero
        PDRelRollMatchPressDelta[FL]=max(PDRelRoll
            MatchPressDelta[FL], (MIN_MATCH_PRESS_2_
            PD_PRESS_DELTA));
        //Calculate RelRoll based build rate, and
        bound between 100 and 300 bar/s
        InstRelRollBuildRate[FL]=
            LIMIT((((MatchingPressure-FL_Precharge_
            Press)*(dFLRelRollPDPress*(1.0/LOOP
            TIME)))/PDRelRollMatchPressDelta
            [FL]),(MIN_INST_BUILD_RATE), (MAX_
            INST_BUILD_RATE));
    }
```

Then the FL instantaneous build rate based on Yaw Rate PD information is determined.

```
ssPDYawRateMatchPressDelta[FL]=ss_MatchingPressure-
    ss_FLYawRatePDPress;
if (ssPDYawRateMatchPressDelta[FL]<=0)
{
    ssInstYawRateBuildRate[FL]=MIN_INST_BUILD_RATE
        /bar_RES_BRAKE_PRESSR;
}
else
{   //Put lower limit on denominator to avoid
    divide by zeros
    sPDYawRateMatchPressDelta[FL]=max(ssPDYawRate
    MatchPressDelta[FL],
MIN_MATCH_PRESS_2_PD_PRESS_DELTA/bar_RES_BRAKE_
PRESSR);
    //Calculate YawRate based build rate, and
    bound between 100 and 300 bar/s
    ssInstYawRateBuildRate[FL]
        =LIMTT(((ss_MatchingPressure-ss_FL_
        Precharge_Press)*ss_dFLYawRatePDPress
        *1.0/p_LOOP_TIME_SEC/ssPDYawRateMatch
        PressDelta[FL]),
        MIN_INST_BUILD_RATE/bar_RES_BRAKE_
            PRESSR,
        MAX_INST_BUILD_RATE/bar_RES_BRAKE_
            PRESSR);
}
```

Then the FL instantaneous build rate based on SSLinFront PD information is determined.
Then the FL instantaneous build rate based on SSLinFront PD information is determined.

```
PDSSLinMatchPressDelta[FL]=MatchingPressure-FLSS
    LinFrontPDPress;
if (PDSSLinMatchPressDelta[FL]<=0)
{
        InstSSLinFrntBuildRate[FL]=(MIN_INST_BUILD_RATE);
}
else
{
    //Put lower limit on denominator to avoid
    divide by zero
    PDSSLinMatchPressDelta[FL]=max(PDSSLin
        MatchPressDelta[FL],
        (MIN_MATCH_PRESS_2_PD_PRESS_DELTA));
```

-continued
```
    //Calculate SSLinFront based build rate,
    and bound between 100 and 300 bar/s
    InstSSLinFrntBuildRate[FL]=
        LIMIT((((MatchingPressure-FL_Precharge_Press)*
        (dFLSSLinFrontPD
        Press*(1.0/LOOP_TIME)))       /
PDSSLinMatchPressDelta[FL]),
        (MIN_INST_BUILD_RATE),
            (MAX_INST_BUILD_RATE));
}
```

Then a final FL instantaneous build rate by taking maximum of RelRoll and SSLinFront rates.

InstBuildRate[FL]=max(InstRelRollBuildRate[FL], InstSSLinFrntBuildRate[FL]);

The same process is repeated for the front right FR. First, the FR instantaneous build rate based on RelRoll PD information is determined.

```
PDRelRollMatchPressDelta[FR]=MatchingPressure-FR
    RelRollPDPress;
if (PDRelRollMatchPressDelta[FR]<=0)
{
        InstRelRollBuildRate[FR]=(MIN_INST_BUILD_RATE);
}
else
{
    //Put lower limit on denominator to avoid
    divide by zero
    PDRelRollMatchPressDelta[FR]=max(PDRel
        RollMatchPressDelta[FR],
        (MIN_MATCH_PRESS_2_PD_PRESS_DELTA));
    //Calculate RelRoll based build rate, and
    bound between 100 and 300 bar/s
    InstRelRollBuildRate[FR]=
        LIMIT((((MatchingPressure-FR_Precharge_Press)
        (dFRRelRollPDPress*(1.0/LOOP_TIME)))
        /PDRelRollMatchPressDelta[FR]),
        (MIN_INST_BUILD_RATE),
        (MAX_INST_BUILD_RATE));
}
```

Then the calculation of FR instantaneous build rate based on Yaw Rate PD information is performed by:

```
ssPDYawRateMatchPressDelta[FR]=
    ss_MatchingPressure-ss_FRYawRatePDPress;
if (ssPDYawRateMatchPressDelta[FR]<=0)
{
        ssInstYawRateBuildRate[FR]=MIN_INST_BUILD_RATE/
            bar_RES_BRAKE_PRESSR;
}
else
{
    //Put lower limit on denominator to avoid
    divide by zero
    ssPDYawRateMatchPressDelta[FR]=max(ssPD
        YawRateMatchPressDelta[FR],
MIN_MATCH_PRESS_2_PD_PRESS_DELTA/
    bar_RES_BRAKE_PRESSR);
    //Calculate YawRate based build rate, and
    bound between 100 and 300 bar/s
    ssInstYawRateBuildRate[FR]=
        LIMIT(((ss_MatchingPressure-ss_FR_Precharge_Press)*
            ss_dFRYawRatePDPress*1.0/
            p_LOOP_TIME_SEC/
            ssPDYawRateMatchPressDelta[FR]),
```

After, the FR instantaneous build rate based on SSLin-Front PD information is determined by:

```
PDSSLinMatchPressDelta[FR]=MatchingPressure-FRSS
    LinFrontPDPress;
if (ssPDSSLinMatchPressDelta[FR]<=0)
{
    InstSSLinFrntBuildRate[FR]=(MIN_INST_BUILD_RATE);
}
else
{
    //Put lower limit on denominator to avoid
    divide by zero
    PDSSLinMatchPressDelta[FR]=max(PDSSLin
        MatchPressDelta[FR],
            (MIN_MATCH_PRESS_2_PD_PRESS_DELTA));
    //Calculate SSLinFront based build rate,
    and bound between 100 and 300 bar/s
    InstSSLinFrntBuildRate[FR]=
        LIMIT((((MatchingPressure-FR_Precharge_Press)
        *(dFRSSLinFrontPDPress*(1.0/LOOP_TIME)))
        /PDSSLinMatchPressDelta[FR]),
            (MIN_INST_BUILD_RATE),(MAX_INST_BUILD_RATE) );
}
```

Then the final FR instantaneous build rate by taking maximum of RelRoll and SSLinFront rates
InstBuildRate[FR]=max(InstRelRollBuildRate[FR], InstSSLinFrntBuildRate[FR]);

In step 224, the requested pressures for each caliper are determined as follows.

Front left requested pressures are determined by:

```
FLInstPressRequest=0.0;
FLInstPressRequest=max(FLInstPressRequest, FLRel
    RollInstPress);
FLInstPressRequest=max(FLInstPressRequest, FLSS
    LinFrontInstPress);
FLInstPressRequest=max(FLInstPressRequest,ss_FLYaw
    RateInstPress);
FLInstPressRequest=min(FLInstPressRequest, Matching
    Pressure);
FLInstPressRequest=max(FLInstPressRequest, FLRel
    RollPDPress);
FLInstPressRequest=max(FLInstPressRequest, FLSS
    LinFrontPDPress);
FLInstPressRequest=max(FLInstPressRequest,ss_FLYaw
    RatePDPress);
```

Front right requested pressures are determined by:

```
FRInstPressRequest=0.0;
FRInstPressRequest=max(FRInstPressRequest, FRRel
    RollInstPress);
FRInstPressRequest=max(FRInstPressRequest, FRSS
    LinFrontInstpress);
FRInstPressRequest=max(FRInstPressRequest,ss_FRYaw
    RateInstPress);
FRInstPressRequest=min(FRInstPressRequest, Matching
    Pressure);
FRInstPressRequest=max(FRInstPressRequest, FRRel
    RollPDPress);
FRInstPressRequest=max(FRInstPressRequest, FRSS
    LinFrontPDPress);
FRInstPressRequest=max(FRInstPressRequest,ss_FRYaw
    RatePDPress);
```

In step 226 the front left caliper precharge requests are updated:

```
if(FL_PRECHARGE_ACTIVE)
{
```

If the RelRoll or SSLin PD pressure requests an increase, the requested pressures are ramped up.

```
if ((FLRelRollPDPress>FL_Precharge_Press)||(FLSSLin
    FrontPDPress>FL_Precharge_Press)
        ||FLYawRatePDPress>FL_Precharge_Press)
{
    FL_Precharge_Press+=LARGE_DYNAMICS_BUILD_RATE*
        LOOP_TIME;
}
```

If the instantaneous pressure requests an increase, the requested pressures are ramped up.

```
else if (FLInstPressRequest>ss_FL_Precharge_Press)
{
    if (RECENT_PID_ACTIVATION[FL]||
        RECENT_RIGHT_WHEEL_LIFT )
    {
        FL_Precharge_Press+=
            LARGE_DYNAMICS_BUILD_RATE*
            LOOP_TIME;
    }
    else
    {
```

```
            FL_Precharge_Press+=(InstBuildRate[FL]
                *LOOP_TIME);
        }
```

If the steering information suggests a transitional event, the pressure is ramped up to a low mu dependent value in the following:

```
else if(NEG_SWA_EXPECTED
        &&FinalMinRtLmtdDAyDt >SpeedDpndntAy
            Chng
        &&FL_Precharge_Press<RoughMU*
            BASE_PRESSURE_MU_GAIN)
    {
        FL_Precharge_Press+=TARGET_BUILD_RATE
        *LOOP_TIME;
    }
```

If a pressure increase is not requested AND no PID pressure increase is requested, the requested pressure is ramped down.

```
else if ((FL_Precharge_Timer<PRECHARGE_BUILD_TIME)
        &&((PID_STBLZ_PRES[FL]>FL_Precharge_Press)
        ||(!PID_FL_INCREASE_REQUESTED_PRESSURE))
        &&(REL_ROLL_ANGLE>-REL_ROLL_DB)
        &&FinalMinRtLmtdDAyDt<Speed
            DpndntAyChng)
    {
        FL_Precharge_Press-=TARGET_DUMP_RATE*LOOP_
            TIME;
    }
```

Any time the timer is above the build time AND no PID pressure increase is requested AND RelRollAngle is smaller than the RelRollDB, a reduction in pressure is forced.

```
if(FL_Precharge_Timer>=PRECHARGE_BUILD_TIME
        &&(PID_STBLZ_PRES[FL]>FL_Precharge_Press
        ||!PID_INCREASE_REQUESTED_PRESSURE
            [FL])
        &&REL_ROLL_ANGLE>-REL_ROLL_DB)
    {
    temp=FL_Precharge_Press/(max(1,MAX
        _PRECHARGE_TIME-FL_Precharge_Timer);
    temp=min(2*TARGET_DUMP_RATE*LOOP_TIME,
        temp);
    temp=max(TARGET_DUMP_RATE*LOOP_TIME,
        temp);
    FL_Precharge_Press-=temp;
    }
    FL_Precharge_Press=max(0.0,FL_Precharge_
        Press);
    }
    else
    {
        FL_Precharge_Press=0.0;
    }
```

In a similar manner the front right precharge request is updated.

```
If (FR_PRECHARGE_ACTIVE)
{
```

If the RelRoll or SSLin PD pressure requests an increase, the requested pressure is ramped up.

```
if (FRRelRollPDPress>FR_Precharge_Press||FRSSLin
    FrontPDPress>FR_Precharge_Press
        ||FRYawRatePDPress>FR_Precharge_
            Press)
    {
    FR_Precharge_Press+=LARGE_DYNAMICS_BUILD_RATE
        *LOOP_TIME;
    }
```

If the instantaneous pressure requests an increase, the requested pressure is ramped up.

```
else if(FRInstPressRequest>FR_Precharge_Press)
    {
    if (RECENT_PID_ACTIVATION[FR]||RECENT_LEFT_
        WHEEL_LIFT)
        {
        FR_Precharge_Press+=LARGE_DYNAMICS_
            BUILD_RATE*p_LOOP_TIME_SEC;
        }
    else
        {
        FR_Precharge_Press+=(InstBuildRate[FR]*LOOP_
            TIME);
        }
```

If the steering information suggests a transitional event, the pressure is ramped up to a low mu dependent value

```
else if(POS_SWA_EXPECTED
        &&FinalMaxRtLmtdDAyDt>SpeedDpndntAyChng
        &&FR_Precharge_Press<RoughMU*BASE_PRESSURE_
            MU_GAIN)
    {
    FR_Precharge_Press+=TARGET_BUILD_RATE*LOOP_
        TIME;
    }
```

If a pressure increase is not requested AND no PID pressure increase requested, then the requested pressure is ramped down.

```
else if (FR_Precharge_Timer<PRECHARGE_BUILD_TIME
        &&(PID_STBLZ_PRES[FR]>FR_Precharge_Press
        ||!PID_INCREASE_REQUESTED_PRESSURE
            [FR])
        &&REL_ROLL_ANGLE<REL_ROLL_DB
        &&FinalMaxRtLmtdDAyDt<SpeedDpndntAyChng)
    {
        FR_Precharge_Press-=TARGET_DUMP_
            RATE*LOOP_TIME;
    }
```

Any time the timer is above the build time AND no PID pressure increase is requested AND RelRollAngle is smaller than the RelRollDB, force a reduction in pressure.

```
if((FR_Precharge_Timer>=PRECHARGE_BUILD_TIME
    &&(PID_STBLZ_PRES[FR]>FR_Precharge_Press
    ||!PID_INCREASE_REQUESTED_PRESSURE[FR])
    &&REL_ROLL_ANGLE<REL_ROLL_DB)
    {
    temp=FR_Precharge_Press/(max(1,MAX_
        PRECHARGE_TIME-FR_Precharge_Timer);
    temp=min(2*TARGET_DUMP_RATE*LOOP_TIME,
        temp);
    temp=max(TARGET_DUMP_RATE*LOOP_TIME,
        temp);
    FL_Precharge_Press-=temp;
    }
    FR_Precharge_Press=max(0.0,FR_Precharge_
        Press);
    }
else
    {
    FR_Precharge_Press=0.0;
    }
```

In step 228 the old values for next loop are updated.

```
SS_Lin_Rear_Z1=RearLnrSlipAngle;
REAR_LNR_LAT_VEL=CurrentRearLnrLatVel;
FRONT_LNR_LAT_VEL=CurrentFrontLnrLatVel;
REAR_LNR_LAT_ACC=FltRearLnrLatA;
Z1_STEERING_WHEEL_ANGLE=STEERING_WHEEL ANGLE;
```

PID Controller

Referring now to FIG. 8, the PID controller 78 calculates front control pressures; using some or all of Proportional, Integral, Derivative and Double Derivative feedback control logic, required to control excessive two wheel lift during non-tripped rolling motion. For short the controller is referred to as a PID controller even though all the functions may not be provided. The "I" integral and "DD" double derivative functions are the most likely not to be present. When this controller acts on a signal it is referred to as PID control even though all the functions may not be provided. The control pressure is applied to the outer front wheel when the vehicle is experiencing high lateral acceleration while turning and concurrently experiencing wheel lift on the inner side of the turn. PID intervention is based on the requested PID feedback pressure, as well as vehicle velocity and lateral acceleration exceeding specified thresholds; when the vehicle is moving in a forward direction. Intervention ends when PID pressure falls below a threshold reflective of stabilization of roll motion, or if driver is braking when PID pressure falls within an offset of driver pressure and slip of wheel being controlled indicates a level of stability appropriate for handoff to the anti-lock braking system.

Essentially, the PID controller 78 acts when more aggressive control is needed. The transition controller 76 acts before the vehicle is in an aggressive maneuver. This is typically below a threshold where the sensors are still in a linear region. Above the linear threshold, the PID takes over to aggressively control the vehicle. Aggressive control applies greater braking pressure to prevent the vehicle from rolling over.

In general, the Proportional, Integral, Derivative and Double Derivative, if present, terms are added together to form the total requested control pressure on each wheel. A brief explanation of each term follows.

The proportional term acts on a roll angle error input signal, thus the term proportional since the resulting requested control pressure will be proportional to the roll angle error magnitude by a factor K_P. A proportional peak hold strategy was added to mitigate a bouncing mode which can occur in certain aggressive maneuvers. The initiation of this strategy is contingent on the vehicle having experienced a recent divergence in roll rate magnitude.

The input to the derivative term is roll rate signal, which serves as a leading indicator of roll angle instability and thus provide an early lead on controlling the transient behavior of roll angle. The gain factor K_D multiplies the roll rate signal minus a deadband to generate a derivative pressure term. KD is an experimentally derived term. If K_D is unduly high, unnecessary control interventions may be caused (sensitive system) and the system made susceptible to input signal noise.

The double derivative term is used to capture the roll stability tendency of the vehicle. The roll acceleration signal will exhibit wide-ranging oscillations during control, so the gain factor K_DD's influence on the overall PID stabilizing pressure should be set to a minimum.

The integral control pressure is used to drive the steady state roll angle error toward zero. A bounded version of the roll angle error signal is multiplied by a gain factor K_I, then integrated to provide a requested integrator pressure. The reason for bounding the input is to prevent integrator windup.

The PID controller 78 has various inputs. The inputs include a lateral acceleration at the center of gravity (CG_FLT_LAT_ACC (m/s/s) input 300, a filtered roll rate (FLT_ROLL_RATE (deg/s) input 302, a (ROLL_ACCELERATION (deg/s/s) input 304, (ROLL_ANGLE_TOTAL. (deg) input 306, a (REFERENCE_BANK_ANGLE (deg) input 308, a front left brake pressure estimate (BRAKE_PRESSR_ESTMT [FL] (bar) input 312, a front right (BRAKE_PRESSR_ESTMT [FR] (bar) input 314, a driver requested pressure (DRIVER_REQ_PRESSURE (bar) 316, a (RSC_REFERENCE_VELOCITY (m/s) input 317, a (SLIP_RATIO [FL] (%) input 318, a (SLIP_RATIO [FR] (%) input 320, (RIGHT_TO_LEFT_TRANSITION (Boolean) input 322, (LEFT_TO_RIGHT_TRANSITION (Boolean) input 324, (DRIVER_BRAKING_FLAG (Boolean) input 326, a roll system disabled (RSC_DISABLED (Boolean) input 328, (REVERSE_MOVEMENT (Boolean) input 330, (STATUS_FIRST_RUN (Boolean) input 332, (RSC_IN_CYCLE (Boolean) input 334, (AYC_IN_CYCLE (Boolean) input 336 and a roll signal for control input 338.

The PID controller has various outputs including (PID_ACTIVE [FL] (Boolean) output 350, (PID_ACTIVE [FR] (Boolean) output 352, a stabilizer pressure (PID_STBLZ_PRESSURE [FL] (bar) output 354, (PID_STBLZ_PRESSURE [FR] (bar) output 356, (RECENT_AYC_CNTRL_EVENT (Boolean) output 358, (RECENT_PID_CNTRL_EVENT (Boolean) output 360, (INCREASE_REQUESTED_PRESSURE [FL] (Boolean) output 362, (INCREASE_REQUESTED_PRESSURE [FR] (Boolean) output 364, The PID controller 78 includes the various calibratable parameters. The parameters are shown for his example. The parameters in implementation may be varied based on the vehicle configuration. Proportional dead band PROP_DB (linear interpolation function of vehicle speed): Absolute value of Proportional deadband above which the error signal input to the proportional controller becomes positive, thus yielding a positive requested proportional pressure. At nominal speeds, the value is chosen in the vicinity of the vehicle roll gradient experienced near 1 g of lateral acceleration.

| RSC_REFERENCE_VELOCITY (m/s) | PROP_DB (deg) |
|---|---|
| 0 | 7.0 |
| 16.0 | 5.2 |
| 32.0 | 5.2 |
| 83.0 | 4.6 |

Another is proportional gain factor K_P_UP (linear interpolation function of vehicle speed): Proportional gain factor that multiplies the roll angle error signal when above PROP_DB, thus generating a positive proportional term of the requested PID stabilizing pressure.

| RSC_REFERENCE_VELOCITY (m/s) | K_P_UP (bar/deg) |
|---|---|
| 0 | 30.0 |
| 18.0 | 30.0 |
| 35.0 | 30.0 |
| 83.0 | 30.0 |

Proportional gain factor K_P_DOWN (linear interpolation function of vehicle speed): Proportional gain factor that multiplies the roll angle error signal when below PROP_DB, thus generating a negative proportional term of the requested PID stabilizing pressure.

| RSC_REFERENCE_VELOCITY (m/s) | K_P_DOWN (bar/deg) |
|---|---|
| 0 | 40.0 |
| 18.0 | 40.0 |
| 35.0 | 40.0 |
| 83.0 | 40.0 |

LARGE_ROLL_RATE_THRESH (in this example a value of 30.0 deg/s is used): Roll rate magnitude above which recent large roll rate timer is set to the maximum value.

RECENT_LARGE_ROLL_RATE (0.5 sec): Time duration assigned to recent large roll rate timer when roll rate magnitude exceeds LARGE_ROLL_RATE_THRESH.

PROP_HOLD_ANGLE_THRESHOLD (in this example a value of 1.48*Roll_gradient is used): Roll angle at which the proportional pressure starts tracking peak proportional pressure.

PROP_PEAK_HOLD_TIME (in this example a value of 0.5 sec is used): Time duration that the proportional peak hold pressure is latched once magnitude of roll signal for control falls below PROP_HOLD_ANGLE_THRESHOLD.

PROP_PEAK_RAMP_DOWN_RATE (in this example a value of 250 bar/s is used): Ramp down rate of prior proportional peak to a new lower prop peak pressure when roll signal for control still exceeds hold angle, or ramp down rate to upstream proportional pressure if roll signal for control has not exceeded hold angle within the last PROP_PEAK_HOLD_TIME seconds.

DERIV_DB (linear interpolation function of lateral acceleration): Absolute value of derivative deadband, used outside of PID control, above which the error signal input to the derivative controller becomes positive, thus yielding a positive requested derivative pressure. Values are chosen to prevent roll rate noise at low lateral acceleration levels from inducing nuisance PID interventions.

| CG_FLT_LAT_ACC (m/s/s) | DERIV_DB (deg/sec) |
|---|---|
| 0 | 5.0 |
| 4.0 | 5.0 |
| 7.0 | 0.0 |
| 100.0 | 0.0 |

DERIV_DB_DURING_PID_CONTROL (in this example a value of −20 deg/s is used). During PID intervention the deadband is set to a constant (non-lateral acceleration dependent) negative value, providing a phase advance on the PID pressure to mitigate roll oscillation during aggressive maneuvers.

K_D_UP (linear interpolation function of vehicle speed): Derivative gain factor that multiplies the roll rate error signal when roll rate is above DERIV_DB; generating a positive derivative term of the requested PID stabilizing pressure.

| RSC_REFERENCE_VELOCITY (m/s) | K_D_UP (bar/deg/s) |
|---|---|
| 0 | 1.0 |
| 18.0 | 1.0 |
| 35.0 | 1.0 |
| 83.0 | 1.0 |

K_D_DOWN (linear interpolation function of vehicle speed): Derivative gain factor that multiplies the roll rate error signal when roll rate is below DERIV_DB; generating a negative derivative term of the requested PID stabilizing pressure.

| RSC_REFERENCE_VELOCITY (m/s) | K_D_DOWN (bar/deg/s) |
|---|---|
| 0 | 0.2 |
| 18.0 | 0.2 |
| 35.0 | 0.2 |
| 83.0 | 0.2 |

K_DD_UP (in this example a value of 0. bar/deg/s/s is used): Double derivative gain factor that multiplies the roll acceleration signal when RSC intervention is active and roll acceleration sign matches that of the turn; generating a positive double derivative term of the requested PID stabilizing pressure.

K_DD_DOWN (in this example a value of 0 bar/deg/s/s is used): Double derivative gain factor that multiplies the roll acceleration signal when RSC intervention is not active or roll acceleration sign is opposite that of the turn; generating a nil double derivative term of the requested PID stabilizing pressure.

INTG_DB (linear interpolation function of vehicle speed): Absolute value of Integral deadband above which the error signal input to the Integral term becomes positive.

At nominal speeds, value is chosen in the vicinity of the vehicle roll gradient experienced near 1 g of lateral acceleration.

| RSC_REFERENCE_VELOCITY (m/s) | INTG_DB (deg) |
|---|---|
| 0 | 7.0 |
| 16.0 | 5.2 |
| 32.0 | 5.2 |
| 83.0 | 4.6 |

MAX_INTGRTR_ERROR (in this example a value of 5.0 deg is used): Absolute value of upper bound on the error signal input to the Integral controller. The purpose of this parameter is to prevent integrator windup.

MIN_INTGRTR_ERROR (in this example a value of 5.0 deg is used): Absolute value of lower bound on the error signal input to the Integral controller. The purpose of this parameter is to avoid integrator windup.

K_I (in this example a value of 10.0 bar/deg.s is used): Integral gain factor multiplying the bounded roll angle error signal times loop time, generating the integral term of the requested stabilizing pressure.

PRESSURE_INCREASE_DELTA_FOR_IN-FLECTION_ADJUST (in this example a value of 10 bar is used): The pressure delta that the pressure estimate has to increase by before the downward adjustment of the PID pressure, to an offset (PRESSURE_OFFSET_DURING_PID_RAMP_UP) from the pressure estimate, occurs.

PRESSURE_OFFSET_DURING_PID_RAMP_UP (in this example a value of 20 bar is used): Specifies the maximum delta between PID pressure and estimated pressure, once the inflection adjustment begins.

LMTD_RAMP_DOWN_RATE (in this example a value of −400 bar/s is used): Maximum decrease rate that the PID requested pressure is allowed to ramp down at.

MAX_PRESSURE_DECREASE_TO_ENTER_LMTD_RAMP_DOWN (in this example a value of −0.5 bar is used): Negative delta pressure of the underlying P+I+D+DD sum required to enter the limited PID ramp down mode.

MIN_PRESSURE_INCREASE_TO_STAY_IN_LMTD_RAMP_DOW N (in this example a value of 0.5 bar is used): Positive delta pressure of the underlying P+I+D+DD sum above which limited PID ramp down mode exits.

MAX_RAMP_DOWN_RATE (in this example a value of −300 bar/s is used): Ramp down rate used when opposite front wheel requests PID intervention concurrently as inside wheel is ramping down PID requested pressure.

ENTER_THRES (in this example a value of 30.0 bar is used): PID requested pressure threshold for either front wheel, above which the flag PID_ACTIVE is set. A true value for the aforementioned flag constitutes one of the necessary conditions for activating RSC.

LAT_ACC_ACTVTION_THRSHLD (in this example a value of 5.0 m/s/s is used): Absolute value of vehicle lateral acceleration threshold above which the variable LARGE_LAT_ACC_COUNTER is initialized to LAT_ACC_COUNTER_INIT. A nonzero value of this counter is a necessary condition for activating RSC.

LAT_ACC_COUNTER_INIT (in this example a value of 3.0 sec is used): Time duration assigned to LARGE_LAT_ACC_COUNTER when vehicle lateral acceleration magnitude exceeds LARGE_ROLL_RATE_THRESH.

EXIT_THRES (in this example a value of 10.0 bar is used): PID requested pressure threshold for either front wheel below which the flag PID_ACTIVE resets to false, thus exiting PID control.

WHEEL_STABLE_IN_SLIP (in this example a value of −15% is used): Maximum slip ratio observed on PID controlled wheel before PID intervention can exit.

MIN_PID_PRES_FOR_FORCED_CONTROL_EXIT (in this example a value of 9 bar is used): PID pressure threshold below which PID intervention is forced to exit, in case wheel is allowed to lock for an extended period thus not allowing the WHEEL_STABLE_IN_SLIP criteria to be met.

RECENT_PID_EVNT_THRSHLD (in this example a value of 0.7 sec is used): Period of time during which the history of any PID intervention is logged.

RECENT_AYC_EVNT_THRSHLD (in this example a value of 0.7 sec is used): Period of time during which the history of any AYC intervention is logged.

PID_MINIMUM_ACTIVATION_SPEED (in this example a value of 7.0 m/s is used): Vehicle speed below which RSC system will not activate.

MAXIMUM_SPEED_TO_CONTINUE_PID (in this example a value of 5.0 m/s is used: If vehicle speed falls below this threshold during PID intervention, PID control exits.

MAXIMUM_STBLZ_PRESSURE (in this example a value of 255.0 bar is used).

LOOP_TIME_SEC: (in this example a value of 0.007 sec is used): Sampling time of input signals, as well as maximum allowable execution time of stability control system logic.

Compute PID Desired Braking Pressures Logic

The description of the PID feedback controller for non-tripped roll events follows. An explanation of the calculation of each term is included, and a C-language implementation of the computation is also included.

Figure 9:
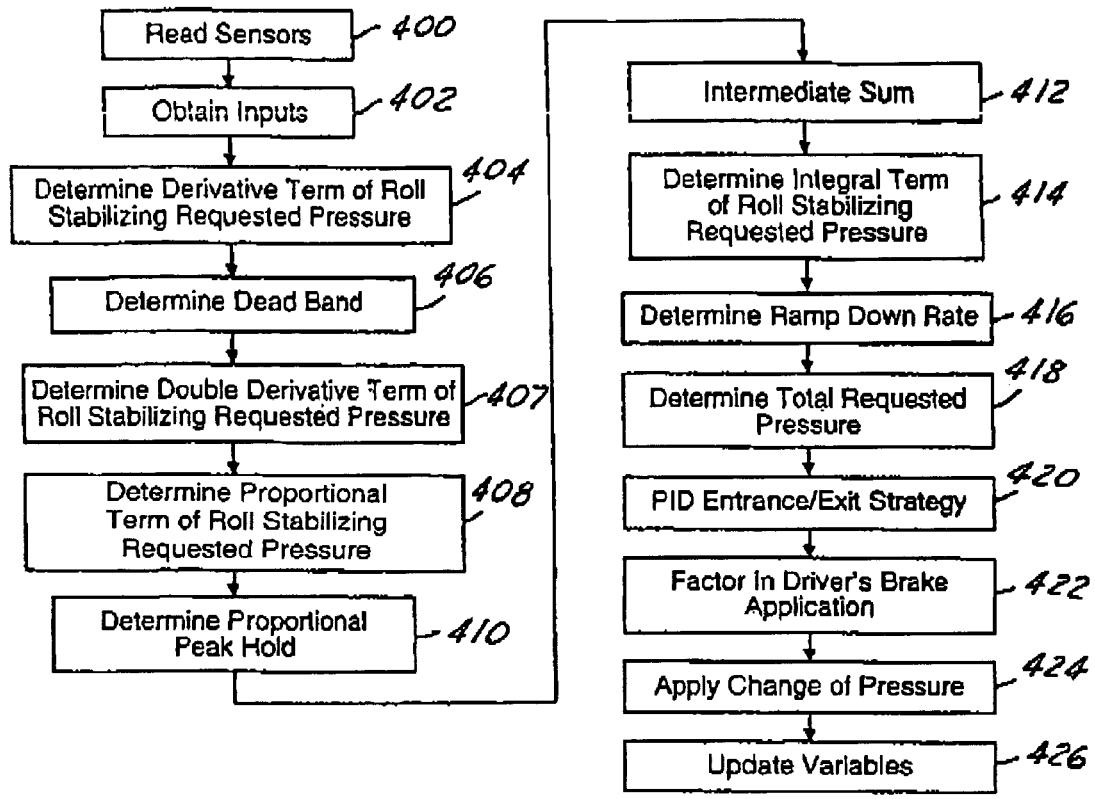
FIG. 9 is flow chart of the operation of one embodiment of the PID controller.

Referring now to FIG. 9, a flowchart illustrating the operation of the PID controller 78 is illustrated. In step 400 the sensors of the system are read. In step 402 the various inputs described above are obtained.

In step 404 a derivative term of the roll stabilizing requested pressures for each front wheel is determined. During PID intervention or if a recent moderately aggressive transition maneuver (as indicated from the transition controller), the derivative deadband determined in step 406 is set to a constant negative threshold (DERIV_DB_DURING_PID_CONTROL) to provide for a prediction of normal load oscillations. Otherwise the derivative deadband (DERIV_DB) is a function of the vehicle's lateral acceleration, nearing zero as the lateral acceleration increases beyond 0.7 g's.

For left turns (positive roll angle), compute derivative pressure term for outer (right) front wheel.

```
if (PID_ACTIVE[FR]|RIGHT_TO_LEFT_TRANSITION)
    derivative_db=DERIV_DB_DURING_PID_CONTROL;
else
    derivative_db=DERIV_DB;
if ((FLT_ROLL_RATE−derivative_db)>0)DrvtvPres
    [FR]=K_D_UP*(FLT_ROLL_RATE−derivative_db);
else
    Drvtvpres[FR]=K_D_DOWN*(FLT_ROLL_RATE−
        Derivative_db);
```

For right turns (negative roll angle), compute derivative pressure term for outer (left) front wheel.

```
if (PID_ACTIVE[FL]||LEFT_TO_RIGHT_TRANSITION)
    derivative_db=DERIV_DB_DURING_PID_CONTROL;
else
    derivative_db=DERIV_DB;
if ((FLT_ROLL_RATE+derivative_db)<0)DrvtvPres[FL]=
    (-1.0)*K_D_UP*(FLT_ROLL_RATE+derivative_db);
else
    DrvtvPres[FL]=(-
1.0)*K_D_DOWN*(FLT_ROLL_RATE+derivative_db);
```

In step 407, the double derivative term of the roll stabilizing requested pressures for each front wheel, based on roll acceleration signal is determined. This term is effective during RSC intervention, as K_DD_DOWN is set to zero.

For left turns (positive roll angle), the double derivative pressure term for outer (right) front wheel is determined.

```
if ((ROLL_ACCELERATION>0)&&RSC_IN_CYCLE)DDPres[FR]
    =K_DD_UP*ROLL_ACCELERATION;
else
    DDPres[FR]=K_DD_DOWN*ROLL_ACCELERATION;
```

For right turns (negative roll angle), compute derivative pressure term for outer (left) front wheel.

```
if ((ROLL_ACCELERATION<0)&&RSC_IN_CYCLE)DDPres[FL]
    =(-1.0)*K_DD_UP*ROLL_ACCELERATION;
else
    DDPres[FL]=(-1.0)*K_DD_DOWN*ROLL_ACCELERATION;
```

In step 408 a proportional term of the roll stabilizing requested pressures for each front wheel is determined. A roll signal for control is determined based on the vehicle angle. In the present example the ROLL_SIG_FOR_CONTROL is based on the difference between ROLL_ANGLE_TOTAL and REFERENCE_BANK_ANGLE as set forth in:
ROLL_SIG_FOR_CONTROL=ROLL_ANGLE_TOTAL-REFERENCE_BANK_ANGLE;

The proportional term is based on roll angle error signal formed by subtracting a deadband, of value PROP_DB, from the input control signal ROLL_SIG_FOR_CONTROL. This error signal is then multiplied by the proportional gain factor K_P to obtain the proportional pressure term.

For left turns (positive roll angle), compute proportional pressure term for outer (right) front wheel.

```
if ((ROLL_SIG_FOR_CONTROL-PROP_DB)>0)PropPres[FR]
    =(ROLL_SIG_FOR_CONTROL-PROP_DB)*K_P_UP;
else
    PropPres[FR]=(ROLL_SIG_FOR_CONTROL-PROP_DB)
    *K_P_DOWN;
```

A history of recent large positive roll rate is kept. The history is used as a screening criteria for initiating proportional peak hold logic described thereafter. RECENT_LARGE_PSTV_ROLL_RATE_TIMER is used to keep track of this criteria.

```
if (FLT_ROLL_RATE>LARGE_ROLL_RATE_THRESH)
{
    RECENT_LARGE_PSTV_ROLL_RATE_TIMER=
        RECENT_LARGE_ROLL_RATE;
}
else if (RECENT_LARGE_PSTV_ROLL_RATE_TIMER>0)
{
RECENT_LARGE_PSTV_ROLL_RATE_TIMER--;
}
if (RECENT_LARGE_PSTV_ROLL_RATE_TIMER>0)RECENT_
    LARGE_PSTV_ROLL_RATE=TRUE;
else
    RECENT_LARGE_PSTV_ROLL_RATE=FALSE;
```

Proportional peak hold logic: When a large positive roll divergence starts building, as indicated by roll signal for control exceeding PROP_HOLD_ANGLE_THRESHOLD and corroborated by the existence of a recent large positive roll rate, a constant base level of PID pressure to achieve a consistent level of deep slip on the wheel is maintained. This helps mitigate vehicle bounce during aggressive maneuvers. The constant base level is obtained by holding the peak value of the proportional term until the next proportional peak that exceeds the threshold, or until a timer (PROP_PEAK_HOLD_TIMER[FR]) runs out.

Figure 10:
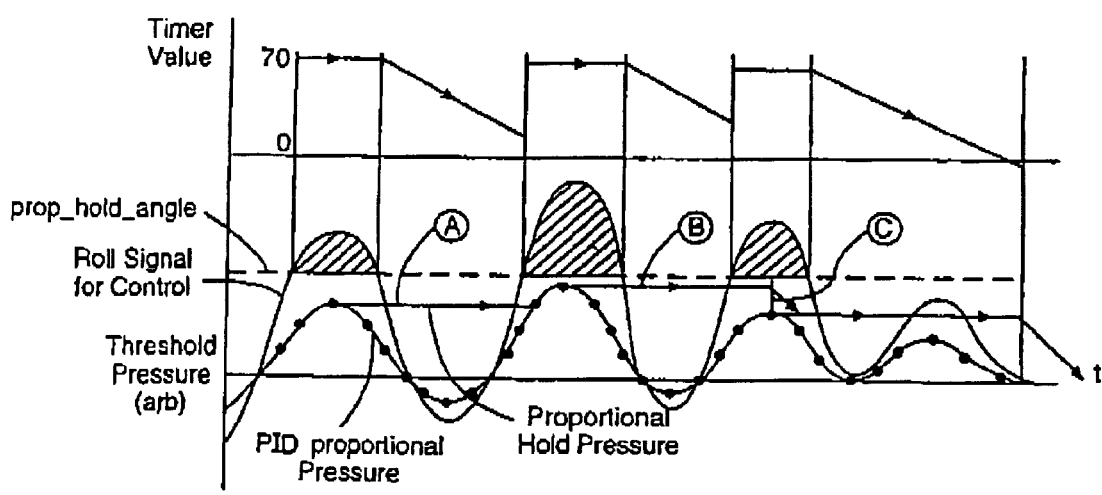
FIG. 10 is plot of a proportional peak hold strategy.

FIG. 10 depicts the intended proportional peak hold strategy. In region A the proportional signal is held. In region B, because the new proportional peak pressure is increasing, the proportional hold pressure is allowed to track to a new peak. In region C the proportional pressure decreases, so the hold pressure is ramped down. In. Region D the hold pressure continues to ramp down since the proportional pressure continues to decrease. It should be noted that the proportional peak hold value is held at least until the timer is reset. The countdown timer is maintained at its peak value until the roll signal for control drops below the proportional hold angle threshold.

This is set forth in the following logic:

```
if ((ROLL_SIG_FOR_CONTROL>PROP_HOLD_ANGLE_
        THRESHOLD)
    &&(RECENT_LARGE_PSTV_ROLL_RATE||(PROP_PEAK_
        HOLD_TIMER[FR]>0)))
{ //roll angle exceeds threshold AND recent large
positive roll rate was seen or have already entered
prop peak hold mode, //enter/keep in prop peak hold
mode
if (PROP_PEAK_HOLD_TIMER[FR]==0)
{    //first divergent oscillation indicated
     by a null prop hold timer
INITIAL_DIVERGENT_OSCILLATION[FR]=TRUE;
}
if (INITIAL_DIVERGENT_OSCILLATION[FR])
{    //prop hold logic for first divergent
     oscillation
    PROP_PEAK_HOLD_TIMER[FR]=PROP_HOLD_LOOPS;
    //set timer to max value during divergence
    if (PropPres[FR]>=REFERENCE_PROP_PEAK_HOLD
        [FR])
    {    //PropPres is still rising, let PeakHold
         track it
        REFERENCE_PROP_PEAK_HOLD[FR]=PropPres
            [FR];
        PROP_PEAK_HOLD[FR]=FALSE;
}
else
{    //PropPres is no longer rising, assign latched
     PeakHold to PropPres
    PropPres[FR]=REFERENCE_PROP_PEAK_HOLD[FR];
```

-continued
```
            PROP_PEAK_HOLD[FR]=TRUE;
        }
    }
    else //prop hold logic for subsequent divergent
        oscillations
    {
        PROP_PEAK_HOLD_TIMER[FR]=PROP_HOLD_LOOPS;//set
            timer to max value during
            divergence//Logic to handle transitions
            to a higher or lower subsequent
            proportional peak roll signal
            if (PropPres[FR]>NEW_PROP_PEAK_HOLD[FR])
        {    //Prop Pres is still rising, assign a
            NewPeakHold to track it
            NEW_PROP_PEAK_HOLD[FR]=PropPres[FR];
            TRACKING_NEXT_PEAK[FR]=TRUE;//flag
            indicating NewPeakHold is in tracking
            mode RAMP_DOWN_TO_NEW_PROP_PEAK[FR]
            =FALSE; //reset ramp down once tracking
            peak starts
        }
        else
        {    //PropPres is no longer rising, reset
            tracking flag
            TRACKING_NEXT_PEAK[FR]=FALSE;
        }
        //Logic to handle transition from Reference
            PeakHold to NewPeakHold
            if
    ((PropPres[FR]>REFERENCE_PROP_PEAK_HOLD[FR])&&
            TRACKING_NEXT_PEAK[FR])
        {    //allow PropPres increase above prior PeakHold
            during tracking mode
                PROP_PEAK_HOLD[FR]=FALSE;
        }
        else if ((PropPres[FR]>REFERENCE_PROP_PEAK_HOLD
            [FR])&&!TRACKING_NEXT_PEAK[FR])
        {    //NewPeakHold is latched and is > prior
            PeakHold, so REFERENCE_PROP_PEAK_HOLD[FR]=NEW_
            PROP_PEAK_HOLD[FR];//assign NewPeakHold
    //to PeakHold, and
            PropPres[FR]=REFERENCE_PROP_PEAK_HOLD[FR]
            //assign latched NewPeakHold to PropPres
            RAMP_DOWN_TO_NEW_PROP_PEAK[FR]=FALSE;
            //since ramp up to NewPeakHold occurred,
            //ramp   down   is   not   active
                PROP_PEAK_HOLD[FR]=TRUE;
        }
        else if ((PropPres[FR]<REFERENCE_PROP_PEAK_
            HOLD[FR]))
        {
            if (!TRACKING_NEXT_PEAK[FR]
                &&(REFERENCE_PROP_PEAK_HOLD[FR]>NEW_
                    PROP_PEAK_HOLD[FR]))
            {    //NewPeakHold is latched and is<prior
                PeakHold, REFERENCE_PROP_PEAK_HOLD[FR]
                -=PROP_PEAK_RAMP_DOWN_RATE*
                LOOP_TIME_SEC;
                //ramp down prior PeakHold toNewPeak
                Hold,RAMP_DOWN_TO_NEW_PROP_PEAK[FR]=TRUE;
                //indicate ramp down is in effect
                    if (REFERENCE_PROP_PEAK_HOLD[FR]<NEW_
                        PROP_PEAK_HOLD[FR])
        {    //ramp down of prior PeakHold brings it
            to NewPeakHold level, // assign NewPeak
            Hold to PeakHold, and REFERENCE_PROP_PEAK_
            HOLD[FR]=NEW_PROP_PEAK_HOLD[FR];
            RAMP_DOWN_TO_NEW_PROP_PEAK[FR]=FALSE;
            //indicate end of ramp down//of PeakHold
            towards NewPeakHold
        }
    }
    PropPres[FR]=REFERENCE_PROP_PEAK_HOLD[FR];//assign
        PeakHold to PropPresPROP_PEAK_HOLD[FR]=TRUE;
            }
        }
    }
    else
    {    //roll angle is <=threshold, so decrement
        timer and assign PropPres to PeakHold if
        (PROP_PEAK_HOLD_TIMER[FR]>1)
    {       //PropHold timer is>1, therefore hold
            PropPres INITIAL_DIVERGENT_
            OSCILLATION[FR]=FALSE; //first divergent
            oscillation of prop peak hold mode has
            ended PROP_PEAK_HOLD_TIMER[FR]--;
            //decrement PropHold timer
            if (RAMP_DOWN_TO_NEW_PROP_PEAK[FR])
    {    //ramp down of prior PeakHold to NewPeakHold
        is not completed, continue till done
            REFERENCE_PROP_PEAK_HOLD[FR]-PROP_PEAK_
                RAMP_DOWN_RATE*LOOP_TIME_SEC;
    {    //ramp down prior PeakHold to NewPeakHold
            if (REFERENCE_PROP_PEAK_HOLD[FR]<NEW_
                PROP_PEAK_HOLD[FR])
            {    //ramp down of prior PeakHold brings
                it to NewPeakHold level,
                //assign NewPeakHold to PeakHold
                REFERENCE_PROP_PEAK_HOLD[FR]=NEW_
                    PROP_PEAK_HOLD[FR];
                RAMP_DOWN_TO_NEW_PROP_PEAK[FR]
                =FALSE;//indicate end of ramp down
                of
    //PeakHold towards NewPeakHold
            }
        }
        else
        {    //ramp down from old to new PeakHold
            has ended or was not in effect, so reset
            NewPeakHold state
                NEW_PROP_PEAK_HOLD[FR]=0;
        }
        if (PropPres[FR]<REFERENCE_PROP_PEAK_HOLD[FR])
        {    //overwrite decreasing PropPres with
            PeakHold during peak hold mode
                PropPres[FR]=REFERENCE_PROP_PEAK_HOLD
                [FR];
                PROP_PEAK_HOLD[FR]=TRUE;
        }
        else
        {    //PropPres is higher than PeakHold, allow
            PropPres increase above PeakHold by
            PROP_PEAK_HOLD[FR]=FALSE; //exiting prop
            hold mode and keeping upstream PropPres
        }
    }
    else //PropHold timer<=1, ramp out of prop PeakHold
        if it existed //otherwise upstream PropPres
        value is kept unchanged
    {
        if (PROP_PEAK_HOLD_TIMER[FR]==1)
        {       //prop hold mode was in effect, set flag
            indicating ramp down of PeakHold to PropPres
                RAMP_DOWN_PROP_HOLD_TO_PROP_PRES[FR]
                =TRUE;
            PROP_PEAK_HOLD_TIMER[FR]=0;
        }
        if (RAMP_DOWN_PROP_HOLD_TO_PROP_PRES[FR])
        {    //ramp down of PeakHold to PropPres
            if (REFERENCE_PROP_PEAK_HOLD[FR]
                >(PropPres[FR]
                +PROP_PEAK_RAMP_DOWN_RATE*
                LOOP_TIME_SEC))
            {
                REFERENCE_PROP_PEAK_HOLD[FR]-=PROP_PEAK_
                    RAMP_DOWN_RATE*LOOP_TIME_SEC;//ramp
                    down prior PeakHold to NewPeakHold
                    PropPres[FR]=REFERENCE_PROP_PEAK_
                        HOLD[FR];
            }
            else //PeakHold reached upstream PropPres, end
                ramp down and exit prop hold logic
            {
                REFERENCE_PROP_PEAK_HOLD[FR]=0;
                RAMP_DOWN_PROP_HOLD_TO_PROP_PRES[FR]
                    =FALSE;
            }
        }
```

-continued

```
else //ramp down of PeakHold to PropPres has ended,
or
{    //roll angle never exceeded threshold,
therefore REFERENCE_PROP_PEAK_HOLD[FR]=0;//reset
reference prop peak pressure
}
NEW_PROP_PEAK_HOLD[FR]=0;
PROP_PEAK_HOLD[FR]=FALSE;
RAMP_DOWN_TO_NEW_PROP_PEAK[FR]=FALSE;
    }
}
```

For right turns (negative roll angle), compute proportional pressure term for outer (left) front wheel by:

```
if ((ROLL_SIG_FOR_CONTROL+PROP_DB)<0)
    PropPres[FL]=(-1.0)*(ROLL_STG_FOR_CONTROL+PROP_
        DB)*K_P_UP;
else
    PropPres[FL]=(-1.0)*(ROLL_SIG_FOR_CONTROL+PROP_
        DB)*K_P_DOWN;
```

Keep history of recent large negative roll rate, which is used as a screening criteria for initiating proportional peak hold logic thereafter. RECENT_LARGE_NGTV_ROLL_RATE_TIMER is used to keep track of the criteria.

```
if (FLT_ROLL_RATE<(-1*LARGE_ROLL_RATE_THRESH))
{
    RECENT_LARGE_NGTV_ROLL_RATE_TIMER=RECENT_
        LARGE_ROLL_RATE;
}
else if (RECENT_LARGE_NGTV_ROLL_RATE_TIMER>0)
{
    RECENT_LARGE_NGTV_ROLL_RATE_TIMER--;
}
if (RECENT_LARGE_NGTV_ROLL_RATE_TIMER>0)RECENT_
    LARGE_NGTV_ROLL_RATE=TRUE;
else
    RECENT_LARGE_NGTV_ROLL_RATE=FALSE;
```

When a large negative roll divergence starts building, as indicated by roll signal for control exceeding PROP_HOLD_ANGLE_THRESHOLD and corroborated by the existence of a recent large negative roll rate, this strategy serves to keep a constant base level of PID pressure to achieve a consistent level of deep slip on the wheel and thus help mitigate vehicle bounce during aggressive maneuvers. The constant base level is obtained by holding the peak value of the proportional term until the next proportional peak that exceeds the threshold, or until PROP_PEAK_HOLD_TIMER[FL] runs out.

```
if ((ROLL_SIG_FOR_CONTROL<(-1.0*PROP_HOLD_ANGLE_
    THRESHOLD))
    &&(RECENT_LARGE_NGTV_ROLL_RATE||(PROP_PEAK_
    HOLD_TIMER[FL]>0))
)
{   //roll angle exceeds threshold AND recent
large negative roll rate was seen or have already
entered prop peak hold mode,
//enter/keep in prop peak hold mode
if (PROP_PEAK_HOLD_TIMER[FL]==0)
{       //first divergent oscillation indicated
        by a null prop hold timer
        INITIAL_DIVERGENT_OSCILLATION[FL]=TRUE;
}
if (INITIAL_DIVERGENT_OSCILLATION[FL])
{       //prop hold logic for first divergent
        oscillation
        PROP_PEAK_HOLD_TIMER[FL]=PROP_HOLD_LOOPS;
        //set timer to max value during
            divergence
    if (PropPres[FL]>=REFERENCE_PROP_PEAK_HOLD
        [FL])
    {   //PropPres is still rising, let PeakHold
        track it
        REFERENCE_PROP_PEAK_HOLD[FL]=PropPres
            [FL];
        PROP_PEAK_HOLD[FL]=FALSE;
    }
    else
    {   //PropPres is no longer rising, assign
        latched PeakHold to PropPres
        PropPres[FL]=REFERENCE_PROP_PEAK_HOLD
            [FL];
        PROP_PEAK_HOLD[FL]=TRUE;
    }
}
else    //prop hold logic for subsequent
        divergent oscillations
{
    PROP_PEAK_HOLD_TIMER[FL]=PROP_HOLD_LOOPS;
    //set timer to max value during divergence
        //Logic to handle transitions to a higher
    or lower subsequent proportional peak roll
    signal
        if (PropPres[FL]>NEW_PROP_PEAK_HOLD[FL])
        {   //PropPres is still rising, assign a
            NewPeakHold to track it
            NEW_PROP_PEAK_HOLD[FL]=PropPres[FL];
            TRACKING_NEXT_PEAK[FL]=TRUE;//flag
            indicating NewPeakHold is in tracking
            mode
            RAMP_DOWN_TO_NEW_PROP_PEAK[FL]=FALSE;
            //reset ramp down once tracking peak
                starts
        }
    else
    {   //PropPres is no longer rising, reset tracking
        flag
        TRACKING_NEXT_PEAK[FL]=FALSE;
    }
//Logic to handle transition from ReferencePeakHold
to NewPeakHold
        if
((PropPres[FL]>REFERENCE_PROP_PEAK_HOLD[FL])
    &&TRACKING_NEXT_PEAK[FL])
    {   //allow PropPres increase above prior PeakHold
        during tracking modePROP_PEAK_HOLD[FL]=FALSE;
    }
else if ((PropPres[FL]>REFERENCE_PROP_PEAK_
    HOLD[FL])&&!TRACKING_NEXT_PEAK[FL])
{   //NewPeakHold is latched and is>prior
    PeakHold, so REFERENCE_PROP_PEAK_HOLD[FL]=NEW_
PROP_PEAK_HOLD[FL];
//assign NewPeakHold
//to PeakHold, and PropPres[FL]
=REFERENCE_PROP_PEAK_HOLD[FL];
//assign latched NewPeakHold to PropPres
    RAMP_DOWN_TO_NEW_PROP_PEAK[FL] =FALSE;
//since ramp up to NewPeakHold occurred,
// ramp down is not active PROP_PEAK_HOLD
[FL]=TRUE;
}
else if ((PropPres[FL]<REFERENCE_PROP_PEAK_HOLD
    [FL]))
{
if (!TRACKING_NEXT_PEAK[FL]&&(REFERENCE_PROP_
    PEAK_HOLD[FL]>NEW_PROP_PEAK_HOLD[FL]))
{   //NewPeakHold  is  latched  and  is<prior
PeakHold, REFERENCE_PROP_PEAK_HOLD[FL]-=PROP_PEAK_
    RAMP_DOWN_RATE*LOOP_TIME_SEC;
//ramp down prior PeakHold to
```

-continued
```
NewPeakHold, RAMP_DOWN_TO_NEW_PROP_PEAK[FL]=TRUE;
//indicate ramp down is in effect
if (REFERENCE_PROP_PEAK_HOLD[FL]<NEW_PROP_PEAK_
    HOLD[FL])
{   //ramp down of prior PeakHold brings it to
NewPeakHold  level,  //assign  NewPeakHold to
PeakHold, and REFERENCE_PROP_PEAK_HOLD[FL]=NEW_
PROP_PEAK_HOLD[FL];
RAMP_DOWN_TO_NEW_PROP_PEAK[FL]=FALSE; //indicate
end of ramp down
// of PeakHold towards NewPeakHold
}
}
PropPres[FL]=REFERENCE_PROP_PEAK_HOLD[FL];
    //assign    PeakHold     to     PropPres
    PROP_PEAK_HOLD[FL]=TRUE;
}
}
}
else
{   //roll angle is<=threshold, so decrement timer
and assign PropPres to PeakHold
if (PROP_PEAK_HOLD_TIMER[FL]>1)
{   //PropHold timer is > 1, therefore hold
PropPres
INITIAL_DIVERGENT_OSCILLATION[FL]=FALSE;
//first divergent oscillation of prop peak hold
mode has ended PROP_PEAK_HOLD_TIMER[FL]--;
//decrement PropHold timer
if (RAMP_DOWN_TO_NEW_PROP_PEAK[FL])
{   //ramp down of prior PeakHold to NewPeakHold
is not completed, continue till done
    REFERENCE_PROP_PEAK_HOLD[FL]-=PROP_
PEAK_RAMP_DOWN_RATE*LOOP_TIME_SEC;
// ramp down prior PeakHold to NewPeakHold
if (REFERENCE_PROP_PEAK_HOLD[FL]<NEW_PROP_
PEAK_HOLD[FL])
{   //ramp down of prior PeakHold brings it to
NewPeakHold level,
    //assign NewPeakHold to PeakHoldREFERENCE_
PROP_PEAK_HOLD[FL]=NEW_PROP_PEAK_HOLD[FL];
RAMP_DOWN_TO_NEW_PROP_PEAK[FL]=FALSE;   //indicate
end of ramp down of //PeakHold towards NewPeakHold
}
}
else
    {   //ramp down from old to new PeakHold has
        ended or was not in effect, so reset New
        PeakHold stateNEW_PROP_PEAK_HOLD
[FL]=0;
}
if (PropPres[FL]<REFERENCE_PROP_PEAK_HOLD[FL])
{   //overwrite decreasing PropPres with PeakHold
during peak hold mode PropPres[FL]=REFERENCE_PROP_
PEAK_HOLD[FL];PROP_PEAK_HOLD[FL]=TRUE;
}
else
    {   //PropPres is higher than PeakHold, allow
        PropPres  increase  above  PeakHold   by
        PROP_PEAK_HOLD[FL]= FALSE;
//exiting prop hold mode and keeping upstream
PropPres
}
}
else //PropHold timer<=1, ramp out of prop PeakHold
if it existed
//otherwise  upstream  PropPres  value  is  kept
unchanged
{
if (PROP_PEAK_HOLD_TIMER[FL]==1)
{   //prop hold mode was in effect, set flag
indicating ramp down of PeakHold to PropPres
RAMP_DOWN_HOLD_TO_PROP_PRES[FL]=TRUE;
PROP_PEAK_HOLD_TIMER[FL]=0;
}
if (RAMP_DOWN_HOLD_TO_PROP_PRES[FL])
{   //ramp down of PeakHold to PropPres
if (REFERENCE_PROP_PEAK_HOLD[FL]>
(PropPres[FL]
    +PROP_PEAK_RAMP_DOWN_RATE*LOOP_TIME_SEC))
{
    REFERENCE_PROP_PEAK_HOLD[FL]-=PROP
    _PEAK_RAMP_DOWN_RATE*LOOP_TIME_SEC;
//ramp down prior PeakHold to NewPeakHoldPropPres
    [FL]=REFERENCE_PROP_PEAK_HOLD[FL];
}
else //PeakHold reached upstream PropPres, end
ramp down and exit prop hold logic
{
REFERENCE_PROP_PEAK_HOLD[FL]=0;
RAMP_DOWN_PROP_HOLD_TO_PROP_PRES[FL]=FALSE;
}
}
else //ramp down of PeakHold to PropPres has ended,
or
{    //roll  angle  never  exceeded  threshold,
therefore REFERENCE_PROP_PEAK_HOLD[FL]=0;
    //reset reference prop peak pressure
}
    NEW_PROP_PEAK_HOLD[FL]=0;
    PROP_PEAK_HOLD[FL]=FALSE;
    RAMP_DOWN_TO_NEW_PROP_PEAK[FL]=FALSE;
}
}
```

Referring back to FIG. 9, in step 412 an intermediate sum of the P, D and DD pressures for front left and front right wheels may be obtained as follows:

```
//Calculate current loop's value of P_D_DD sum for
    front right wheel P_D_DD_Sum [FR]=PropPres[FR]
    +DrvtvPres[FR]+DDPres[FR];
//Calculate current loop's value of P_D_DD sum for
    front left wheel P_D_DD_Sum [FL]=PropPres[FL]
    +DrvtvPres[FL]+DDPres[FL];
```

In step 414 an integral term of the roll stabilizing requested pressures for each front wheel is determined. A deadband, of value INTG_DB, is subtracted from ROLL_SIG_FOR_CONTROL to form the input error signal to the integral pressure term.

For the integral term, special precaution has to be taken regarding integral windup. Integrator windup is a condition that occurs when the input error signal remains large; which in turn causes the integrator term to grow (wind up) to very large values. Even after the roll angle falls within the target deadband, the integrator term takes an excessively long time to unwind; thus continuing to needlessly command control pressure. In order to avoid this situation, the following steps are applied: Impose an upper and lower bound on the input error signal [ROLL_SIG_FOR_CONTROL −INTG_DB], defined by MAX_INTGRTR_ERROR and MIN_INTGR-TR_ERROR respectively. This limits the error term that gets added (integrated) each execution loop and compute an integral pressure term based on this bound input error signal.

For left turns (positive roll angle), the integral pressure term for outer (right) front wheel is determined by:

```
//Compute raw value of Integral error for right
wheel IntegralError[FR]=ROLL_SIG_FOR_CONTROL-
INTG_DB;
//Put bounds on min and max values of the integral
error, to prevent integrator windup IntegralError
[FR]=LIMIT (IntegralError[FR], ((-1)*MIN_INTGRTR_
ERROR), MAX_INTGRTR_ERROR);
```

```
//Compute cumulative Integrator term IntegPres[FR]=
    INTGRAL_PRESSR[FR]+(IntegralError[FR]*K_I*LOOP_
    TIME_SEC);
INTGRAL_PRESSR[FR]=IntegPres[FR];
//Limit integral term to be as negative as the P,
    D, DD sum is positive, so as not to delay   //a fast
    ramping positive P+D+DD pressure
    if ((INTGRAL_PRESSR[FR]<0)&&(P_D_DD_Sum[FR]>0)
    &&(INTGRAL_PRESSR[FR]<(-P_D_DD_Sum[FR])) )
        INTGRAL_PRESSR[FR]=-P_D_DD_Sum[FR];
//If both integral pressure and PD sum are
    negative, zero out the integral pressure term
//so as not to delay total req. pressure from
    ramping up when the PD sum does become
    positive
    else if ((INTGRAL_PRESSR[FR]<0)&&(P_D_DD_Sum
        [FR]<0))INTGRAL_PRESSR[FR]=0;
```

For right turns (negative roll angle), the integral pressure term for outer (left) front wheel is determined by:

```
//Compute raw value of Integral error for right
    wheel IntegralError[FL]=ROLL_SIG_FOR_CONTROL+
    INTG_DB;
//Put bounds on min and max values of the integral
    error, to prevent integrator windup Integral
    Error[FL]=LIMIT(IntegralError[FL], ((-1)*MAX_
    INTGRTR_ERROR), MIN_INTGRTR_ERROR);
//Compute cumulative Integrator term IntegPres[FL]=
    INTGRAL_PRESSR[FL]-(IntegralError[FR]
    *K_I*LOOP_TIME_SEC);
INTGRAL_PRESSR[FL]=IntegPres[FL];
//  Limit integral term to be as negative as the P,
    D, DD sum is positive, so as not to delay
//  a fast ramping positive P+D+DD pressure
    if ((INTGRAL_PRESSR[FL]<0)&&(P_D_DD_Sum
    [FL]>0)&&(INTGRAL_PRESSR[FL]<(-P_D_DD_Sum
    [FL]))) INTGRAL_PRESSR[FL]=-P_D_DD_
    Sum[FL];
//If both integral pressure and PD sum are
    negative, zero out the integral pressure term //so
    as not to delay total req. pressure from ramping up
    when the PD sum does become positive
    else if ((INTGRAL_PRESSR[FL]<0)&&(P_D_DD_Sum[FL]<
        0))INTGRAL_PRESSR[FL]=0;
```

In step 416 the ramp down rate of PID requested pressure while PID intervention is active is limited. The hydraulic control unit can release pressure faster than it can build it. So to provide for a more uniform PID pressure request, the ramp down rate of PID pressure is limited to the symmetrical value of the hydraulics build rate. This helps keep a consistent level of slip on the control wheel which in turn reduces possible roll oscillations. This is performed by the following logic:

```
for (WheelIndex=FL; WheelIndex<=FR; WheelIndex++)
{
//Calculate upstream unlimited delta pressure
request Raw_DeltaP[WheelIndex]=INTGRAL_PRESSR
    [WheelIndex]+P_D_DD_Sum[WheelIndex]-Z1_PID_DD_SUM
    [WheelIndex];
//Conditions for entering and keeping in ramp down
    limit logic if (PID_ACTIVE[WheelIndex]&&(((Raw_
    DeltaP[WheelIndex]<MAX_PRESSURE_DECREASE_TO_
    ENTER_LMTD_RAMP_DOWN)
    &&!LIMITED_RAMP_DOWN_
    RATE_MODE[WheelIndex]),
||((Raw_DeltaP[WheelIndex]<MIN_PRESSURE_INCREASE_TO_
    STAY_IN_LMTD_RAMP_DOWN)
    &&LIMITED_RAMP_DOWN_
    RATE_MODE[WheelIndex])))
{
//Set limited ramp down rate mode to true LIMITED_
    RAMP_DOWN_RATE_MODE[WheelIndex] =TRUE;
LmtdRampDownRate=LMTD_RAMP_DOWN_RATE;
//If opposite front wheel starts requesting PID
pressure, override ramp down rate by mirror value
of max
//hydraulics build rate if (PID_ACTIVE[CROSS_AXLE_
    WHEEL(WheelIndex)])
{
LmtdRampDownRate=MAX_RAMP_DOWN_RATE;
}
//calculate delta pressure decrease term for
current loop, by capping lower limit to
LmtdRampDownRate
//Given that the delta will be negative, take the
maximum of it and the ramp down rate limitLmtd_
DeltaP_For_RmpDwn[WheelIndex]=max(Raw_DeltaP
    [WheelIndex], LmtdRampDownRate);
}
else //Limited ramp down rate mode was not entered
{
    //Set limited ramp down rate mode to false
state
    LIMITED_RAMP_DOWN_RATE_MODE[WheelIndex]=FALSE;
}
}
```

In step 418 the total PID requested pressure of the current loop is determined according to the following four modes:

```
for (WheelIndex=FL; WheelIndex<=FR; WheelIndex++)
{
    //Save P,I,D,DD sum for next loopZ1_PID_DD_
        SUM[WheelIndex]=P_D_DD_Sum[WheelIndex]+
        INTGRAL_PRESSR[WheelIndex];
(1)  If in ramp down mode, decrement by limited ramp
down delta if (LIMITED_RAMP_DOWN_RATE_MODE
[WheelIndex])
{
    PIDStblzPres[WheelIndex]=PID_STBLZ_PRES[Wheel
Index]+Lmtd_DeltaP_For_RmpDwn[WheelIndex];
}
(2)  If total increasing PID pressure is positive
and PID control is active, limit pressure increase
delta to take into account actuator drive limits.
The limit becomes effective once pressure estimate
increases by PRESSURE_INCREASE_DELTA_FOR_INFLECTION_
ADJUST from initial pressure estimate value upon
```

-continued activation, then will remain in effect as long as
pressure estimate remains above the exit threshold
(EXIT_THRES)
else if (PID_ACTIVE [WheelIndex]
&&((P_D_DD_Sum[WheelIndex]+INTGRAL_PRESSR
[WheelIndex])>0)
&&((((BRAKE_PRESSR_ESTMT[WheelIndex]-PRES_
EST_UPON_PID_INCREASE[WheelIndex])>
PRESSURE_INCREASE_DELTA_FOR_INFLECTION_ADJUST)
&&(!INITIAL_ADJUST_HAS_OCCURRED[WheelIndex]))
||((BRAKE_PRESSR_ESTMT[WheelIndex]>EXIT_THRES)
&&(INITIAL_ADJUST_HAS_OCCURRED[WheelIndex])))
)
{
if ((PID_STBLZ_PRES[WheelIndex]+Raw_DeltaP[Wheel
    Index]-BRAKE_PRESSR_ESTMT[WheelIndex])>
    PRESSURE_OFFSET_DURING_PID_RAMP_UP)
{
    PIDStblzPres[WheelIndex]=BRAKE_PRESSR_ESTMT
        [WheelIndex]+ PRESSURE_OFFSET_DURING_PID_
        RAMP_UP;
}
else
{
    PIDStblzPres[WheelIndex]=PID_STBLZ_PRES[Wheel
    Index]+Raw_DeltaP[WheelIndex];
}
//Logic for detecting initial adjustment of
req. pressure towards pressure estimate during
ramp up phase
if (!INITIAL_ADJUST_TO_PRES_ESTMT [WheelIndex]
&&!INITIAL_ADJUST_HAS_OCCURRED[WheelIndex])
{
    INITIAL_ADJUST_TO_PRES_ESTMT [WheelIndex]=
    TRUE;
    INITIAL_ADJUST_HAS_OCCURRED[WheelIndex]=
    TRUE;
}
//Set INITIAL_ADJUST_TO_PRES_ESTMT flag for
only one loop's duration per activation cycle
        else
            INITIAL_ADJUST_TO_PRES_ESTMT [Wheel
            Index]=FALSE;
}
(3)If total increasing PID pressure is positive and
PID control is active, but pressure estimate has
not yet increased over the activation pressure
estimate by PRESSURE_INCREASE_DELTA_FOR_INFLECTION_
ADJUST, assign total PID pressure to prior total
plus the upstream unlimited delta pressure
increase.
else if (PID_ACTIVE [WheelIndex]&&((P_D_DD_Sum
[WheelIndex]+INTGRAL_PRESSR[WheelIndex])>0))
{
    PIDStblzPres[WheelIndex]=PID_STBLZ_PRES[Wheel
    Index]+Raw_DeltaP[WheelIndex];
}
(4)If PID control is active but underlying P,I,D,DD
pressure sum is negative, OR PID is not active, the
total PID pressure is assigned to the underlying
P,I,D,DD pressure sum.
else
    PIDStblzPres[WheelIndex]=P_D_DD_Sum[Wheel
    Index]+INTGRAL_PRESSR[WheelIndex];
    PIDStblzPres[WheelIndex]=LIMIT(PIDStblzPres
    [WheelIndex], 0, MAXIMUM_STBLZ_PRESSURE);
} /*End for loop*/

The PID control entrance and exit strategy is performed in step 420. A history of vehicle lateral acceleration exceeding a given large threshold is kept to be used as a screening criteria for PID activation is performed.

```
if (ABS(CG_FLT_LAT_ACC)>LAT_ACC_ACTVTION_THRSHLD)
    LARGE_LAT_ACC_COUNTER=LAT_ACC_COUNTER_INIT;
else if (LARGE_LAT_ACC_COUNTER>0)
    LARGE_LAT_ACC_COUNTER--;
```

PID control is enabled in the following.

```
if ((LARGE_LAT_ACC_COUNTER>0)
    // Large lat acc or recent history of large
    lat acc
    &&((REF_VELOCITY_YC>PID_MINIMUM_ACTIVATION_
    SPEED)||
        ((PID_ACTIVE [FL]||PID_ACTIVE[FR])&&
        (REF_VELOCITY_YC>MAXIMUM_SPEED_TO_
        CONTINUE_PID))
    )
    &&(!RSC_DISABLED)       //RSC system is enabled,
    no shutdowns exist
    &&(!REVERSE_MOVEMENT)   //Allow activation
    only going forward
    &&(!STATUS_FIRST_RUN)   //Allow activation
    only after first run becomes false
)
    EnablePIDControl=TRUE;
else
    EnablePIDControl=FALSE;
```

Activating/deactivating individual wheel PID control, figuring in Driver Brake Apply is determined in step 422. This is set forth in the following code:

```
for (WheelIndex=FL; WheelIndex<=FR; WheelIndex++)
{
    if (PID_ACTIVE [WheelIndex])
    {   //PID control already active on wheel,
        check for existence of de-activation
        conditions
        if (!EnablePIDControl||
            //Enforce exit when PID pressure
            goes below 9 bar(PIDStblzPres
            [WheelIndex]<=MIN_PID_PRES_FOR_
            FORCED_CONTROL_EXIT)||
            //Once PID control pressure gets
            within ~10 bar of driver pressure
            AND ((PIDStblzPres[WheelIndex]<
            (DRIVER_REQ_PRESSURE+EXIT_THRES))
            && //PID control pressure is less
            than or equal to wheel pressure
            estimate (in case pressure build
            //is in a slow build mode and thus
            not reflecting driver pressure) AND
            */(PIDStblzPres[WheelIndex]<=(BRAKE_
            PRESSR_ESTMT[WheelIndex]))&&
            //wheel slip ratio is greater than~
            -15% to indicate appropriateness for
            ABShandoff */(SLIP_RATIO[WheelIndex]>=
            WHEEL_STABLE_IN_SLIP)))
    {
        PID_ACTIVE[WheelIndex]=FALSE;
        INTGRAL_PRESSR[WheelIndex]=0;   //Reset key
        state variables
        PRES_EST_UPON_PID_INCREASE[WheelIndex]=0;
        REFERENCE_PROP_PEAK_HOLD[WheelIndex]=0;
        PROP_PEAK_HOLD_TIMER[WheelIndex]=0;
        RAMP_DOWN_PROP_HOLD_TO_PROP_PRES[WheelIndex]=
        FALSE;
```

If driver is braking upon PID exit, a flag is set to desensitize PID re-entry

```
if (DRIVER_BRAKING_FLAG)
    EXIT_PID_DURING_DRIVER_BRAK[WheelIndex]=TRUE;
else
    EXIT_PID_DURING_DRIVER_BRAK[WheelIndex]=FALSE;
}
}   //End PID_ACTIVE==TRUE
else    //PID control not active on wheel, check
if conditions exist for activation
    {
    //reset initial PID pressure adjust (toward
    pressure estimate) flag for next PID
    activation
    INITIAL_ADJUST_HAS_OCCURRED[WheelIndex]=FALSE;
    //Keep forcing prop peak hold exit until PID
    reactivation by resetting key state variables
    PROP_PEAK_HOLD_TIMER[WheelIndex]=0;
    REFERENCE_PROP_PEAK_HOLD[WheelIndex]=0;
    RAMP_DOWN_PROP_HOLD_TO_PROP_
    PRES[WheelIndex]=FALSE;
    //If driver is no longer braking, allow PID
    entry at entrance threshold
    if (!DRIVER_BRAKING_FLAG)
    {
        EXIT_PID_DURING_DRIVER_BRAK[WheelIndex]=
        FALSE;
    }
    if ((//If driver is no longer braking OR
    driver is braking but PID intervention had not
    //been called for yet, allow PID entry at
    entrance threshold
    ((PIDStblzPres[WheelIndex]>=ENTER_THRES)&&
    (!EXIT_PID_DURING_DRIVER_BRAK[WheelIndex]))
    //If PID recently exit due to driver braking
    and driver is still braking, allow PID
    intervention once
    //PID pressure exceeds pressure estimate plus
    a threshold, to provide for hysteresis
    ||(EXIT_PID_DURING_DRIVER_BRAK[WheelIndex]&&
    (PIDStblzPres[WheelIndex]>=ENTER_THRES)
        &&(PIDStblzPres[WheelIndex]>=(BRAKE_
        PRESSR_ESTMT[WheelIndex]+EXIT_THRES))
    //Can also enter at lower threshold if had
    recent PID event and driver is not braking
    ||((PIDStblzPres[WheelIndex]>=EXIT_THRES)&&REC
    ENT_PID_CTRL&&(!DRIVER_BRAKING_FLAG))
    )&&EnablePIDControl
    )
    {
        PID_ACTIVE[WheelIndex]=TRUE;
        //Latch pressure estimate at PID activation,
        for use in PID pressure adjustment toward
        estimate during ramp up phase
            PRES_EST_UPON_PID_INCREASE[WheelIndex]=
            BRAKE_PRESSR_ESTMT[WheelIndex];
        //If driver is braking, include the minimum of
        driver pressure or pressure estimate into the
        PID pressure state
            PIDStblzPres[WheelIndex]+=min(DRIVER_REQ_
            PRESSURE, BRAKE_PRESSR_ESTMT[WheelIndex]);
        //Put an upper and lower bound on the final
        PID requested pressure value
            PIDStblzPres[WheelIndex]=LIMIT(PIDStblz
            Pres[WheelIndex], 0, MAXIMUM_STBLZ_PRESSURE);
    }
}
```

The PID pressure is then applied to the brake system to prevent the vehicle from rolling over. The change in the current loop's delta requested pressure is also determined.

```
        DeltaPIDStblzPres[WheelIndex]=PIDStblzPres
    [WheelIndex]-PID_STBLZ_PRES[WheelIndex];
            //Update INCREASE_REQUESTED_PRESSURE flag
    based on previous loop's delta pressure value
            if ((DELTA_PID_STBLZ_PRES[WheelIndex]>=0)
                //Do not set flag when req pressure
            is less than enter threshold value
                &&(PIDStblzPres[WheelIndex]>ENTER_
                    THRES)
            )
                INCREASE_REQUESTED_PRESSURE[Wheel
                Index]=TRUE;
            else
                INCREASE_REQUESTED_PRESSURE[Wheel
                Index]=FALSE;
```

Global variables with local version are updated in step 426.

```
    PID_STBLZ_PRES[WheelIndex]=PIDStblzPres[Wheel
    Index];
    DELTA_PID_STBLZ_PRES[WheelIndex]=DeltaPIDStblzPres
    [WheelIndex];
    }    /*End for loop*/
```

PID requested pressure if corresponding flag is false is set to zero in the following:

```
        if (!PID_ACTIVE[FL])PID_STBLZ_PRES[FL]=0;
        if (!PID_ACTIVE[FR])PID_STBLZ_PRES[FR]=0;
```

A history of when the last PID control is kept in the following:

```
if (PID_ACTIVE [FL]||PID_ACTIVE[FR])RECENT_PID_EVNT_
    CNTR=RECENT_PID_EVNT_THRSHLD;
else if (RECENT_PID_EVNT_CNTR>0)RECENT_PID_EVNT_
    CNTR--;
if (RECENT_PID_EVNT_CNTR>0)RECENT_
    PID_CNTRL_EVENT=TRUE;
else
    RECENT_PID_CNTRL_EVENT=FALSE;
```

A history of when last in Active Yaw Control is also kept in the following:

```
if
(AYC_IN_CYCLE)RECENT_AYC_EVNT_CNTR=RECENT_
    AYC_EVNT_THRSHLD;
else if (RECENT_AYC_EVNT_CNTR>0)RECENT_AYC_EVNT_
    CNTR--;
if (RECENT_AYC_EVNT_CNTR>0)RECENT_AYC_
    CNTRL_EVENT=TRUE;
else
    RECENT_AYC_CNTRL_EVENT=FALSE;
```

While the invention has been described in connection with one or more embodiments, it should be understood that the invention is not limited to those embodiments. On the contrary, the invention is intended to cover all alternatives, modifications, and equivalents, as may be included within the spirit and scope of the appended claims.

What is claimed is:

1. A method of controlling a safety system of a vehicle comprising:
   determining a roll rate;
   determining a first control pressure in response to roll rate;
   determining a roll angle;
   determining a second control pressure in response to said roll angle;
   determining a final control pressure in response to the first control pressure and the second control pressure; and
   controlling the safety system in response to the final control pressure.

2. A method as recited in claim 1 further comprising determining a roll acceleration and determining a third control pressure in response to roll acceleration, wherein determining a final control pressure comprises determining the final control pressure in response to the first control pressure, the second control pressure and the third control pressure.

3. A method as recited in claim 1 further comprising determining a roll signal for control and a deadband and determining a third control pressure in response to the roll signal for control and the deadband, wherein determining a final control pressure comprises determining the final control pressure in response to the first control pressure, the second control pressure and the third control pressure.

4. A method as recited in claim 1 further comprising determining a roll signal for control and a deadband and determining a third control pressure in response to the roll signal for control and the deadband, determining a roll acceleration and determining a fourth control pressure in response to roll acceleration, wherein determining a final control pressure comprises determining the final control pressure in response to the first control pressure, the second control pressure, the third control pressure and fourth control pressure.

5. A method as recited in claim 1 wherein the roll rate is a filtered roll rate.

6. A method as recited in claim 1 wherein determining a control pressure comprises determining the final control pressure as a sum of the first control pressure and the second control pressure.

7. A method as recited in claim 1 further comprising determining a derivative deadband as a function of lateral acceleration; and
   wherein the first control pressure is a function of the derivative deadband.

8. A method as recited in claim 1 further comprising determining a proportional deadband as a function of vehicle velocity; and
   wherein the second control pressure is a function of the proportional deadband.

9. A method as recited in claim 1 wherein the safety system comprises a rollover control system.

10. A method of controlling the safety system of an automotive vehicle comprising:
    determining a proportional pressure term;
    determining a derivative pressure term as a function of a roll rate;
    determining a final control pressure in response to the proportional control pressure and the derivative control pressure; and
    controlling a safety system in response to the final control pressure.

11. A method as recited in claim 10 wherein the derivative term is a function of a derivative deadband which is a function of lateral acceleration.

12. A method of controlling the safety system of an automotive vehicle comprising:
   determining a proportional pressure term as a function of roll angle;
   determining a final control pressure in response to the proportional control pressure and the derivative control pressure; and
   controlling a safety system in response to the final control pressure.

13. A method as recited in claim 12 wherein the proportional pressure is a function of a proportional deadband which is a function of vehicle velocity.

14. A method of controlling the safety system of an automotive vehicle comprising:
   determining a proportional control pressure term;
   determining a double derivative pressure term;
   determining the final control pressure in response to the proportional control pressure term and the double derivative pressure term.

15. A method as recited in claim 14 wherein the double derivative pressure term is a function of a roll acceleration.

16. A method of controlling the safety system of an automotive vehicle comprising:
   determining a proportional pressure term;
   determining a derivative pressure term;
   determining an integral pressure term as a function of a roll signal for control;
   determining a final control pressure in response to the proportional control pressure, the derivative control pressure, and the integral pressure term; and
   controlling a safety system in response to the final control pressure.

17. A method as recited in claim 16 wherein the integral pressure term is a function of an integral deadband which is a function of vehicle velocity.

18. A method as recited in claim 17 wherein the roll signal for control is a function of a total roll angle and a reference bank angle.

19. A method of controlling the safety system of an automotive vehicle comprising:
   determining a building roll divergence;
   determining a proportional pressure term;
   holding the proportional pressure term during the building roll divergence;
   determining a derivative pressure term as a function of a roll rate;
   determining a final control pressure in response to the proportional control pressure and the derivative control pressure; and
   controlling a safety system in response to the final control pressure.

20. A method of controlling the safety system of an automotive vehicle comprising:
   determining a roll signal for control;
   determining a proportional pressure term;
   holding the proportional pressure term at a peak in response to the roll signal for control;
   determining a derivative pressure term as a function of a roll rate;
   determining a final control pressure in response to the proportional control pressure and the derivative control pressure; and
   controlling a safety system in response to the final control pressure.

21. A method as recited in claim 20 wherein the peak is held for a predetermined amount of time or until the proportional pressure term is above a proportional hold threshold.

22. A method as recited in claim 20 further comprising ramping down the final control pressure at a predetermined rate.

23. A method as recited in claim 22 wherein the predetermined rate corresponds to symmetric value to a hydraulic build rate.

* * * * *